US012709575B2

(12) United States Patent
El Housseini et al.

(10) Patent No.: US 12,709,575 B2
(45) Date of Patent: Aug. 18, 2026

(54) HYDRAULIC BINDER WITH LOW CARBON FOOTPRINT AND HIGH EARLY STRENGTH

(71) Applicant: IMERTECH, Paris (FR)

(72) Inventors: Sarra El Housseini, Lausanne (CH); Barbara Benevenuti, Lyons (FR); Hervé Fryda, Satolas Et Bonce (FR); Barbara Elisabeth Lothenbach Schmid, Buchs Ag (CH); Karen Scrivener, Reverolle (CH)

(73) Assignee: IMERTECH, Paris (FR)

( * ) Notice: Subject to any disclaimer, the term of this patent is extended or adjusted under 35 U.S.C. 154(b) by 288 days.

(21) Appl. No.: 18/256,305

(22) PCT Filed: Dec. 8, 2021

(86) PCT No.: PCT/EP2021/084843
§ 371 (c)(1),
(2) Date: Jun. 7, 2023

(87) PCT Pub. No.: WO2022/122848
PCT Pub. Date: Jun. 16, 2022

(65) Prior Publication Data

US 2024/0034680 A1 Feb. 1, 2024

(30) Foreign Application Priority Data

Dec. 8, 2020 (EP) .................................... 20306515
Aug. 18, 2021 (EP) .................................... 21306126

(51) Int. Cl.

| | |
|---|---|
| ***C04B 28/16*** | (2006.01) |
| ***C04B 14/06*** | (2006.01) |
| ***C04B 14/10*** | (2006.01) |
| ***C04B 14/14*** | (2006.01) |
| ***C04B 14/28*** | (2006.01) |
| ***C04B 18/14*** | (2006.01) |
| ***C04B 22/10*** | (2006.01) |
| ***C04B 22/14*** | (2006.01) |
| ***C04B 24/06*** | (2006.01) |
| ***C04B 111/00*** | (2006.01) |

(52) U.S. Cl.
CPC .............. *C04B 28/16* (2013.01); *C04B 14/06* (2013.01); *C04B 14/106* (2013.01); *C04B 14/14* (2013.01); *C04B 14/28* (2013.01); *C04B 18/141* (2013.01); *C04B 22/10* (2013.01); *C04B 22/143* (2013.01); *C04B 24/06* (2013.01); *C04B 2111/00017* (2013.01)

(58) Field of Classification Search
CPC ....... C04B 28/16; C04B 14/06; C04B 14/106; C04B 14/14; C04B 14/28; C04B 18/141; C04B 22/10; C04B 22/143; C04B 24/06; C04B 28/021; C04B 28/04; C04B 28/06; C04B 28/065; C04B 28/082; C04B 28/14; C04B 2111/00017; C04B 2111/00181; C04B 7/02; C04B 7/32; C04B 7/323; C04B 2103/20; Y02W 30/91; B33Y 70/00; B33Y 80/00
See application file for complete search history.

(56) References Cited

U.S. PATENT DOCUMENTS

| | | | |
|---|---|---|---|
| 4,350,533 A | 9/1982 | Galer et al. | |
| 9,994,484 B2 * | 6/2018 | Perez-Pena | C04B 28/04 |

FOREIGN PATENT DOCUMENTS

| | | | |
|---|---|---|---|
| CN | 1420854 | A | 5/2003 |
| CN | 111548114 | A | 8/2020 |
| EP | 3868730 | A1 | 8/2021 |
| FR | 3020058 | A1 | 10/2015 |
| GB | 2360769 | A | 10/2001 |
| JP | H04-300231 | A | 10/1992 |
| JP | 2015-093826 | A | 5/2015 |
| JP | 2016-003152 | A | 1/2016 |
| JP | 2018-080092 | A | 5/2018 |
| JP | 2019-011231 | A | 1/2019 |
| WO | WO 2001/072658 | A1 | 10/2001 |
| WO | 2020/021202 | A1 | 1/2020 |
| WO | 2020/225300 | A1 | 11/2020 |

OTHER PUBLICATIONS

SECAR® 51 Product Data Sheet, Refererence FC-SC51-RE-GB-KFR-052008, (Year: 2008).*
Chen et al., "Effect of different grade levels of calcined clays on fresh and hardened properties of ternary-blended cementitious materials for 3D printing"; Cement and Concrete Composites, Elsevier Applied Science, Barking, GB, vol. 114, Jul. 4, 2020.
Huang et al., "Development of limestone calcined clay cement concrete in South China and its bond behavior with steel reinforcement"; Journal of Zhejiang University Science A (Appl Phys & Eng), vol. 21, No. 11, pp. 892-907, (2020).
European Search Report issued in European Patent Application No. 20306515.6 dated May 28, 2021 in 11 pages.
European Search Report issued in European Patent Application No. 21306126.0 dated Feb. 17, 2022 in 12 pages.
International Search Report issued in International Patent Application No. PCT/EP2021/084843, dated Feb. 23, 2022 in 3 pages.

* cited by examiner

*Primary Examiner* — Anthony J Green
(74) *Attorney, Agent, or Firm* — Knobbe, Martens, Olson & Bear, LLP

(57) ABSTRACT

The present invention concerns a novel hydraulic binder with a low $CO_2$ footprint, having a low milled cement clinker content, and exhibiting a higher early strength than existing LC3 type or other SCM containing binders.

19 Claims, 24 Drawing Sheets

HYDRAULIC BINDER WITH LOW CARBON FOOTPRINT AND HIGH EARLY STRENGTH

CROSS-REFERENCE TO RELATED APPLICATIONS

This application is the U.S. National Phase under 35. U.S.C. § 371 of International Application PCT/EP2021/084843, filed Dec. 8, 2021, which claims priority to European Patent Application No. 20306515.6, filed Dec. 8, 2020 and European Patent Application No. 21306126.0, filed Aug. 18, 2021. The disclosures of the above-described applications are hereby incorporated by reference in their entirety.

The present invention concerns the field of building construction, and cement in particular.

In concrete and mortars, cement is used as a hydraulic binder. Portland cement (PC) refers to the hydraulic binding material obtained by mixing Portland cement clinker, various blended materials, and appropriate amount of gypsum. PC is the most widely and commonly used variant type of cement.

Portland clinker is produced by calcining and sintering together limestone and aluminosilicate materials such as clay in a cement kiln. The production of clinker, the key constituent of cement, accounts for most of the $CO_2$ emissions of cement production, coming from the combustion of fuels needed to reach the calcining temperature (around 1500° C.) and from the decarbonation of the limestone. As of 2018, cement production generated about 8% of all carbon emissions worldwide, contributing substantially to global warming. It is therefore critical to reduce the cement's carbon footprint.

A classical way to reduce the $CO_2$ footprint of cement is to replace a part of the milled clinker by secondary cementitious material (SCM) with a lower $CO_2$ footprint, thus reducing the clinker factor of the cement. Among the SCM, those that are of special interest in the present invention are materials that have latent hydraulicity (that need external alkalinity to hydrate), or those that have pozzolanic activity (ie that need some calcium addition to react), acting as binders.

Among the commonly available materials with pozzolanic activity, calcined clay, e.g. as described in the U.S. Pat. No. 5,626,665, is a good candidate to partially replace PC clinker. It has a relatively high reactivity, and clay is an abundant material. To produce it, much less energy is needed than for Portland clinker, as it is calcined at temperatures close to 800° C., lower than that needed for clinker (>1500° C.). Furthermore, it releases only water in the calcination, unlike clinker that releases $CO_2$ from the decomposition of carbonates.

In the presence of water and calcium (generally coming from the Portland cement), the calcined clay will react through the well-known pozzolanic reaction. It forms hydrates very similar to the ones formed by Portland cement, but with much slower kinetics. This reaction is well described in the scientific literature (Skibsted et al Cement and Concrete Research 124, 2019). Calcined clays have been used in combination to Portland cement for some decades in different countries where good quality clay is available.

More recently, researchers found out that the combination of the calcined clay to calcium carbonates (limestone) generates a synergy leading to the formation of further hydrates, improving the performance of the binding system. As limestone is a cheap and widely available product, which has a very low $CO_2$ footprint, it allows further reducing the $CO_2$ footprint and the cost of the binder, when part of the Portland clinker is replaced by the mix of calcined clay and limestone (LS, $CaCO_3$).

The binder obtained by this approach is now called "LC3" binder (Limestone Calcined Clay Cement). It was described in the publication of the master thesis of John Rossen "Ternary cement blends based on metakaolin and limestone" at the Ecole Polytechnique Fédérale de Lausanne which described in March 2010 a novel type of cement that presented high mechanical strengths and low clinker content, being composed of Portland clinker, heat treated clay and limestone. Examples of LC3 binder type compositions are [Portland Cement wt %: Calcined Clay wt %: Limestone wt %]=[70:20:10], [55:30:15], [40:40:20]. This type of binder is also described in the European patent EP 2 429 966.

LC3 type binder is now widely described in scientific papers.

The LC3-type cement has a significantly reduced $CO_2$ footprint, typically −30% to −40% compared to conventional Portland cement, while keeping similar long-term strengths. Thanks to the densification of the structure and changes in its chemistry, the systems containing LC3-type binders can also display better durability. On the down side, while the pozzolanicity of the calcined clay (and of all pozzolanic or latent hydraulic materials) generally leads to acceptable levels of long-term strength (28 days), its reactivity is not rapid enough to compensate the lower clinker factor at early ages (1 day), leading to lower strength. LC3 thus exhibit an early strength (1-3 days) that is much lower than that of PC.

This drawback therefore prevents the use of such binder in applications requiring early strength, like precast, repair or 3D printing for example.

It is therefore desirable to provide an alternative, improved binder, providing a low carbon footprint together with an increased early strength.

The present invention brings a solution to the limitation of slow strength development of the LC3-type binder, or other SCM containing binders, based on the association of calcium aluminate cement (CAC) or calcium sulfoalurninate cement (GSA) to the LC3-type cement (or SCM containing cement), in order to accelerate it and provide higher early strength while maintaining low $CO_2$ footprint.

The present invention also aims at improving the long-term strength of LC3, or SCM containing cement providing higher strength and durability for a similar $CO_2$ footprint, or the same strength for a lower $CO_2$ footprint.

The present invention increases the ratio strength/$CO_2$ footprint compared to LC3 binder, or SCM containing binders, at all ages, including 1 day and 28 days.

CAC and CSA are specialty cements with high reactivity, but their cost is relatively high, so they are used in specific applications where fast strength development, and/or other special characteristics, are needed.

CAC or CSA can be associated, in small amounts, to Portland cement, to obtain systems with fast setting and strength development, e.g. as described in U.S. Pat. No. 9,604,879 or in the article from Amathieu et al. (Amathieu et al International Conference on Calcium Aluminate Cements. 303-317, 2001). One downside of such a combination is a reduction of the long-term strength, compared to pure PC systems. The combination of CAC and PG is well known and documented, being explored in some commercial products, notably for construction applications.

The combination of CAC or CSA with pozzolanic and/or latent hydraulic materials, notably calcined clays and metakaolin, is, on the other hand, little explored.

Some papers, as (Nowacka et al Przemyst Chemiczny 96/4. 770-774) mention the combination of metakaolin to CAC, but in the optics of avoiding the conversion reaction of pure CAC systems (conversion reaction leads to a strong reduction of the strength of pure CAC hydrates in the long term).

Those systems are composed of CAC and a few percent of metakaolin, and no Portland cement. In such systems there is no intent to reduce the carbon footprint, nor to accelerate the strength development, only to avoid the long-term loss of strength linked to the conversion.

Some literature mentions the addition of CAC in systems called AAM (alkali activated materials) (Palomo et al Proceedings of the Centenary Conference, Avignon, 30 Jun.-2 Jul. 2008. 465-474). AAM are composed of pozzolanic and/or latent hydraulic materials, as slag or metakaolln, which are activated by the addition of strong alkalis, as sodium hydroxide. The CAC or CSA can be used in those systems as a source of reactive alumina, in order to obtain the optimum alumina to silica ratio, as those materials usually have an alumina content lower than the optimum.

These systems are composed of high amounts of pozzolanic or latent hydraulic materials, a few percent of a strong alkali and a few percent of CAC or CSA. No Portland cement is used here.

No information could be found on the simultaneous combination of PC, pozzolanic or latent hydraulic materials (particularly calcined clays) and CAC and its impact on the early and later age strengths and CO2 footprint.

Furthermore, the literature describes the effect of CAC or CSA on the hydration of PC, and the effect of pozzolans on the hydration of PC, but not of CAC or CSA on the hydration of pozzolans. As CAC or CSA and pozzolan are sources of aluminate ions, it can be expected that the presence of one would affect the reaction of the other. Besides, as CAC can act as a source of calcium, it is expected to influence the pozzolanic reaction, but these effects were not found in the literature.

According to a first object, the present invention concerns a binder composition comprising:

Portland Cement and/or a ground Portland Cement clinker,

Calcium aluminates cement (CAC) and/or calcium sulfo aluminates cement (CSA),

Optionally a calcium sulfate source,

Pozzolanic and/or latent hydraulic material,

Wherein the binder composition comprises at least 1.5% of calcium sulfate.

The binder of the invention allows to keep the low $CO_2$ footprint of LC3 or SCM containing binders improve the early strength of LC3 or SCM containing binders improve the long-term strength of LC3, or SCM containing binders, to levels similar or superior to that of pure Portland cement.

Increase the ratio strength/$CO_2$ footprint compared to LC3 binder, or SCM containing binders, at all ages, including) day and 28 days.

The strength of a cement can be determined in accordance with European standard EN 196-1 by the compressive strength at either 2 days, 7 days or 28 days, according to the table below:

| | Compressive Strength MPa | | | | Setting | Stability |
|---|---|---|---|---|---|---|
| Strength | Early strength | | Strength | | time | (expansion) |
| class | 2 days | 7 days | 28 days | | min | mm |
| 32.5 L[a)] | — | ≥12.0 | ≥32.5 | ≤52.5 | ≥75 | ≤10 |
| 32.5 N | — | ≥16.0 | | | | |
| 32.5 R | ≥10.0 | — | | | | |
| 42.5 L[a)] | — | ≥16.0 | ≥42.5 | ≤62.5 | ≥60 | |
| 42.5 N | ≥10.0 | — | | | | |
| 42.5 R | ≥20.0 | — | | | | |
| 52.5 L[a)] | ≥10.0 | — | ≥52.5 | — | ≥45 | |
| 52.5 N | ≥20.0 | — | | | | |
| 52.5 R | ≥30.0 | | | | | |

[a)]For CEM III only

Three main categories are defined according to the strength at 28 days: 52.5, 42.5 and 32.5. The early strength is defined by three sub categories depending on the strength at 2 days: a category with low early strength, indicated by L, a category with ordinary early strength, indicated by N, and a category with high early strength, indicated by R.

As an example, the strength delivered at 2 days should be higher than 20 MPa for a 42.5 R, and more than 10 MPa for a 42.5 N, whereas the category 42.5 L requires no specific strength level at 2 days.

But these categories are not relevant for some applications like precast, repair mortar or 3D printing for example. In such application strength can be required before 2 days, sometimes in the first hours or even less than 1 hour. In this case, a specific application referential may apply.

The dilution of the clinker by a SCM to reduce the $CO_2$ footprint leads to secondary effect of reducing of the early strength. As apparent from the examples below, the invention allows to use a LC3 type binder or a SCM containing binder with an improved early strength. It also allows to reduce the $CO_2$ footprint of reference cements.

While the binder of the invention delivers a $CO_2$ footprint very close to LC3, it delivers the same strength level at 1 day that the Portland cement, and surprisingly much higher strength at 28 days ((i.e.) long term strength).

The binder of the invention therefore may suit all applications of any strength requirement, but with a lower $CO_2$ footprint than standard cements.

According to an embodiment, the binder composition comprises:

Portland Cement and/or a ground Portland Cement clinker,

Calcium aluminates cement (CAC) and/or calcium sulfo aluminates cement (CSA),

A calcium sulfate source,

Pozzolanic,

Wherein the binder composition comprises at least 1.5% (weight) of calcium sulfate.

According to an embodiment, the binder composition comprises;

20 to 90% by weight of Portland Cement (PC) and/or a ground Portland cement clinker, preferably between 50% and 70%; and/or 0.5 to 40% by weight of calcium aluminate cement (CAC) or calcium sulfo aluminates cement (CSA), preferably between 2 and 10%; and/or 1.5 to 44.5% by weight of a calcium sulfate source, preferably between 2 and 15%; and/or 5 to 50% by weight of pozzolanic and/or latent hydraulic materials, preferably between 10% and 50%.

More particularly, it may comprise:

50% to 70% by weight of Portland Cement (PC) and/or a ground Portland cement clinker, 2% to 20% by weight of calcium alu inate cement (CAC) and/or calcium sulfo aluminates cement (CSA), 2% to 15% by weight of a calcium sulfate source, 10% to 70% by weight of pozzolanic and/or latent hydraulic materials.

According to the European Standard EN 197-1, Portland cement clinker is a hydraulic material which consists of at least two-thirds by mass of calcium silicates, (3 $CaO \cdot SiO_2$, and 2 $CaO \cdot SiO_2$), the remainder consisting of aluminium and iron-containing clinker phases and other compounds. The ratio of CaO to $SiO_2$ shall not be less than 2.0. The magnesium oxide content (MgO) shall not exceed 5.0% by mass.

Portland cement clinker is made by sintering a precisely specified mixture of raw materials (raw meal, paste or slurry) containing elements, usually expressed as oxides, CaO, $SiO_2$, $Al_2O_3$, $Fe_2O_3$ and small quantities of other materials. The raw meal, paste or slurry is finely divided, intimately mixed and therefore homogeneous.

PC clinker may be made by heating a homogeneous mixture of raw materials including a source of calcium carbonate (such as limestone) and a source of alumino-silicate (such as clay) in a rotary kiln at high temperature. Second raw materials may be present, such as shale, sand, iron ore, bauxite, fly ash and slag.

The mineralogical composition of the clinker may depend on the raw materials, the temperature of the kiln, the duration and conditions of the heating and cooling.

According to EN-197-1, minor additional constituents are inorganic natural mineral materials, inorganic mineral materials derived from the clinker production process or constituents. Minor additional constituents may improve the physical properties of the cement (such as workability or water retention). They can be inert or have slightly hydraulic, latent hydraulic or pozzolanic properties. They may be prepared, i.e. selected, homogenized, dried and comminuted depending on their state of production or delivery. They shall not increase the water demand of the cement appreciably, impair the resistance of the concrete or mortar to deterioration in any way or reduce the corrosion protection of the reinforcement.

According to the present invention, cement as used herein refers to cement of the CEM type. As defined by the European Standard EN-197-1, CEM cement is a hydraulic binder, i.e. a finely ground inorganic material which, when mixed with water, forms a paste which sets and hardens by means of hydration reactions and processes and which, after hardening, retains its strength and stability even under water.

The standard describes different classes of CEM cements. Portland cement corresponds to the CEM I cement type. It comprises:

95 to 100% (by weight) of clinker, and 0 to 5% (by weight) of minor additional constituents.

As defined by EN-197-1, other classes of CEM (CEM II to CEM V) contain increasing amounts of SCM, such as limestone, blast furnace slag or pozzolans, in replacement of the clinker.

The EN-197-1 also classifies the CEM according to their long term strength. The three classes are 32.5, 42.5 and 52.5, corresponding to their minimal compressive strength at 28 days, measured according to EN-196-1, in MPa.

Finally, CEM cements are classified regarding their short term strengths. N cements present "normal" strengths at 2 days, R cements present elevated strength at 2 days, and L cements (applied only for CEM III) have low ones.

The Portland cement used in the present invention may be chosen from commercially available grades, such as CEM I 52.5R Milke Premium, produced by Heidelberg (PG-M), CEM I 42.5N Normo, produced by Holcirn (PC-N) and CEM I 52.5N from Jura Cement (PC-J). Portland clinkers may also be used, instead of the Portland cement.

The calcium aluminate cement or CAC refers to cements consisting predominantly of hydraulic calcium aluminates. Alternative names may include "aluminous cement" or "high-alumina cement". The main active phases of crystallized calcium aluminate cements are monocalcium aluminate ($CaAl_2O_4$, GA) and dodecacalcium hepta-aluminate ($Ca_{12}Al_{14}O_{33}$, C12A7).

CAC may have a variable respective content in alumina (A) and calcium oxide (C), defined by the C/A ratio. According to an embodiment, its molar C/A ratio may be comprised between 1 and 3. The CAC may be crystalline and/or amorphous. According to an embodiment, the calcium aluminate cement comprises from 2% to 50% of a crystalline phase and between 50% and 98% of an amorphous phase (by weight).

The CAC may typically comprise from 30% to 75% of $Al_2O_3$, from 0.1% to 18% of $Fe_2O_3$ and from 20% to 55% of GaO (by weight).

Various CAC are commercially available under different brand names, for example Ciment Fondu, Ternal RG, Ternal white . . . .

The calcium sulfoaluminate cement or GSA refers to cements consisting predominantly of the mineral phases ye'elimite (Ca4Al6SO15, C4A3$), belite (Ca2SiO4, C2S), calcium sulfate (CaSO4, C$), and aluminoferrite (Ca4Al2FeO10, C4AF).

CSA may have a variable respective content in alumina (Al2O3) calcium oxide (CaO) and sulfate oxide (SO3).

The CSA may typically comprise from 10% to 50% of $Al_2O_3$, from 0.5% to 10% of $Fe_2O_3$, from 3% to 20% of $SiO_2$, from 4% to 35% of $SO_3$, and from 35% to 65% of GaO (by weight). Various GSA are commercially available under different brand names, for example Ali Pre, Ali Cem and Alpenat.

Calcium sulfate source may be hydrated (such as gypsum, $CaSO_4 \cdot 2H_2O$), anhydrous (anhydrite, $GaSO_4$), hemihydrated (hemihydrate, $CaSO_4 \cdot 0.5H_2O$) or a mixture thereof.

Gypsum and anhydrite are found naturally. Calcium sulfates, including hemihydrates, are also available as a by-product of certain industrial processes.

In the present invention, the feature that the binder composition comprises at least 1.5% of calcium sulfate refers to the total content in calcium sulfate in the binder composition. Notably, the calcium sulfate may be brought by the PC, which contains some in its composition, and/or by an optional calcium sulfate source that can be added.

Anhydrite, hemihydrate and gypsum are commercially available or extracted from natural resources.

Pozzolanic and latent hydraulic materials comprise fly ashes, silica fumes, calcined clays, calcined schist and ground blast-furnace slags.

The term "latent hydraulic material" as used herein refers to materials that have no hydraulic activity alone, but which will behave as a binder when activated by high pH, such as ground-granulated blast-furnace slag and W-type fly ash. Pozzolanic materials, on the other hand, require both calcium and hydroxide ions to be activated and to react.

The term «pozzolanic materials» as defined in the European standard EN 197-1 refers to natural substances of siliceous or silico-aluminous composition or a combination thereof. Pozzolanic materials include:

- natural pozzolana (P) (i.e.) materials of volcanic origin or sedimentary rocks with suitable chemical and mineralogical composition; and
- natural calcined pozzolana (Q) (i.e.) materials of volcanic origin, clays, shales or sedimentary rocks, activated by thermal treatment.

According to an embodiment, pozzolanic materials refer preferably to calcined clay.

Calcined clay defines clay that has been heated at temperatures above 500° C., typically comprised between 650 and 850° C. to drive out bound water.

Clay typically comprises montmorillonite, kaolinite, mica, and feldspars, which are silicoaluminates compounds, and quartz, and free oxides as impurities.

When heated, kaolinite dehydroxylates and transforms into metakaolin, a complex amorphous structure. The content of metakaolinite in calcined clay depends on the content of the corresponding clay in kaolinite before calcination, Calcined clay typically comprises between 1 and 99% by weight metakaolin (MK), preferably between 70 and 95%. Calcined clays are commercially available, such as Argical M1000.

According to an embodiment, the binder may further comprise one or more ingredients. Additional ingredients may include set modifiers, and/or carbonaceous mineral.

As used herein, set modifiers encompass agents suitable for modifying the setting properties of cement, such as accelerators or retarders.

In particular, the modifier may be selected from the group consisting of citric acid, tartaric acid, sodium gluconate, $Na_2CO_3$, $K_2CO_3$, $Li_2CO_3$, $Li_2SO_4$, LiOH.

As used herein "carbonaceous mineral" refers in particular to limestone and dolomite. Limestone generally refers to carbonate sedimentary rocks; its major materials may include the minerals calcite and aragonite, which are different crystal forms of calcium carbonate ($CaCO_3$).

As used herein, limestone is defined according to the European Standard EN 197-1, as meeting the following requirements:

- a) The calcium carbonate ($CaCO_3$) content calculated from the calcium oxide content shall be at least 75% by mass.
- b) The clay content, determined by the methylene blue test in accordance with EN 933-9, shall not exceed 1.20 g/100 g. For this test the limestone shall be ground to a fineness of approximately 5000 cm2/g determined as specific surface in accordance with EN 196-6.
- c) The total organic carbon (TOC) content, when tested in accordance with prEN 13639:1999, shall conform to one of the following criteria:—LL: shall not exceed 0.20% by mass;—L: shall not exceed 0.50% by mass.

According to an embodiment, the binder may further comprise carbonaceous mineral, typically between 5 to 40% by weight of such carbonaceous mineral.

In particular, the binder may further comprise limestone, typically between 5 to 40% by weight of limestone. Limestone may be commercially available such as Imercarb 3.

According to an embodiment, the latent hydraulic material is ground granulated blast-furnace slag.

According to an embodiment, the binder may comprise:

- 0.5% to 80% by weight of Portland cement;
- 0.5% to 20% by weight of calcium aluminate cement (CAC);
- 0.5% to 15% by weight of a calcium sulfate source; and
- 20% to 95% by weight of latent hydraulic material.

Still more particularly, the binder may comprise:

- 0.5% to 60% by weight of Portland cement;
- 0.5% to 20% by weight of calcium aluminate cement (CAC);
- 0.5% to 15% by weight of a calcium sulfate source; and
- 40% to 95% by weight of latent hydraulic material.

Under these embodiments, ground granulated blast-furnace slag may be particularly cited as latent hydraulic material.

According to a second object, the present invention concerns the process of preparing the binder composition of the invention.

Typically, said process comprises mixing the ingredients, at ambient temperature, and optionally grinding and/or homogenizing the obtained mixture.

The present invention also concerns the use of said binder for preparing construction compositions, (i.e. a composition useful for manufacturing and/or assembling construction parts, including building blocks and panels). Representative construction compositions include mortar and concrete.

According to a further object, the present invention thus concerns a construction composition including the hydraulic binder of the invention, including mortar and concrete. Said construction compositions may include additional ingredients such as sand, gravels, lime.

According to a further object, invention concerns the process of preparation of a construction composition comprising the step of mixing the binder of the invention with water.

This step is generally carried out at ambient temperature. The respective amounts of water and binder may depend on the nature of the binder, the construction composition that is desired and its intended use. Typically, the ratio water/binder may be comprised between 0.1 and 2.

According to an alternative embodiment, the invention also concerns the process of preparation of a construction composition comprising the step of mixing a mortar or concrete, comprising at least Portland Cement and/or a ground Portland Cement clinker, and Pozzolanic and/or latent hydraulic materials, with a slurry comprising Calcium aluminate cement (CAC) and/or calcium sulfa aluminates cement (GSA), and optionally a calcium sulfate source; the binder composition formed comprising at least 1.5% of calcium sulfate by weight of dry component.

In this further object, the slurry comprising Calcium aluminate cement (CAC) and/or calcium sulfa aluminates cement (CSA), and optionally a calcium sulfate source may further comprise a blocking agent.

For example, the blocking agent comprises boric acid, citric acid, tartaric acid, and salts thereof, a phosphorus-containing compound selected from metaphosphoric acid, phosphorous acid, phosphoric acid, phosphoric acid and any compound which may form any of these compounds by reacting with water.

The slurry may comprise from 0.1% to 20%, preferably from 0.1 to 15%, preferably from 0.1 to 10% and more preferably from 0.3 to 10% by weight of blocking agent relative to the total weight of Calcium Aluminate Cement and/or Calcium Sulfo aluminates cement.

The slurry may be stabilized according to the method described in the patent application WO 203/093344.

According to a further object, the present invention also concerns a construction composition obtainable by the process as defined above.

According to a still further object, the present invention concerns a construction part comprising the construction composition of the invention.

According to a further object, the present invention concerns the use of a binder of the invention in construction, in precasting, in repairing mortar or in 3D printing

FIGURES

FIG. 1 illustrates the compressive strength between 1 and 28 days of compositions 1-4 of example 1.

FIG. 2 illustrates the CO2 footprint of compositions 1-4 of example 1.

FIG. 3 illustrates the yield at days 1 and 28 of compositions 1-4 of example 1.

FIG. 4 illustrates the portlandite content of compositions 1-4 of example 1.

FIG. 5 illustrates the compressive strength between 1 and 28 days of compositions 1-3 and 5-6 of example 2.

FIG. 6 illustrates the CO2 footprint of compositions 1-3 and 5-6 of example 2.

FIG. 7 illustrates the yield at days 1 and 28 of compositions 1-3 and 5-6 of example 2.

FIG. 8 illustrates the cumulative heat for compositions 1-3 and 5-6 of example 2.

FIG. 9 illustrates the compressive strength between 1 and 28 days of compositions 1-3 and 9-10 of example 3.

FIG. 10 illustrates the CO2 footprint of compositions 1-3 and 9-10 of example 3.

FIG. 11 illustrates the yield at days 1 and 28 of compositions 1-3 and 9-10 of example 3.

Figure 19:
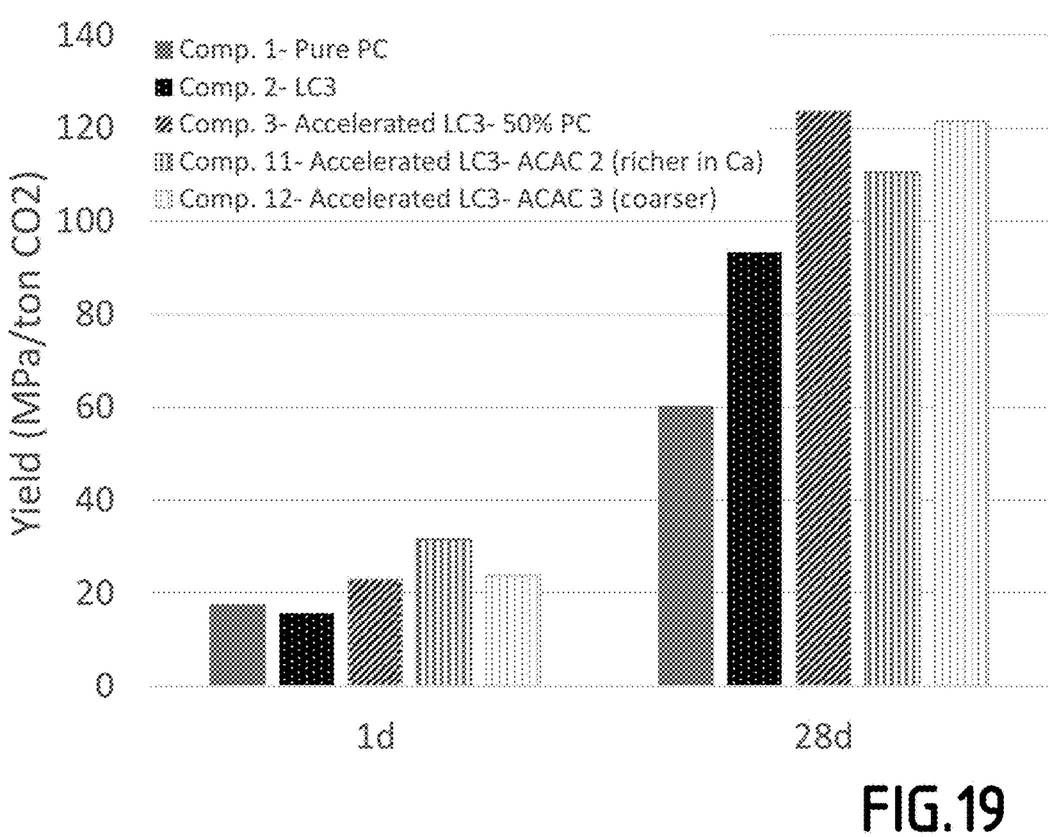

FIG. 19 illustrates the yield at days 1 and 28 of compositions of pure PC, LC3, accelerated LC3 and compositions of example 5.

Figure 20:
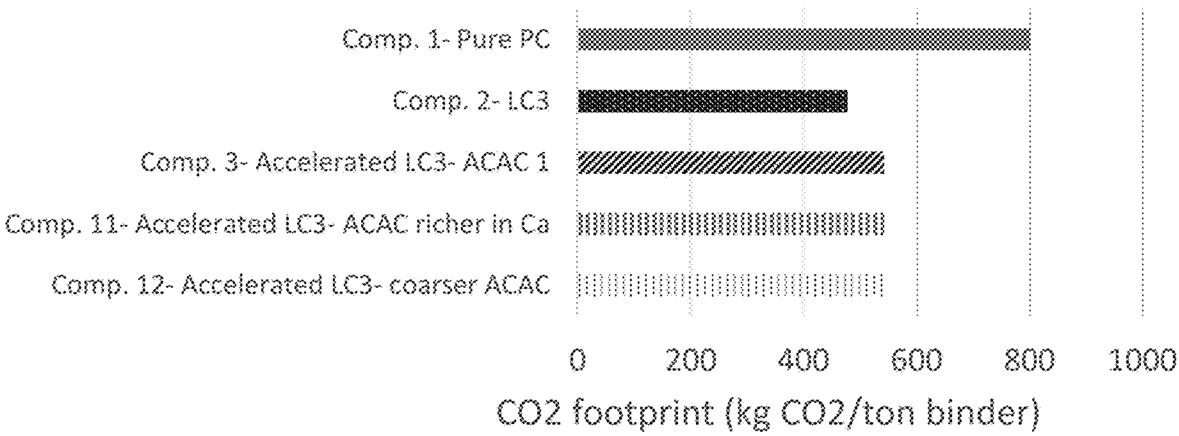

FIG. 20 illustrates the CO2 footprint of compositions of pure PC, LC3, accelerated LC3 and compositions of example 5.

Figure 21:
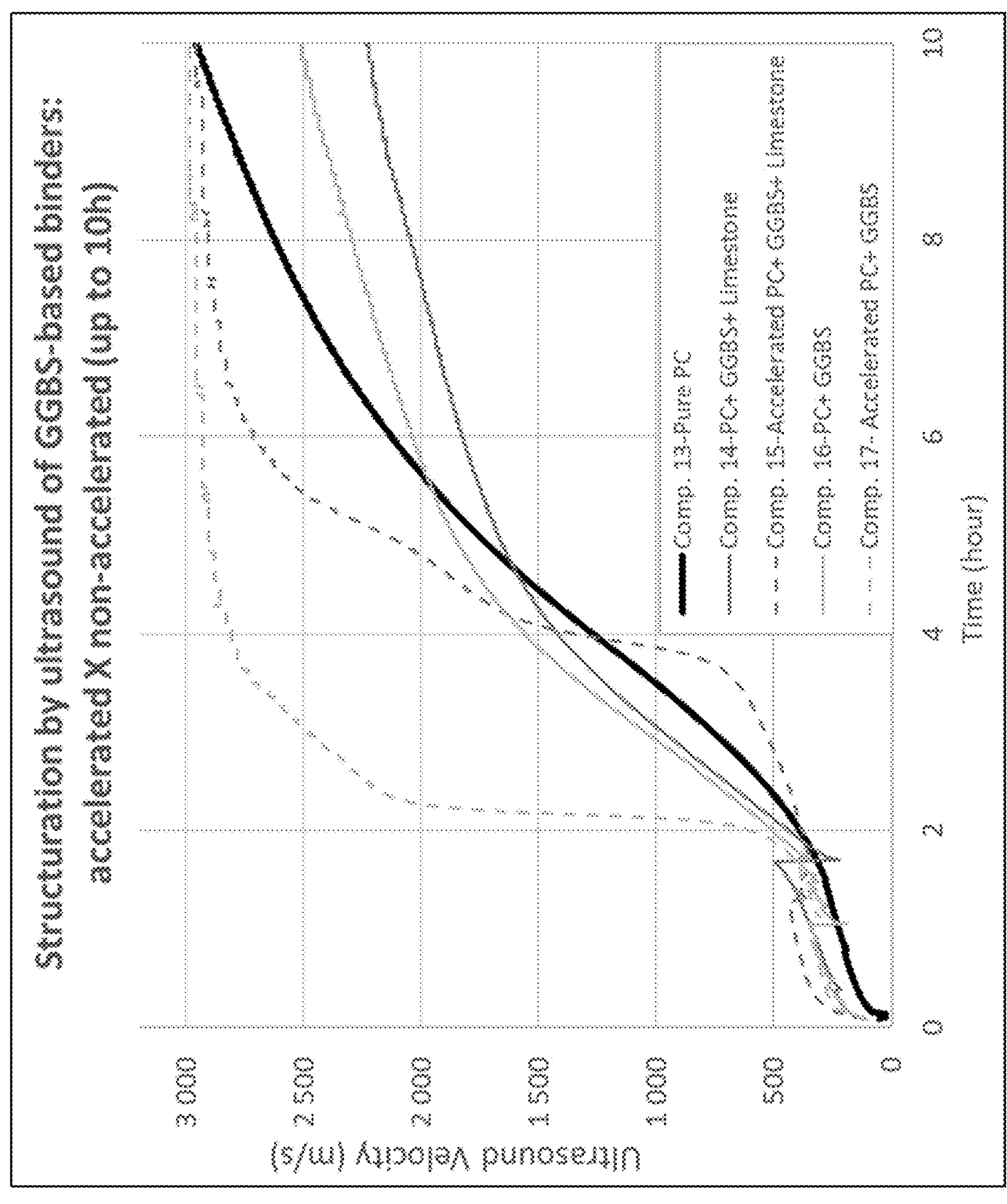

FIG. 21 illustrates the ultrasound velocity of compositions of example 6 for up to 10 hours.

Figure 22:
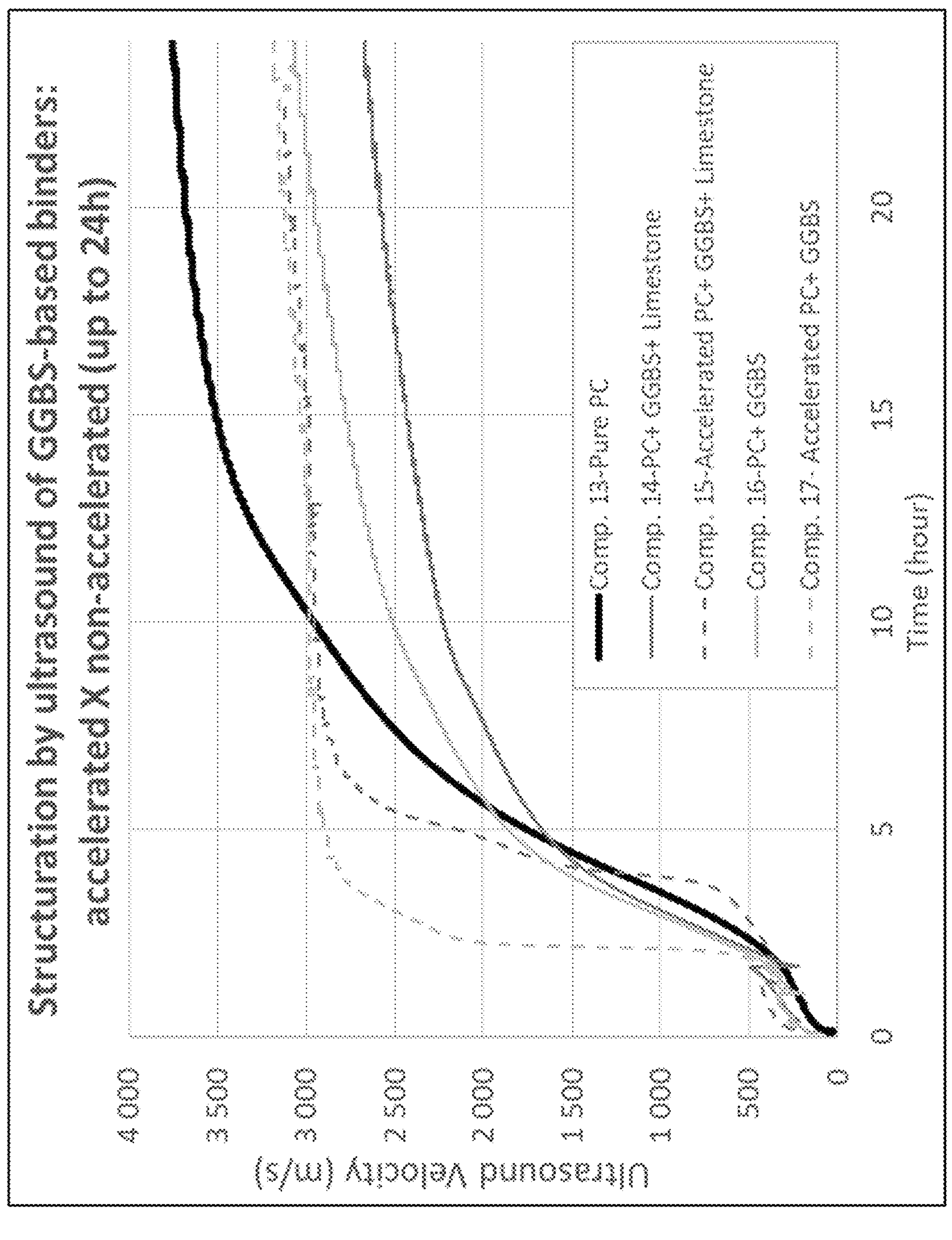

FIG. 22 illustrates the ultrasound velocity of compositions of example 6 for up to 24 hours.

Figure 23:
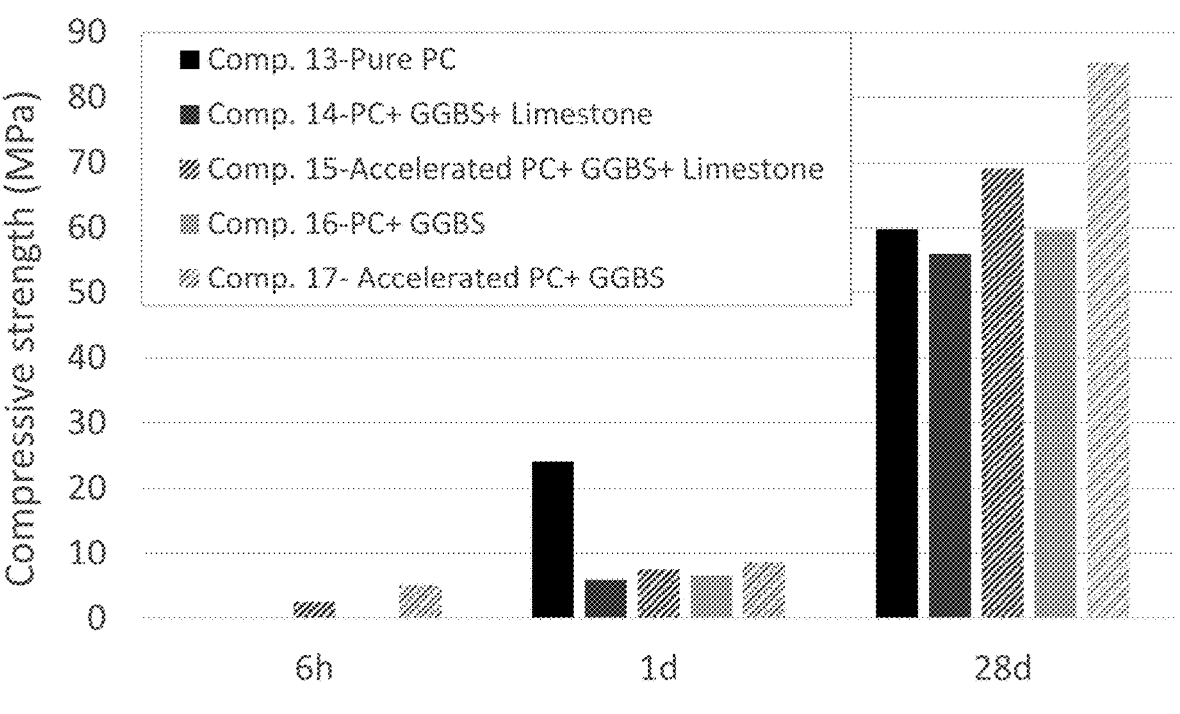

FIG. 23 illustrates the compressive strength of compositions of example 6.

Figure 24:
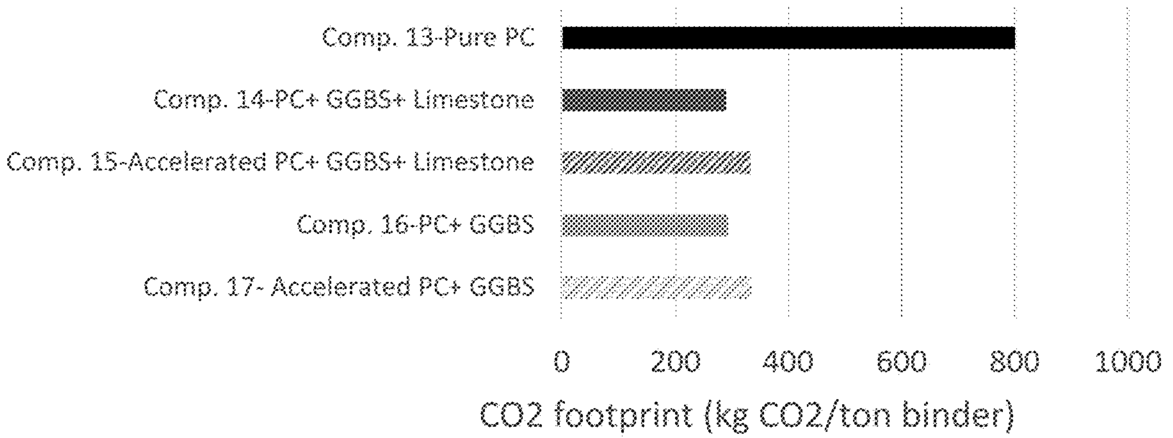

FIG. 24 illustrates the CO2 footprint of compositions of example 6.

Figure 25:
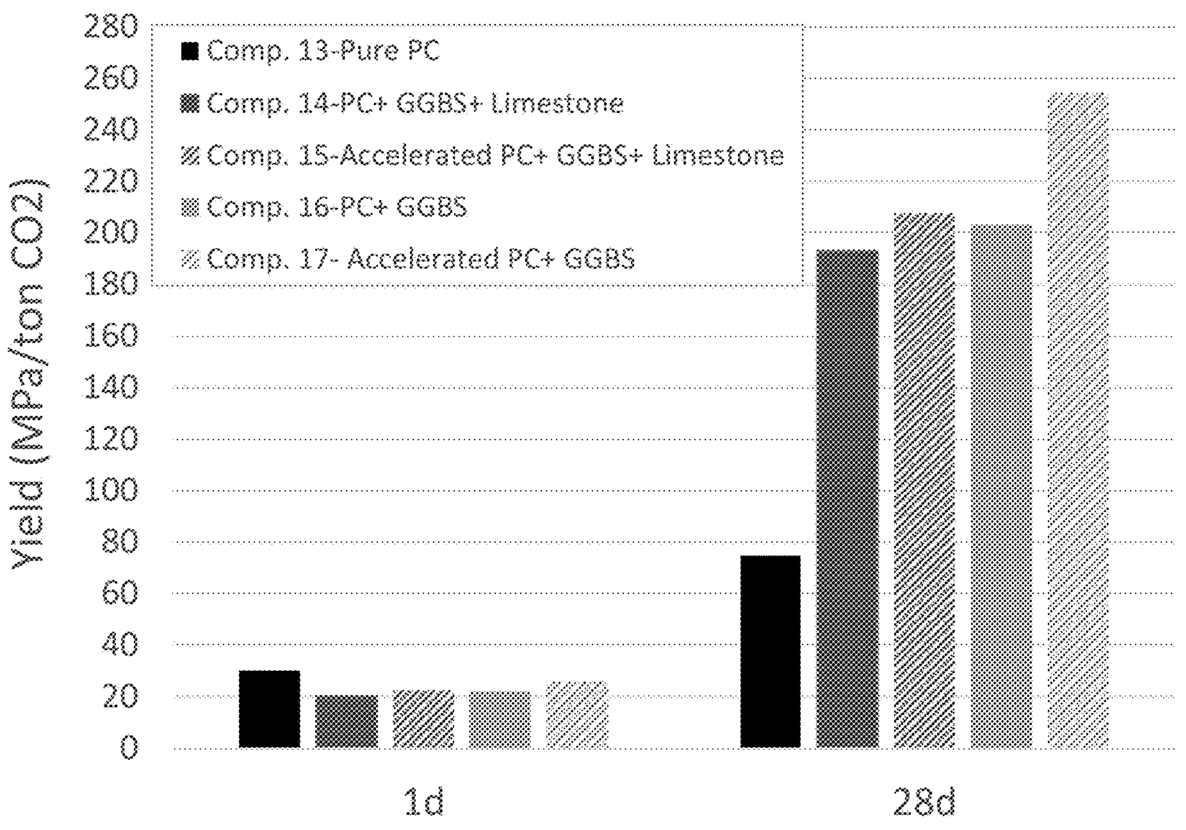

FIG. 25 illustrates the yield at days 1 and 28 of compositions of example 6.

Figure 26:
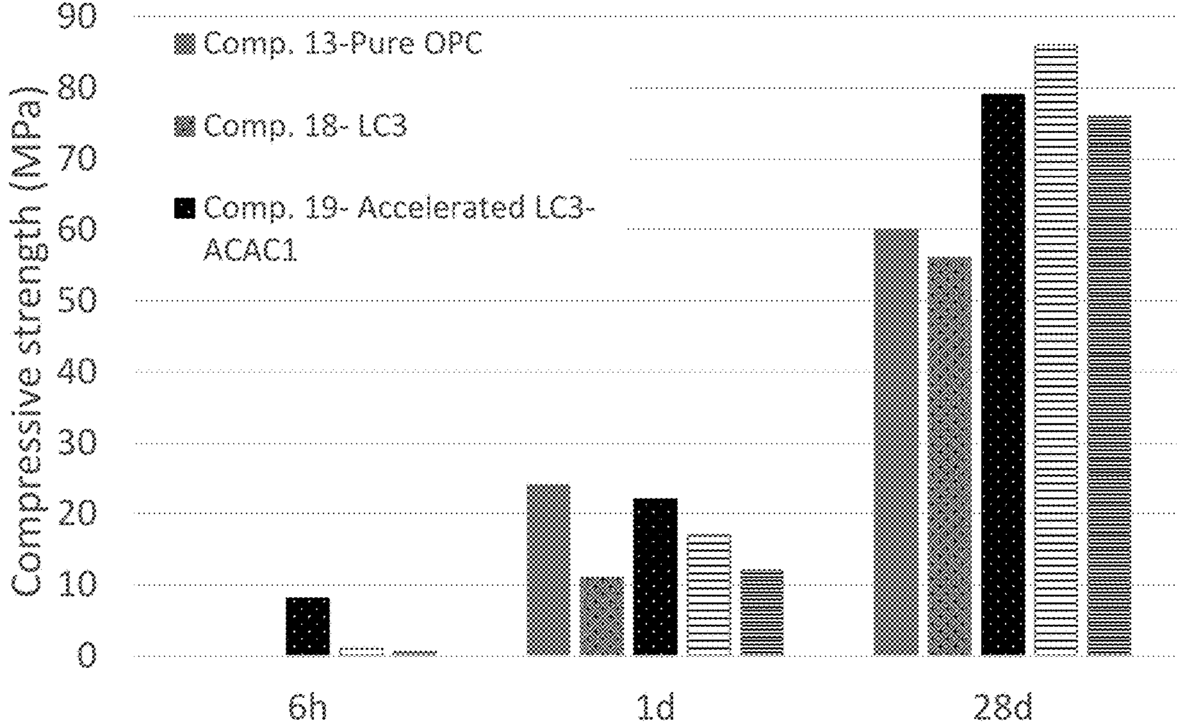

FIG. 26 illustrates the compressive strength of compositions of example 7.

Figure 27:
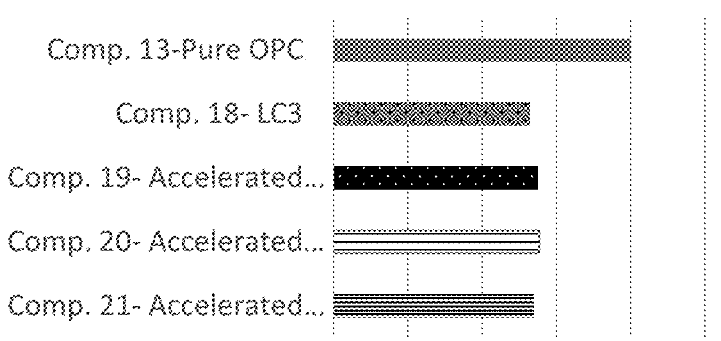

FIG. 27 illustrates the CO2 footprint of compositions of example 7.

Figure 28:
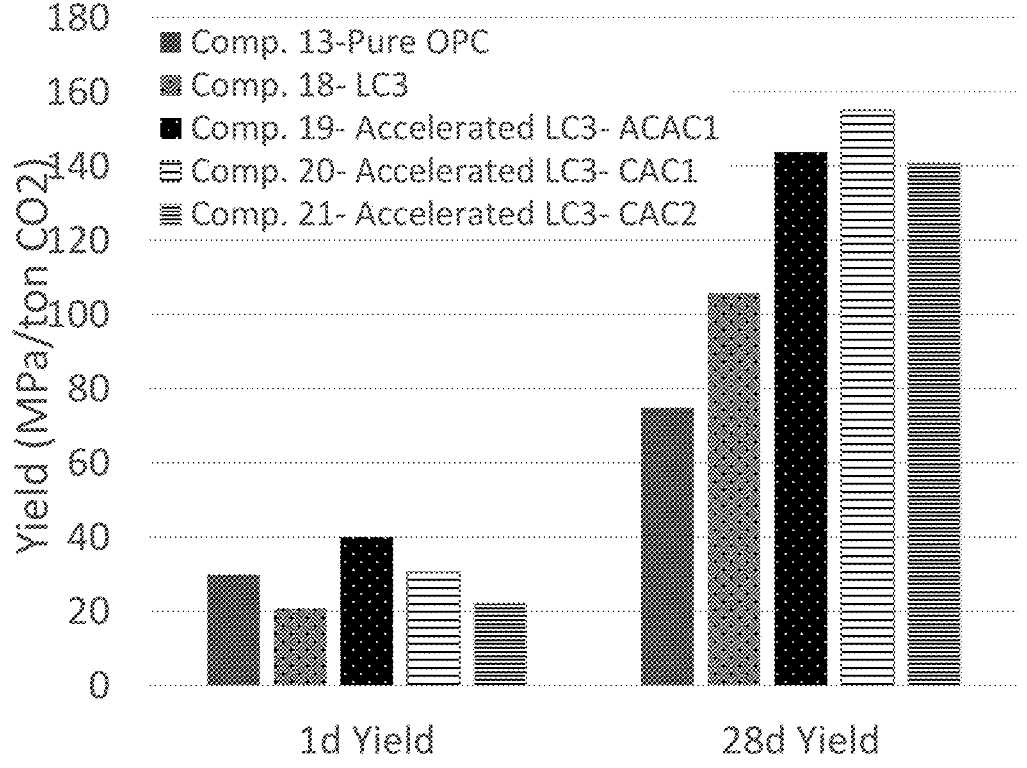

FIG. 28 illustrates the yield at days 1 and 28 of compositions of example 7.

Figure 29:
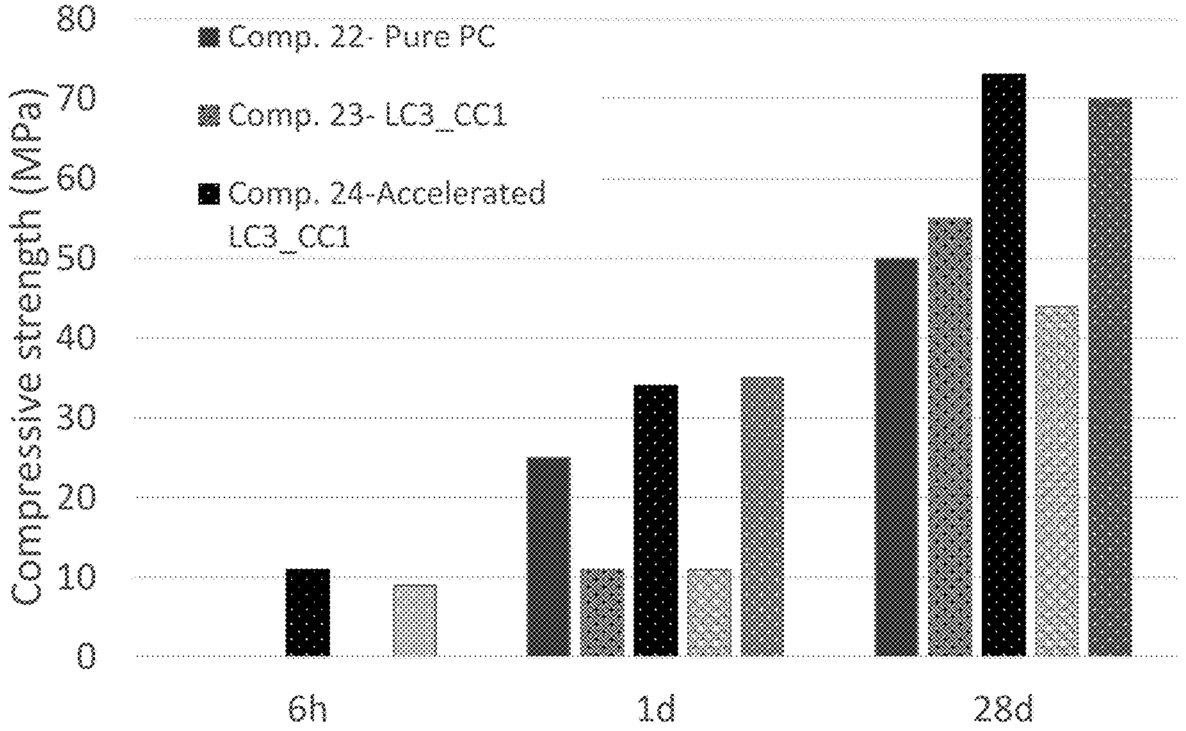

FIG. 29 illustrates the compressive strength of compositions of example 8.

Figure 30:
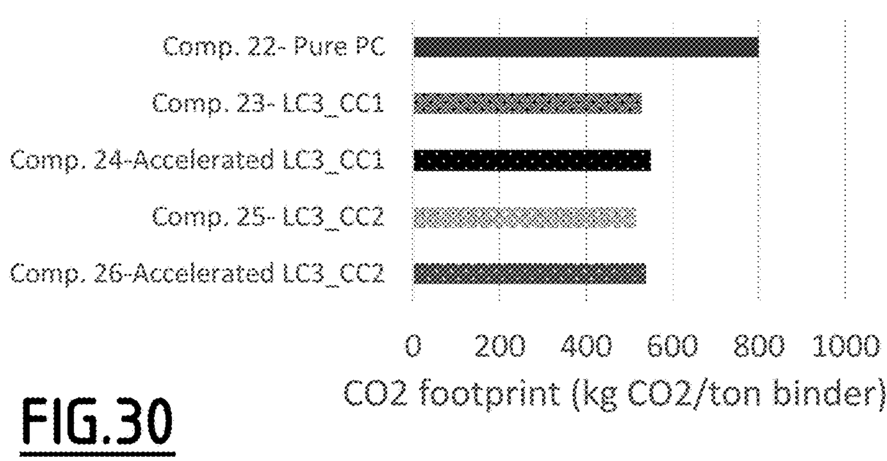

FIG. 30 illustrates the CO2 footprint of compositions of example 8.

Figure 31:
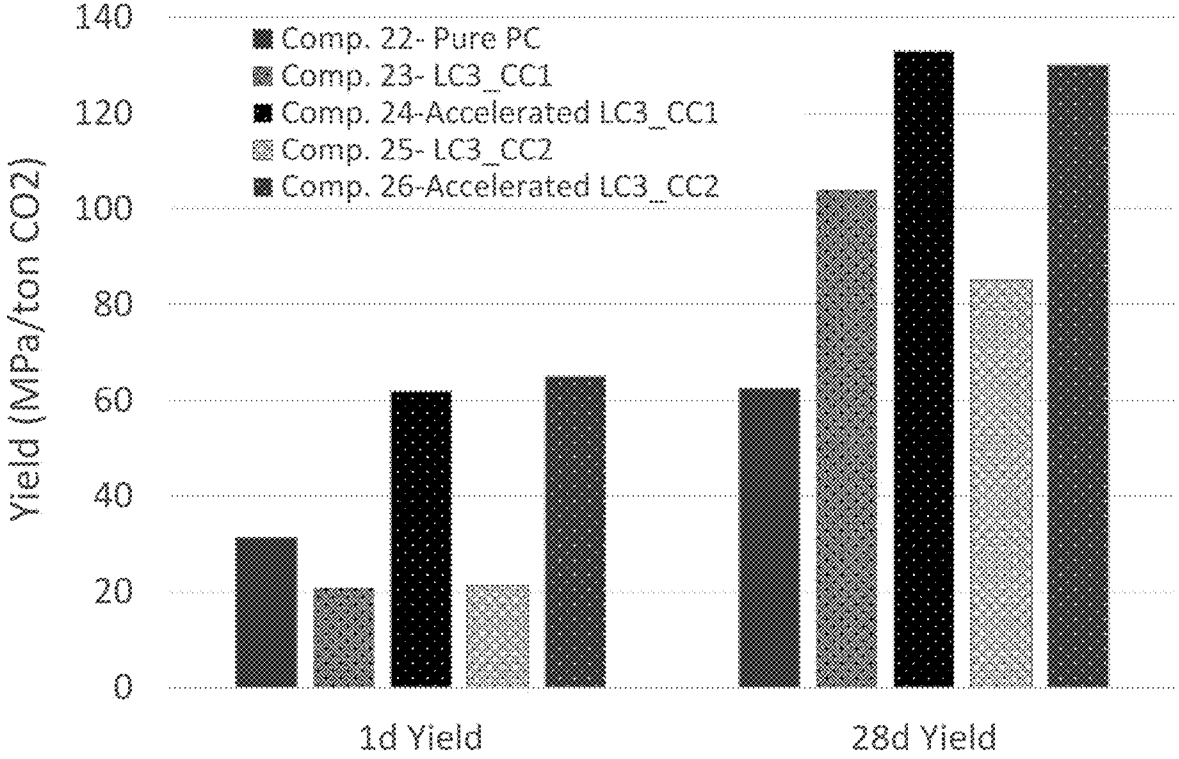

FIG. 31 illustrates the yield at days 1 and 28 of compositions of example 8.

Figure 32:
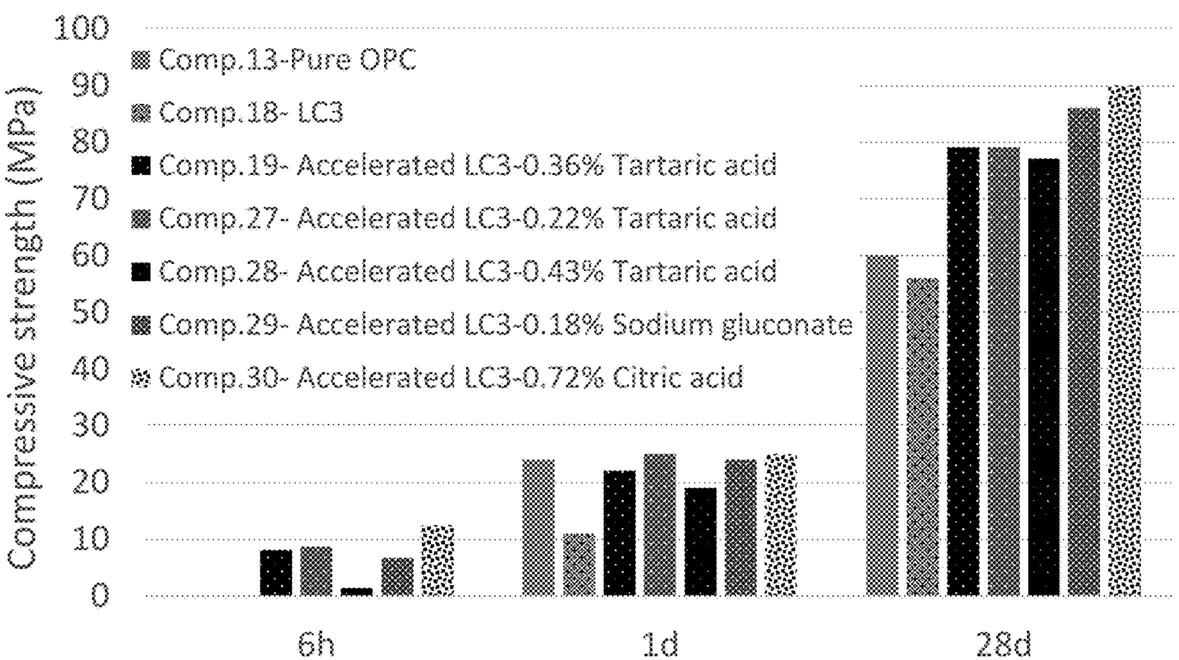

FIG. 32 illustrates the compressive strength of compositions of example 9.

Figure 33:
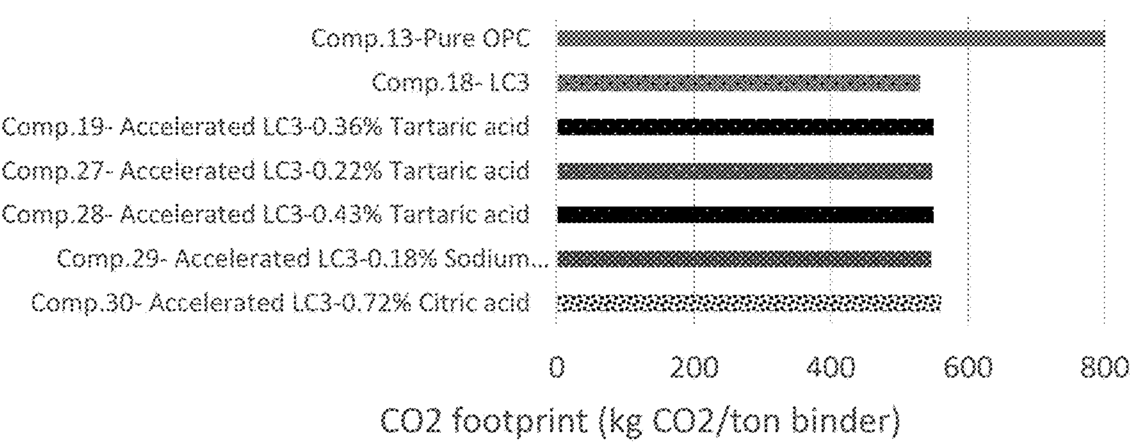

FIG. 33 illustrates the CO2 footprint of compositions of example 9.

Figure 34:
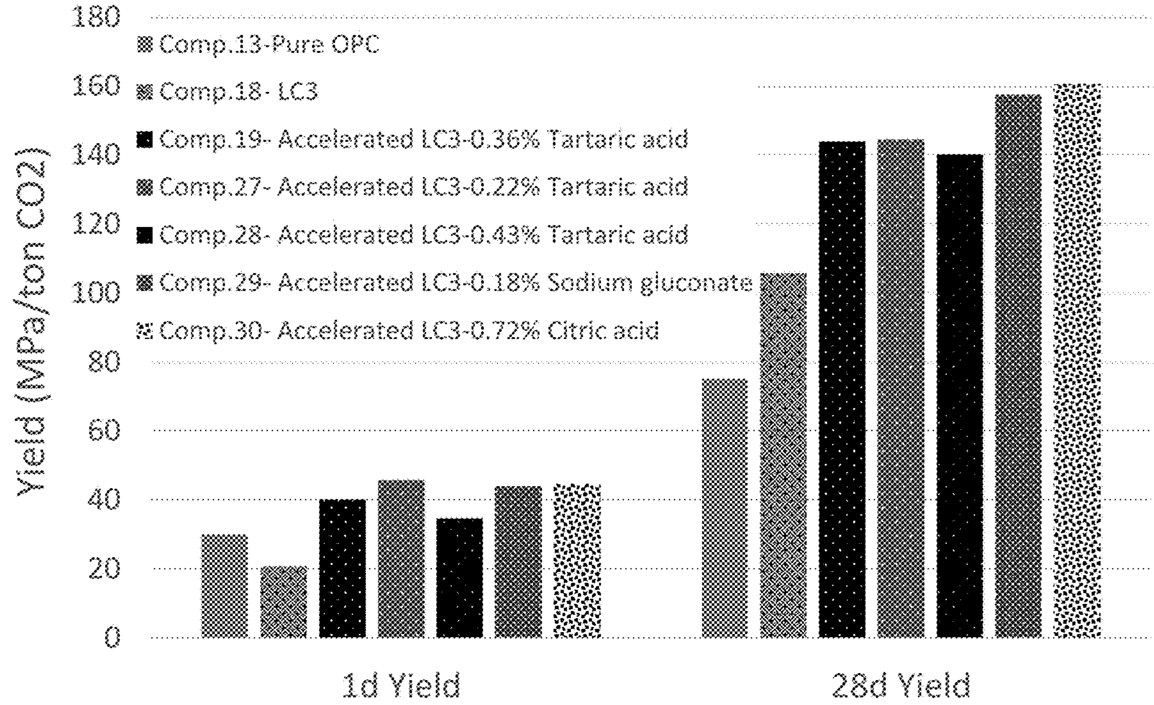

FIG. 34 illustrates the yield at days 1 and 28 of compositions of example 9.

Figure 35:
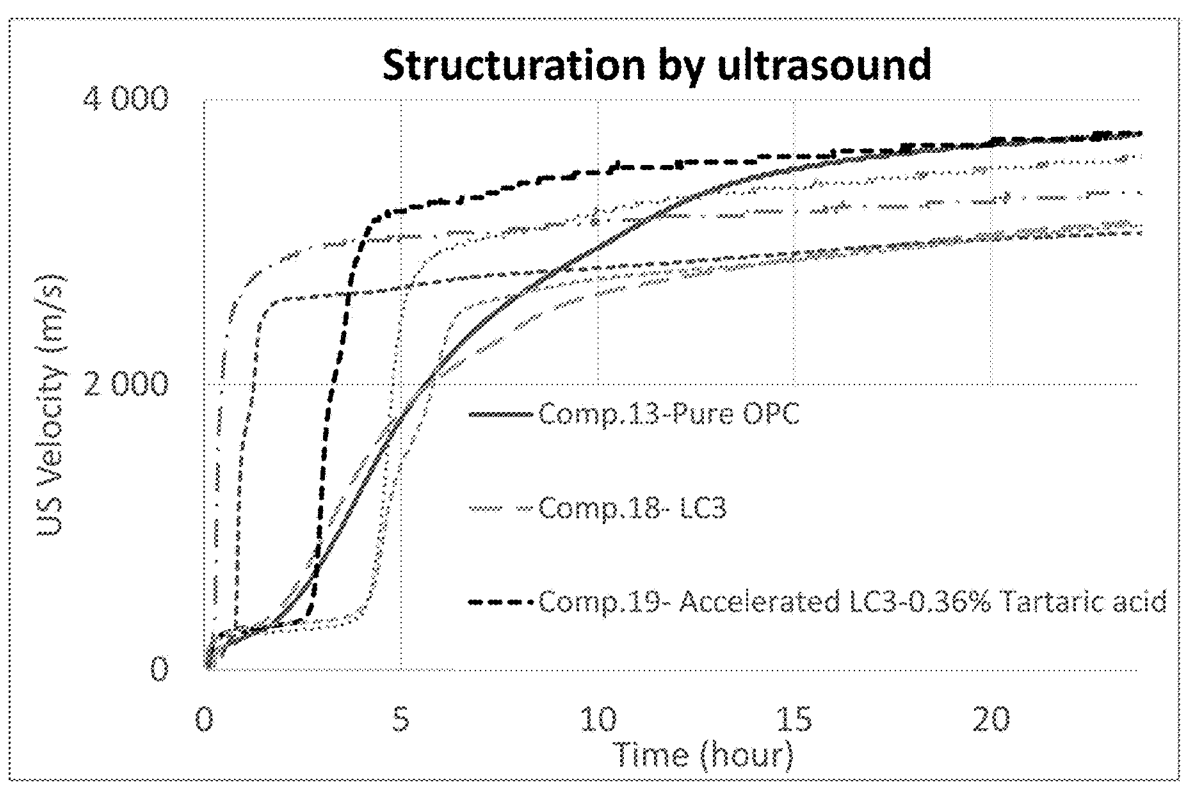

FIG. 35 illustrates the ultrasound velocity of compositions of example 9 for up to 24 hours.

Figure 36:
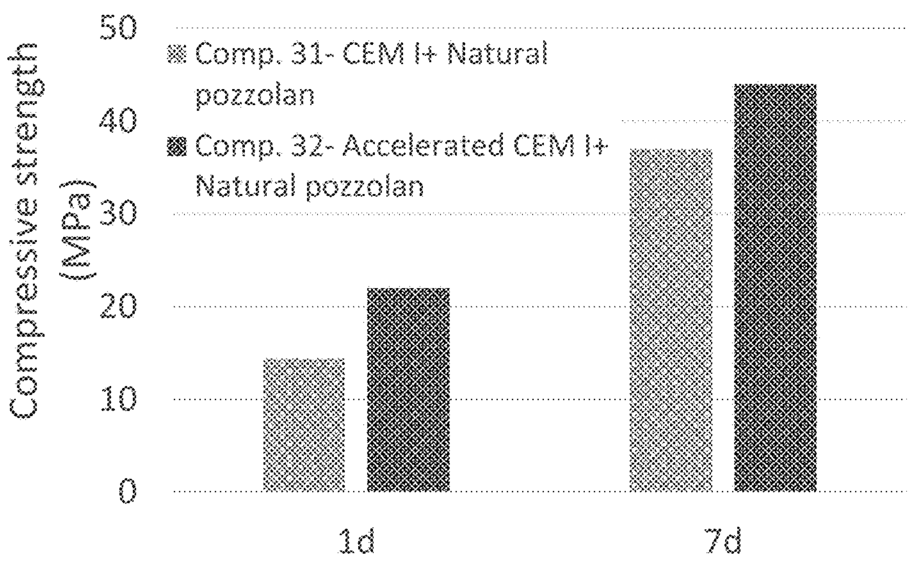

FIG. 36 illustrates the compressive strength of compositions of example 10.

Figure 37:
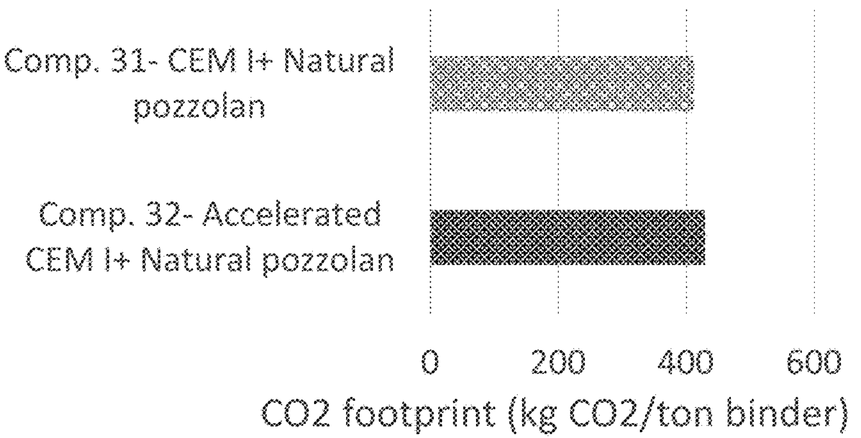

FIG. 37 illustrates the CO2 footprint of compositions of example 10.

Figure 38:
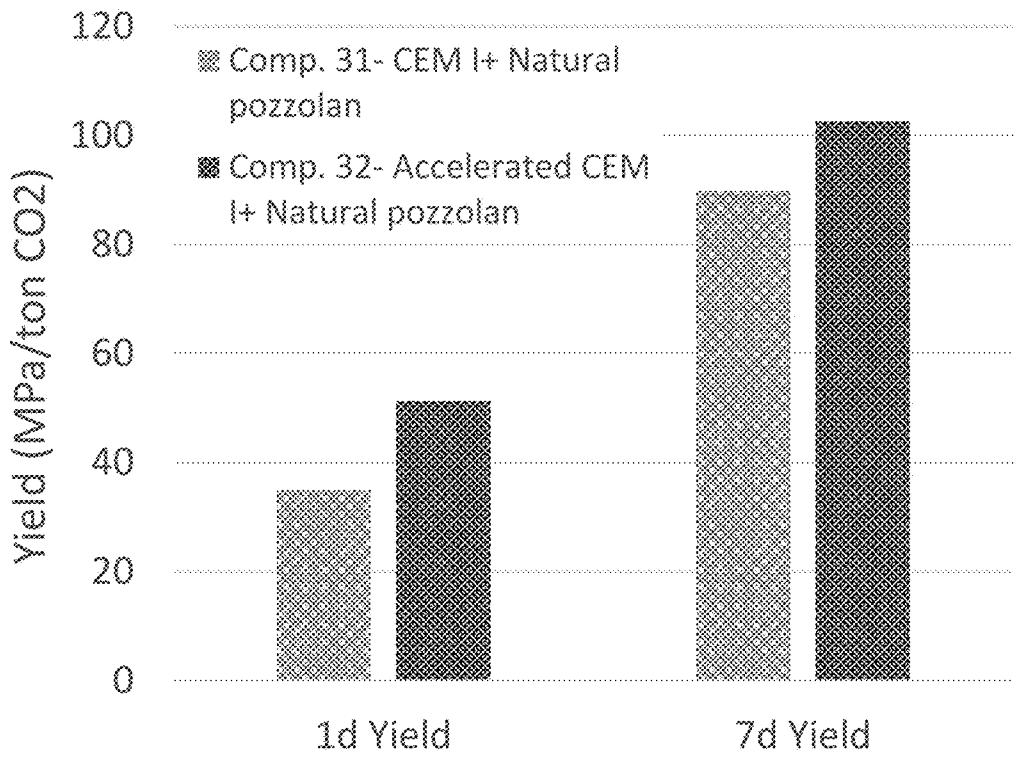

FIG. 38 illustrates the yield at days 1 and 28 of compositions of example 10.

FIG. 36 illustrates the compressive strength of compositions of example 10.

FIG. 37 illustrates the CO2 footprint of compositions of example 10.

FIG. 38 illustrates the yield at days 1 and 28 of compositions of example 10.

Figure 39:
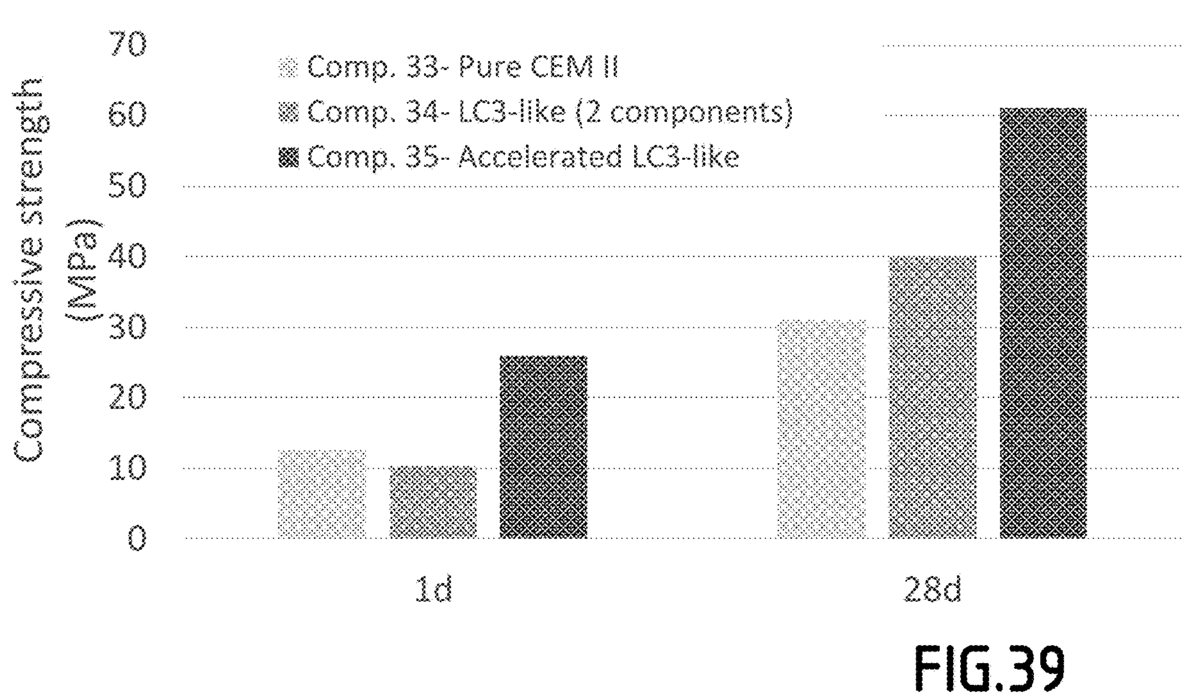

FIG. 39 illustrates the compressive strength of compositions of example 11.

Figure 40:
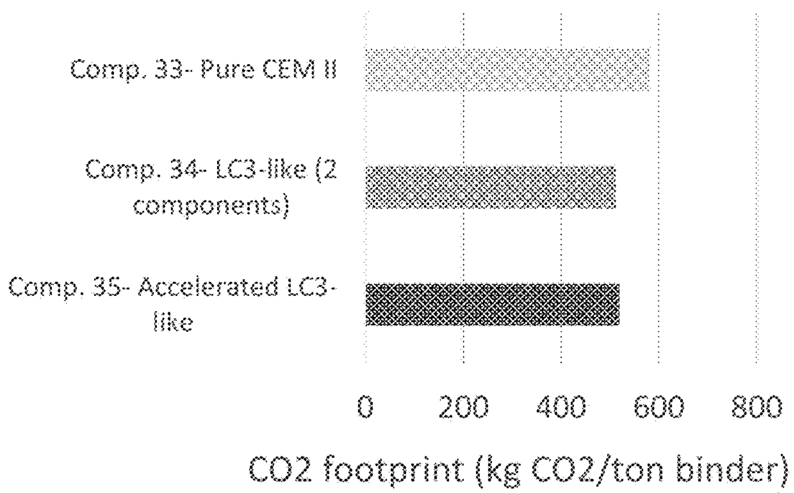

FIG. 40 illustrates the CO2 footprint of compositions of example 11.

Figure 41:
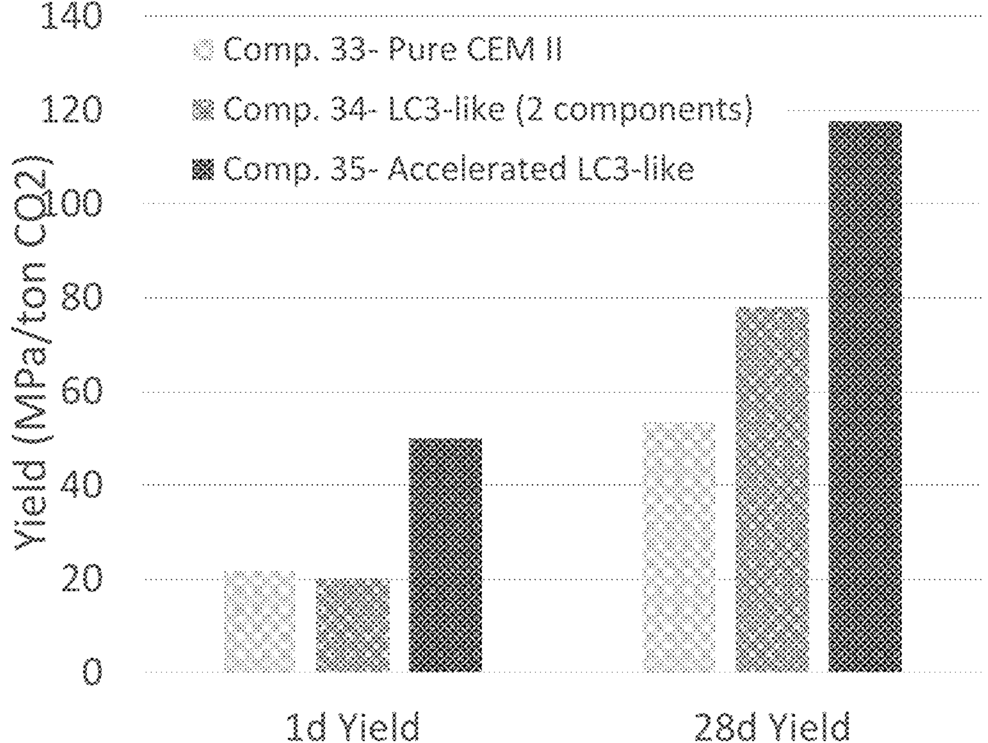

FIG. 41 illustrates the yield at days 1 and 28 of compositions of example 11.

EXAMPLES

The raw materials used in the examples and their respective references are listed below.

TABLE A

| | | |
|---|---|---|
| Portland cement | PC-M | CEM I 52.5R Milke Premium |
| | PC-J | CEM I 52.5N Jura Cement |
| | PC-N | CEM I 42.5N Holcim Normo |
| | PC-A | CEM I 52.5N Aalborg Rapid |
| | PC-S | CEM I 52.5N Saint Pierre La Cour |
| | PC-O | CEM II 32.5N B/LL Optimat de Vicat |
| Calcined Clay | CC1 | Argical M1000 |
| | CC2 | Low kaolinite clay |
| Calcium Sulfates | ANH | Natural anhydrite |
| | G | Natural gypsum |
| Ground granulated blast-furnace slag | GGBS | Slag Ecocem |

TABLE A-continued

| | | |
|---|---|---|
| Natural Pozzolan | Q | Micrasil (natural volcanic glass) |
| Calcium Aluminate | ACAC 1 | Amorphous CAC with C/A = 1.7 and d50 = 5 μm from Imerys |
| | ACAC 2 | Amorphous CAC with C/A = 2.2 from Imerys |
| | ACAC 3 | Amorphous CAC with C/A = 1.7 and d50 = 10 μm from Imerys |
| | CAC 1 | Cristalline CAC with C/A = 1 |
| | CAC 1 | Cristalline CAC with C/A = 1.7 |
| Limestone | LS1 | Imercarb 3 |
| Admixture | CA | Citric acid |
| | TA | Tartaric acid |
| | NC | Sodium carbonate |
| | NG | Sodium gluconate |
| Sand | Qz | Quartz sand with d50 = 6 μm |
| | AF | Afnor sand (Standard sand) |

The main properties of the raw materials are presented in the tables below:

TABLE B

| | Portland Cement | | | | | |
|---|---|---|---|---|---|---|
| | PC-M | PC-J | PC-N | PC-A | PC-S | PC-O |
| | Category | | | | | |
| | CEMI 52.5R | CEM I 52.5N | CEM I 42.5N | CEM I 52.5N | CEM I 52.5N | CEM II 32.5N |
| C3S | 65.8 | 53.8 | 72.4 | 59.2 | 59.6 | 46.8 |
| C2S | 15.0 | 19.8 | 7 | 15.6 | 14.5 | 8.8 |
| C3A | 11.5 | 6.5 | 6.4 | 3.8 | 5.1 | 2.1 |
| C4AF | 1.5 | 9.5 | 8.6 | 11.5 | 10.9 | 10 |
| Calcite | 1.3 | 6.7 | 2 | 4.1 | 2.7 | 26 |
| Gypsum | 0.0 | 3.2 | 2.6 | 4.5 | 2.3 | 2.6 |
| Anhydrite | 4.3 | 0 | 0 | 0.8 | 0.8 | 2.4 |
| Dv50(μm) | 7.2 | 10.0 | 14.2 | 10.9 | 12.0 | 12.4 |
| SSA (m2/g) | 0.85 | 0.48 | 1.41 | NA | NA | NA |
| CO2 kg/t | 800 (average for CEM I) | | | | | 580 |

TABLE C

| | Calcined Clays | CC1 | CC2 |
|---|---|---|---|
| Chemistry by XRF | Al2O3 | 35.30% | 20% |
| | SiO2 | 59.60% | 75% |
| | Fe2O3 | 1.20% | 1% |
| Mineralogy by XRD | Metakaolin | 62.90% | 27% |
| | Impurities | 37.10% | 73% |
| | Dv50(μm) | 6.1 | 6.6 |
| | BET (m2/g) | 19.4 | 6.2 |
| | CO2 kg/t | 240 | 180 |

TABLE D

| | Calcium Sulfates | ANH | G |
|---|---|---|---|
| Chemistry by XRF | CaO | 42 | 33 |
| | SO3 | 57 | 47 |
| | Mineralogy | Anhydrite | Gypsum |
| | Dv50(μm) | 9.5 | 4 |
| | CO2 kg/t | 57 | 10 |

TABLE E

| Calcium Aluminates | ACAC 1 | ACAC 2 | ACAC 3 | CAC 1 | CAC 2 |
|---|---|---|---|---|---|
| CaO | 43.3 | 49.0 | 43.3 | 37.4 | 48.4 |
| Al2O3 | 46.5 | 41.2 | 46.5 | 39.6 | 37.1 |
| SiO2 | 4.7 | 4.0 | 4.7 | 4.4 | 4.6 |
| Fe2O3 | 1.9 | 3.0 | 1.9 | 16.2 | 7.2 |

TABLE E-continued

| Calcium Aluminates | ACAC 1 | ACAC 2 | ACAC 3 | CAC 1 | CAC 2 |
|---|---|---|---|---|---|
| Mineralogy | Amorphous | Amorphous | Amorphous | CA | C12A7 |
| Dv50(μm) | 5.7 | 10 | 12 | 24 | 27 |
| CO2 kg/t | 1250 | 1250 | 1250 | 700 | 700 |

TABLE F

| Limestone wt % | LS1 |
|---|---|
| Dv50(μm) | 5.1 |
| CO2 kg/t | 5 |

TABLE G

| Admixture wt % | CA | TA | NC | NG |
|---|---|---|---|---|
| Nature | citric acid | Tartaric acid | sodium carbonate | Sodium gluconate |
| Dv50(μm) | 200 | 40 | 49 | 85 |
| CO2 kg/t | 7500 | 900 | 1380 | 1670 |

TABLE H

| Sand wt % | Qz | Afnor Sand (AF) |
|---|---|---|
| Dv50(μm) | 6 μm | 0-2 mm |
| Mineralogy | Quartz | Quartz |
| CO2 kg/t | 5 | 5 |

Ground Granulated Blast-Furnace Slag

TABLE I

| | GGBS |
|---|---|
| CaO | 43.6 |
| Al2O3 | 10.3 |
| SiO2 | 36.7 |

TABLE I-continued

| | GGBS |
|---|---|
| $D_v50$(μm) | 12 |
| CO2 kg/t | 20.5 |

Natural pozzolan (Micrasil—Natural Volcanic Glass)

TABLE J

| | Q |
|---|---|
| CaO | 1.4 |
| Al2O3 | 12.7 |
| SiO2 | 77.0 |
| $D_v50$(μm) | 4.8 |
| CO2 kg/t | 100 |

Example 1

The table 1 below shows different compositions of binders. The binders were tested in standard mortars, prepared according to the EN 196-1, composed of 25% binder and 75% sand. The strength values were obtained from the standard mortars, following the testing method described in the EN 196-1, The binders, all in the form of dry powder, were mixed together before the preparation of the mortar.

The binder in Composition 1, which serves as a reference, is composed of pure PC.

The binder in Composition 2 is composed of a mix of PC, calcined clay, limestone and calcium sulfate, thus a LC3-type binder. It also serves as a reference.

The binder in Composition 3 is composed of a mix of PC, calcined clay, limestone, calcium sulfate and CAC, representing an accelerated LC3 binder according to the invention. In it, part of the limestone present in the LC3 is replaced by a mix of CAC and calcium sulfate, at a level of 10% of the total binder content.

The binder in Composition 4 is composed of a mix of PC, quartz, limestone, calcium sulfate and CAC. It is identical to the composition 3, except that the calcined clay is replaced by quartz sand, an inert material. This composition serves to show the effect of the calcined clay, when comparing the compositions 3 and 4.

The binder composition is presented in weight percentage over the total binder weight, the mortar composition is presented in grams.

The compressive strength of each binder is measured from day 1 to day 28, according to EN 196-1. The strength at 1 and 28 days of each Composition is compared to the PC reference and to the LC3 reference.

The CO2 footprint is calculated based on the footprint of each of the constituents of the binder. The footprint of each Composition is compared to the PC and LC3 references.

A Yield of the binders, considering the strength of the associated mortar per unit of CO2, is calculated for 1 and 28 days. Again, the yield of each Composition is compared to the PC and LC3 references.

TABLE 1

| | Composition 1 Pure PC | | | Composition 2 LC3 | | | Composition 3 Accelerated LC3 | | | Composition 4 Accelerated LC3 with inert instead of clay | | |
|---|---|---|---|---|---|---|---|---|---|---|---|---|
| | Material | Binder | Mortar | Material | Binder | Mortar | Material | Binder | Mortar | Material | Binder | Mortar |
| PC | PCN | 100 | 450 | PCN | 52.2 | 234.7 | PCN | 52.2 | 234.7 | PCN | 52.2 | 234.7 |
| Calcined Clay | | | | CC1 | 24.8 | 111.4 | CC1 | 24.8 | 111.4 | | | |
| Calcium | | | | G | 2.3 | 10.5 | G | 2.3 | 10.5 | G | 2.3 | 10.5 |
| Sulfate | | | | | | | ANH | 5 | 22.5 | ANH | 5 | 22.5 |
| CAC | | | | | | | ACAC1 | 5 | 22.5 | ACAC1 | 5 | 22.5 |
| Limestone | | | | LS1 | 19.8 | 89.1 | LS1 | 9.8 | 44.1 | LS1 | 9.8 | 44.1 |
| Admixture | | | | CA | 0.3 | 1.5 | CA | 0.3 | 1.5 | CA | 0.3 | 1.5 |
| | | | | NC | 0.6 | 2.7 | NC | 0.6 | 2.7 | NC | 0.6 | 2.7 |
| Sand | | | | | | | | | | Qz | 24.8 | 111.4 |
| | AF | | 1350 | AF | | 1350 | AF | | 1350 | AF | | 1350 |
| Total dry | | 100 | 1800 | | 100 | 1800 | | 100 | 1800 | | 100 | 1800 |
| Water | | 40 | 225 | | 40 | 225 | | 40 | 225 | | 40 | 225 |
| water/binder | | | 0.5 | | | 0.5 | | | 0.5 | | | 0.5 |
| 1 day strength (MPa) | | | 14 | | | 7.5 | | | 12.5 | | | 14.9 |
| 3 days strength (MPa) | | | 34 | | | 18 | | | 31 | | | 33 |
| 7 days strength (MPa) | | | 42 | | | 38 | | | 60 | | | 39 |
| 28 days strength (MPa) | | | 48 | | | 44.5 | | | 67 | | | 44 |
| 1 d strength/ PC reference | | | 100% | | | 54% | | | 89% | | | 106% |
| 28 d strength/ PC reference | | | 100% | | | 93% | | | 140% | | | 92% |
| 1 d strength/ LC3 reference | | | 187% | | | 100% | | | 167% | | | 199% |
| 28 d strength/ LC3 reference | | | 108% | | | 100% | | | 151% | | | 99% |
| CO2 footprint (kg CO2/ton) | | 800 | | | 477 | | | 542 | | | 484 | |
| CO2 footprint/ PC reference | | 100% | | | 60% | | | 68% | | | 61% | |
| CO2 footprint/ LC3 reference | | 168% | | | 100% | | | 114% | | | 102% | |

TABLE 1-continued

| | Composition 1 Pure PC | | | Composition 2 LC3 | | | Composition 3 Accelerated LC3 | | | Composition 4 Accelerated LC3 with inert instead of clay | | |
|---|---|---|---|---|---|---|---|---|---|---|---|---|
| | Material | Binder | Mortar | Material | Binder | Mortar | Material | Binder | Mortar | Material | Binder | Mortar |
| 1 d Yield (MPa/ton CO2) | | 17.5 | | | 15.7 | | | 23.1 | | | 30.8 | |
| 28 d Yield (MPa/ton CO2) | | 60 | | | 93.3 | | | 123.6 | | | 90.8 | |
| 1 d Yield/ PC reference | | 100% | | | 90% | | | 132% | | | 176% | |
| 28 d Yield/ PC reference | | 100% | | | 156% | | | 206% | | | 151% | |
| 1 d Yield/ LC3 reference | | 111% | | | 100% | | | 147% | | | 196% | |
| 28 d Yield/ LC3 reference | | 64% | | | 100% | | | 132% | | | 97% | |

Figure 1:
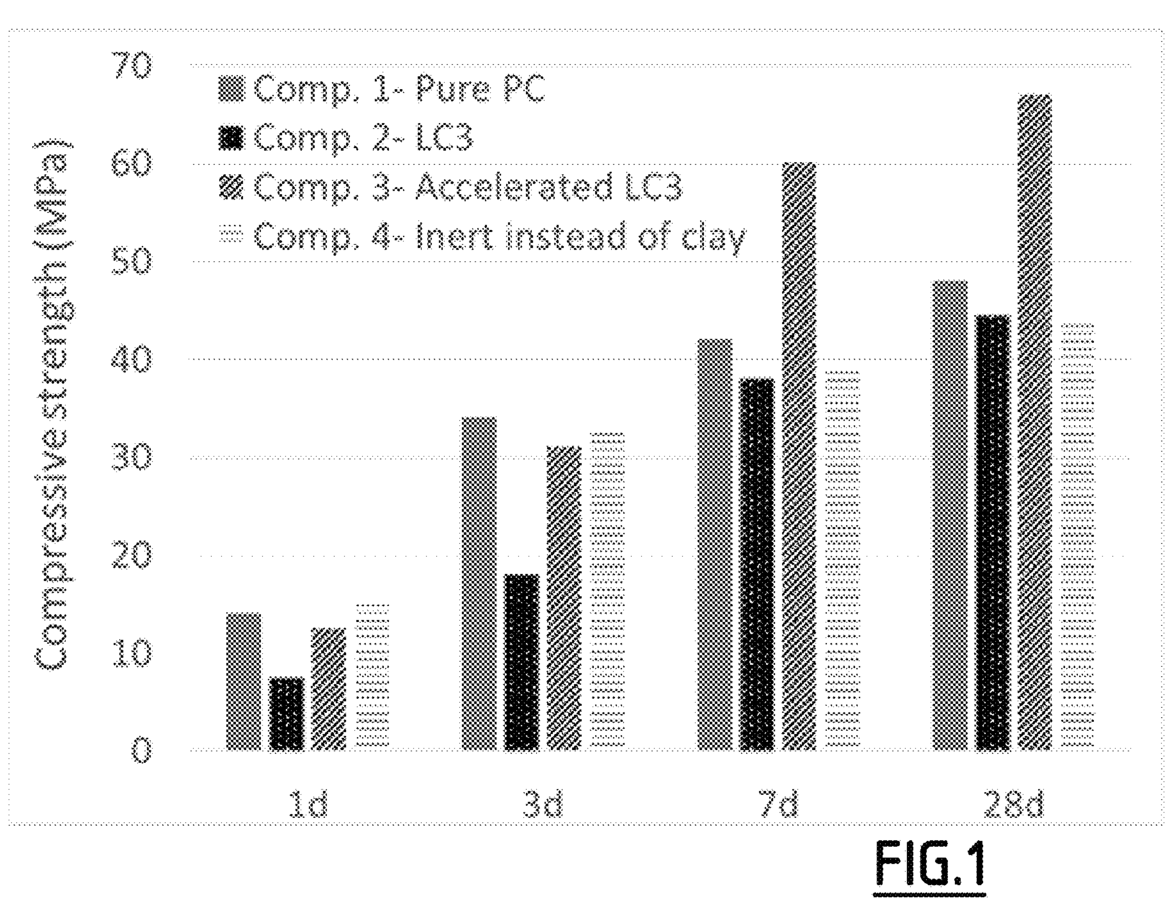

Results are illustrated in FIG. 1.

Figure 2:
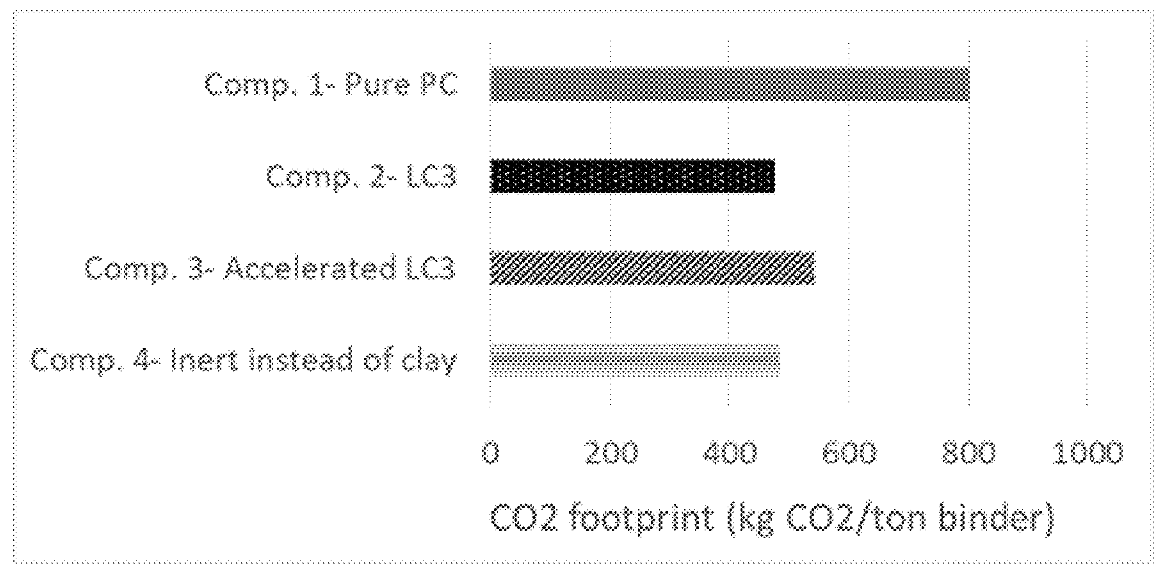

As apparent from FIG. 1, the LC3 binder (Composition 2) exhibits an early strength at 1 day lower than that of the pure PC (Composition 1), whereas the binder of the invention (Composition 3) exhibit an early strength 67% higher than that of the LC3 binder, while having a comparable CO2 footprint, as shown in FIG. 2. Indeed, the accelerated LC3 (Composition 3), has a CO2 footprint only 14% higher than that of the conventional LC3 (Composition 2), and remains 32% lower than that of pure PC.

The Composition 4, with inert filler instead of the calcined clay, shows good early age strengths, suggesting that in the first day the clay has no collaboration to the strength. Its slightly better strengths can be related to the known filler effect.

From 7 days on there is a significant difference between Compositions 3 and 4, indicating that the clay started to hydrate and is now contributing to the strength.

At 28 days, the strength of the LC3 is comparable to that of the pure PC, which is in accordance with the literature. The accelerated LC3, in its turn, has a much higher strength, 51% superior to that of the LC3 system. This significant increase on the later ages'strengths thanks to the addition of CAC and calcium sulfate is unforeseen, as these two binders were expected to improve mainly the early ages'strengths.

No sign of negative interaction between the calcined clay and the CAC was detected. Actually, there seems to exist a positive synergy between the binders, as the long term strengths of the LC3 were greatly improved by the accelerating system according to this invention, as much as the short term ones. The long term strengths were even improved compared to the pure PC system: The accelerated LC3 (Composition 3) delivers 67 MPa at 28 days, compared with 48 MPa for pure PC (composition 1), an increase of 40%, which is highly surprising as the hydraulic binder content of composition 3 is of only 83.3%, compared to 100% of composition 1.

Figure 3:
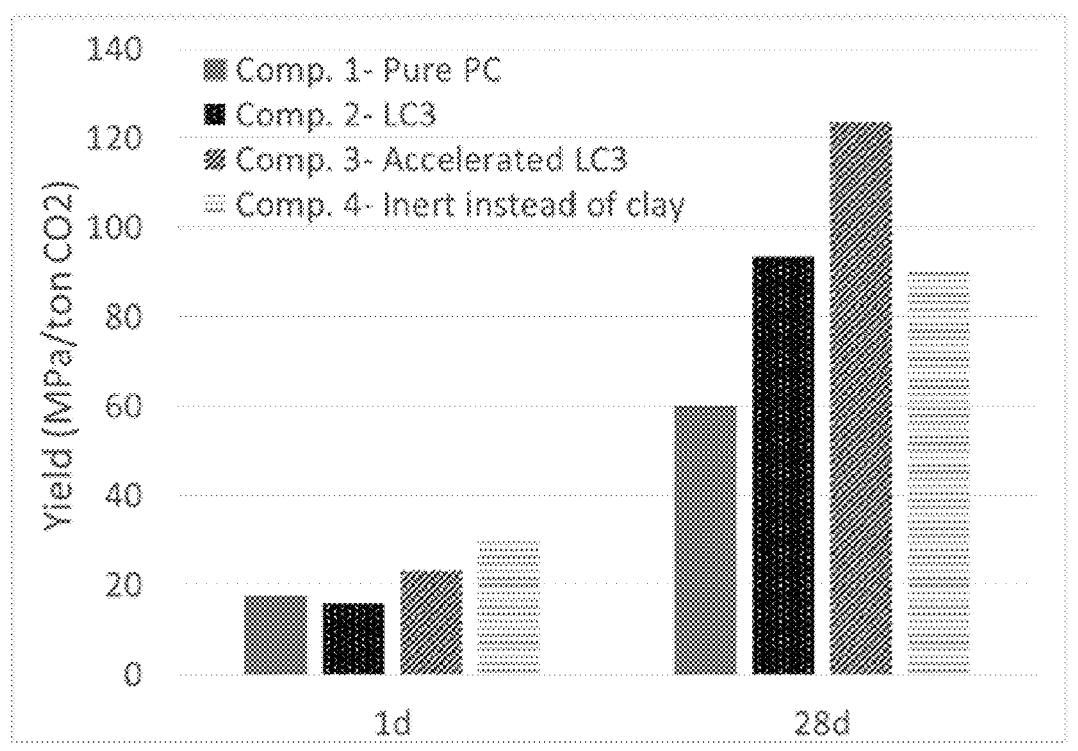

In order to better compare the different formulations, the ratio compressive strength per ton of CO2, here called the yield of the binding system, can be considered. In FIG. 3 is shown the Yield of the 4 compositions.

At 1 day, the yield of the LC3 system is slightly lower than that of pure PC, meaning that more CO2 is emitted in order to reach the same level of strength. At 28 days the trend is inverted, and the yield of the LC3 is 56% better than the PC.

The accelerated LC3, on the other hand, has a better yield than the PC, as well as than the LC3, in both short and long term. At 1 day its yield is 32% better than the PC, and at 28 days, it is 106% higher. It means that the binding system according to this invention delivers two times more strength for a same amount of $CO_2$ than the Portland cement.

Figure 4:
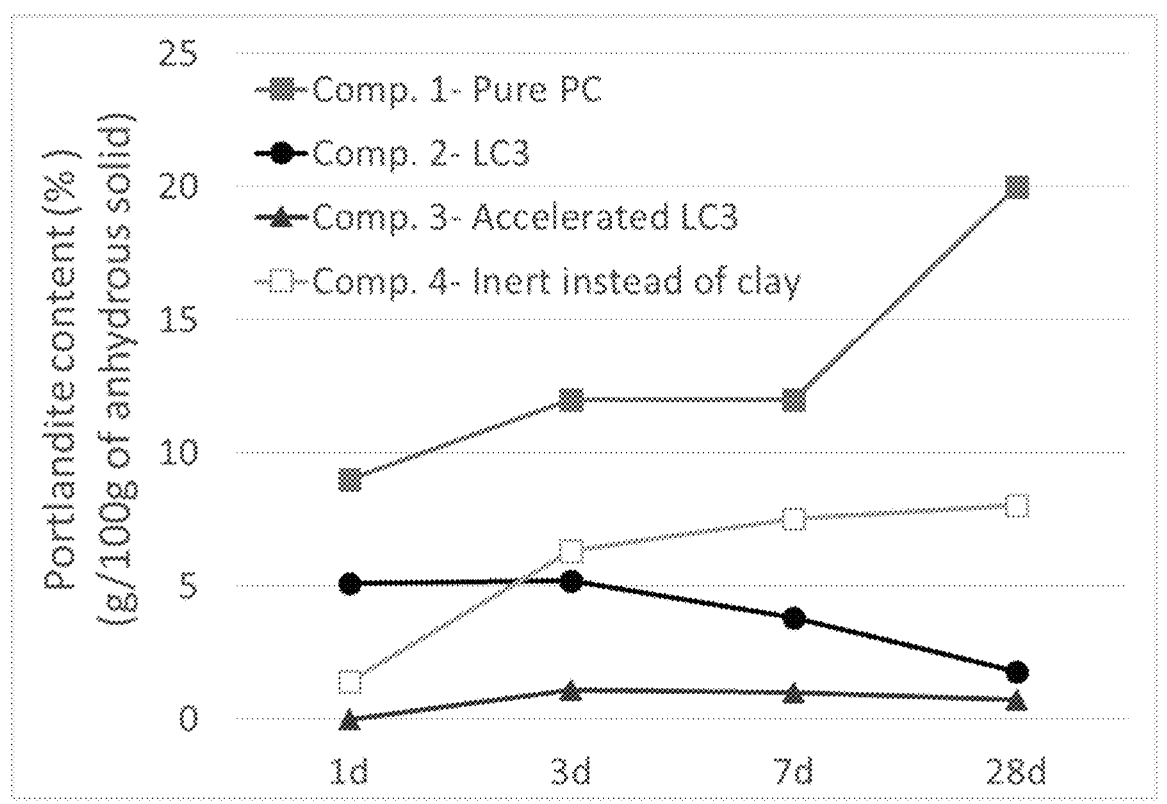

In order to better understand the mechanisms of hydration taking place in these systems, the Compositions 1 to 4 were tested in the form of binder pastes, composed only of the binders according to the description in the table 1 and water, with a water/binder ratio of 0.4. The pastes were then analyzed by XRD in order to quantify their portlandite content at 1, 3, 7 and 28 days. The evolution of the portlandite amount in the system (FIG. 4) is an indirect indication of the evolution of the pozzolanic reaction.

In the pure PC system (compo 1), portlandite is released by the hydration of the PC, and its amount increases over time.

In the LC3 system, as only half of the amount of Portland is present, compared to the pure PC system, about half of the portlandite is expected to be formed, which is observed at 1 day, when the metakaolin has likely not reacted yet. At 3 d, the amount of portlandite is less than half of that of the PC, suggesting that the pozzolanic reaction of the metakaolin started and consumed part of it. From that moment on, the portlandite amount decreases faster, indicating an acceleration of the pozzolanic reaction.

At 28 days the LC3 paste still has some portlandite, but much less than the PC paste, due to its consumption in the pozzolanic reaction of the metakaolin.

In the accelerated LC3 system (compo 3), the portlandite generated by the PC hydration is consumed by the formation of ettringite. Over time, the amount of portlandite remains low, suggesting that it is continuously consumed by the pozzolanic reaction as it is formed by the PC hydration. As with LC3, in the accelerated LC3 systems some portlandite is still present over time, ensuring protection of the concrete reinforcement.

For the Composition 4, where the calcined clay is replaced by inert quartz, after 1 day, the portlandite amount in the system rises, as it is not consumed by any pozzolanic reaction.

These results confirm that the calcined clay is going through a pozzolanic reaction, which consumes portlandite, and is contributing to the strength development of the system.

Example 2

TABLE 2

| | Composition 1 Pure PC | | | Composition 2 LC3 | | | Composition 3 Accelerated LC3- 10% accelerator | | |
|---|---|---|---|---|---|---|---|---|---|
| | Material | Binder | Mortar | Material | Binder | Mortar | Material | Binder | Mortar |
| PC | PCN | 100 | 450 | PCN | 52.2 | 234.7 | PCN | 52.2 | 234.7 |
| Calcined Clay | | | | CC1 | 24.8 | 111.4 | CC1 | 24.8 | 111.4 |
| Calcium Sulfates | | | | G | 2.3 | 10.5 | G | 2.3 | 10.5 |
| | | | | | | | ANH | 5 | 22.5 |
| CAC | | | | | | | ACAC1 | 5 | 22.5 |
| Limestone | | | | LS1 | 19.8 | 89.1 | LS1 | 9.8 | 44.1 |
| Admixture | | | | CA | 0.3 | 1.5 | CA | 0.3 | 1.5 |
| | | | | NC | 0.6 | 2.7 | NC | 0.6 | 2.7 |
| Sand | AF | | 1350 | AF | | 1350 | AF | | 1350 |
| Total dry | | 100 | 1800 | | 100 | 1800 | | 100 | 1800 |
| Water | | 40 | 225 | | 40 | 225 | | 40 | 225 |
| water/binder | | | 0.5 | | | 0.5 | | | 0.5 |
| 1 day strength (MPa) | | | 14 | | | 7.5 | | | 12.5 |
| 3 days strength (MPa) | | | 34 | | | 18 | | | 31 |
| 7 days strength (MPa) | | | 42 | | | 38 | | | 60 |
| 28 days strength (MPa) | | | 48 | | | 44.5 | | | 67 |
| 1 d strength/ PC reference | | | 100% | | | 54% | | | 89% |
| 28 d strength/ PC reference | | | 100% | | | 93% | | | 140% |
| 1 d strength/ LC3 reference | | | 187% | | | 100% | | | 167% |
| 28 d strength/ LC3 reference | | | 108% | | | 100% | | | 151% |
| CO2 footprint (kg CO2/ton) | | 800 | | | 477 | | | 542 | |
| CO2 footprint/ PC reference | | 100% | | | 60% | | | 68% | |
| CO2 footprint/ LC3 reference | | 168% | | | 100% | | | 114% | |
| 1 d Yield (MPa/ton CO2) | | 17.5 | | | 15.7 | | | 23.1 | |
| 28 d Yield (MPa/ton CO2) | | 60 | | | 93.3 | | | 123.6 | |
| 1 d Yield/ PC reference | | 100% | | | 90% | | | 132% | |
| 28 d Yield/ PC reference | | 100% | | | 156% | | | 206% | |
| 1 d Yield/ LC3 reference | | 111% | | | 100% | | | 147% | |
| 28 d Yield/ LC3 reference | | 64% | | | 100% | | | 132% | |

| | Composition 5 Accelerated LC3- 5% accelerator | | | Composition 6 Accelerated LC3- 7% accelerator | | |
|---|---|---|---|---|---|---|
| | Material | Binder | Mortar | Material | Binder | Mortar |
| PC | PCN | 52.2 | 234.7 | PCN | 52.2 | 234.8 |
| Calcined Clay | CC1 | 24.8 | 111.4 | CC1 | 24.8 | 111.4 |
| Calcium | G | 2.3 | 10.5 | G | 2.3 | 10.5 |
| Sulfates | ANH | 2.5 | 11.3 | ANH | 3.5 | 15.7 |
| CAC | ACAC1 | 2.5 | 11.3 | ACAC1 | 3.5 | 15.7 |
| Limestone | LS1 | 14.8 | 66.6 | LS1 | 12.8 | 57.6 |
| Admixture | CA | 0.3 | 1.5 | CA | 0.3 | 1.5 |
| | NC | 0.6 | 2.7 | NC | 0.6 | 2.7 |
| Sand | AF | | 1350 | AF | | 1350 |
| Total dry | | 100 | 1800 | | 100 | 1800 |
| Water | | 40 | 225 | | 40 | 225 |
| water/binder | | | 0.5 | | | 0.5 |
| 1 day strength (MPa) | | | 13 | | | 14 |
| 3 days strength (MPa) | | | 28.5 | | | 30 |
| 7 days strength (MPa) | | | 47.5 | | | 53 |

TABLE 2-continued

| | | | | |
|---|---|---|---|---|
| 28 days strength (MPa) | | 59 | | 61 |
| 1 d strength/ PC reference | | 93% | | 100% |
| 28 d strength/ PC reference | | 123% | | 127% |
| 1 d strength/ LC3 reference | | 173% | | 187% |
| 28 d strength/ LC3 reference | | 133% | | 137% |
| CO2 footprint (kg CO2/ton) | 510 | | 523 | |
| CO2 footprint/ PC reference | 64% | | 65% | |
| CO2 footprint/ LC3 reference | 107% | | 110% | |
| 1 d Yield (MPa/ton CO2) | 25.5 | | 26.8 | |
| 28 d Yield (MPa/ton CO2) | 115.7 | | 116.6 | |
| 1 d Yield/ PC reference | 146% | | 153% | |
| 28 d Yield/ PC reference | 193% | | 194% | |
| 1 d Yield/ LC3 reference | 162% | | 170% | |
| 28 d Yield/ LC3 reference | 124% | | 125% | |

The binders in compositions 3, 5 and 6 are all composed of a mix of PC, calcined day, limestone, calcium sulfate and CAC, containing different proportions of CAC+C$, to illustrate possible variations of the accelerated LC3 binder according to the invention.

The composition 3 contains 10% of accelerating binders (CAC+C$), the composition 5 contains 5% of the same accelerating binders, and the composition 6 contains 7% of it. The accelerating binder replaces the equivalent amount of limestone in the compositions, keeping the total binder amount constant in all of them.

Figure 5:
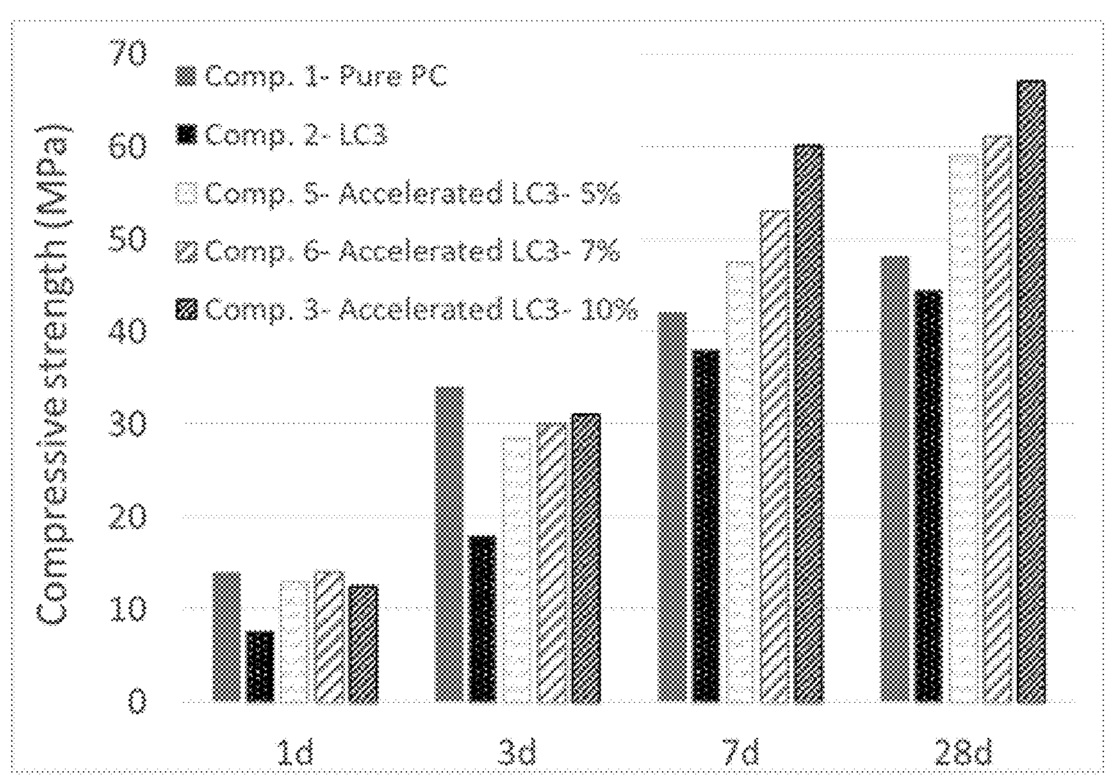

FIG. 5 illustrates the effect of the amount of CAC and calcium sulfate in the binder. It compares the three compositions with different amounts of accelerating binder among them, and to the references—Composition 1—Pure PC and Composition 2—LC3.

When adding increasing amounts of a combination of CAC and calcium sulfate, in replacement of part of the limestone (5%, 7% and 10% relative to the total binder amount), the short term strengths are increased (respectively by 73%, 87% and 67% compared to the reference LC3). This is expected thanks to the high reactivity of the CAC. Interestingly, the amount of accelerator seems to have little effect on the strength reached at one day, as compositions 3, 5 and 6 have similar strengths.

More surprisingly, the long term strengths are much improved by the addition of accelerating binder, leading to performances better than even the pure PC. This strong positive effect on the long term strengths suggests again a synergy of the accelerating binder with the pozzolanic reaction of the metakaolin. Here, higher amounts of accelerating binder lead to more significant rises in the long term strength, up to 51% increase.

Figure 6:
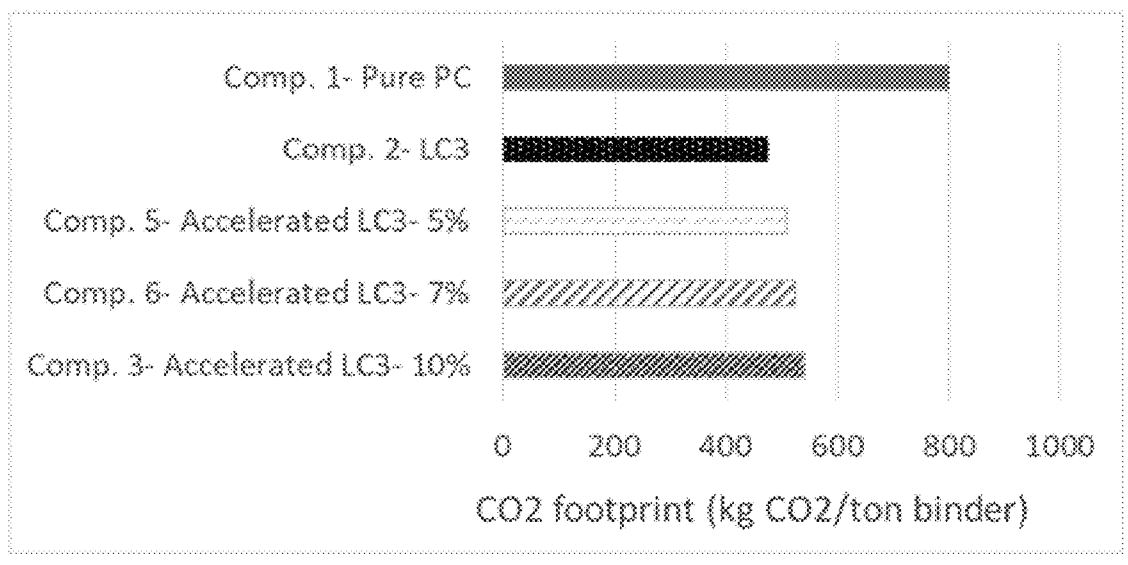

As seen in FIG. 6, the addition of the accelerating binder has only a small impact on the $CO_2$ footprint of the binder. All accelerated LC3 systems have a CO2 footprint much lower than that of pure PC (down to 36% lower), while delivering better strengths.

Figure 7:
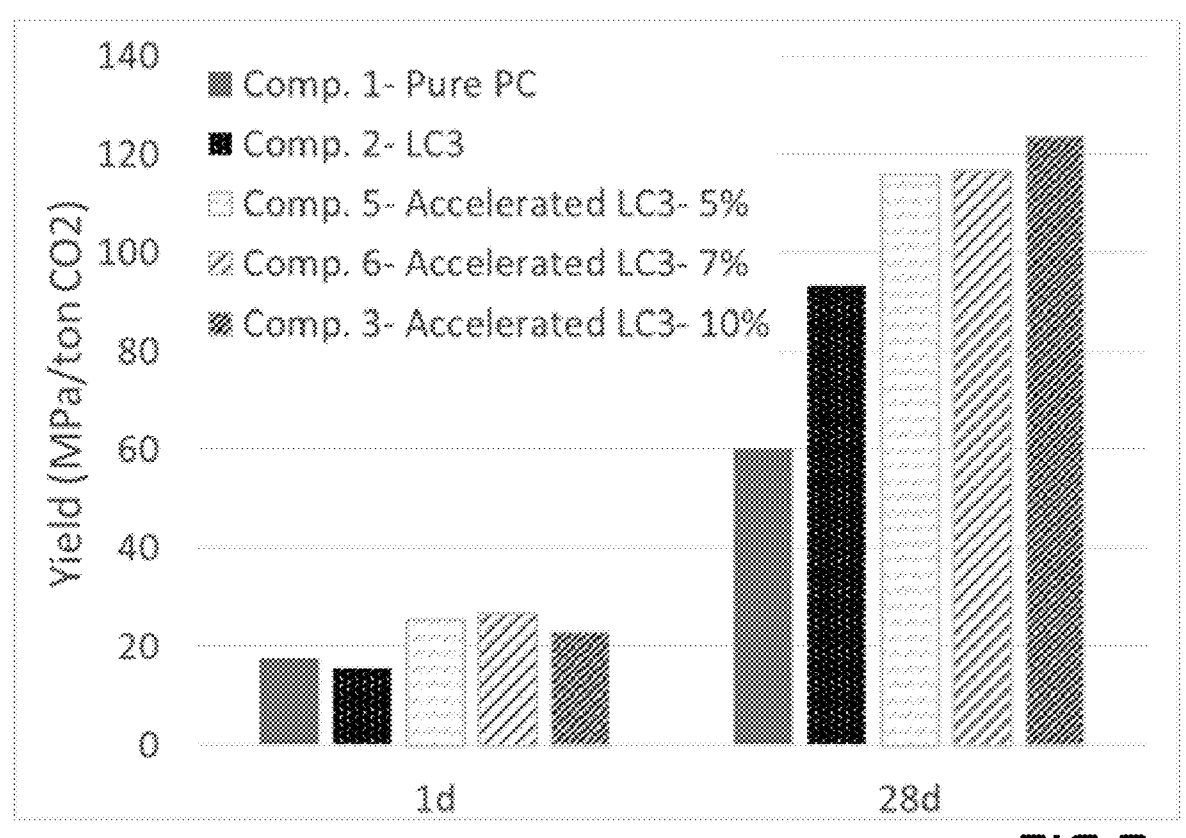

By analyzing the Strength per ton of CO2 yield of the binders (FIG. 7), it can be observed that whatever the amount of accelerating binder, its yield is superior to that of pure PC and of LC3, in both short and long terms.

Figure 8:
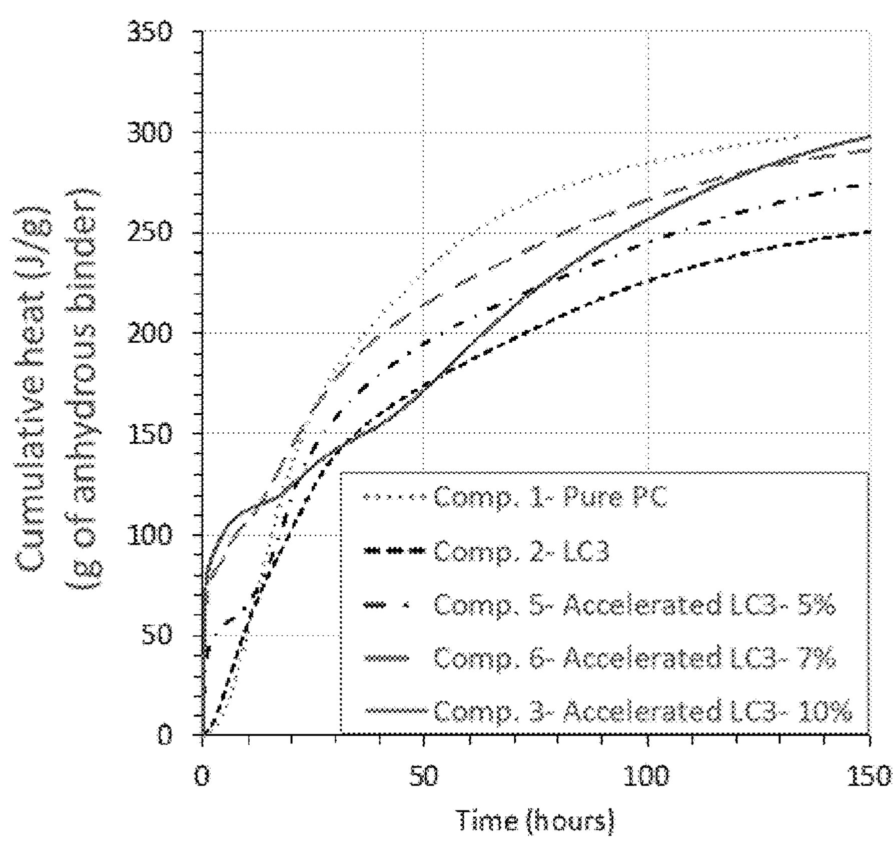

The analysis of the cumulative heat obtained by microcalorimetry, displayed in FIG. 8, shows that by adding increasing amounts of CAC+calcium sulfate the hydration reaction is accelerated, releasing heat earlier.

This faster reaction can be correlated to the quicker strength development observed in the accelerated LC3 systems (compo 3, 5 and 6).

The accelerated systems have a two step reaction, translated in two steps of heat release, more visible for the system with 10% of accelerating binder. Their accumulated heat at 150 h are superior to that of the LC3 system, suggesting that further reaction took place in those systems. The level of heat released at 150 h for the accelerated systems is proportional to the amount of CAC added.

Surprisingly, the heat released by the accelerated LC3 systems at 150 h (6.25 days) is lower or similar to that of the pure PC system, even if at this age their strengths are likely higher than that of pure PC (as at 7 days they are all higher). It suggests that the different reactions are taking place, with different heat to strength ratios.

Example 3

TABLE 3

| | Composition 1 Pure PC | | | Composition 2 LC3- 50% PC | | | Composition 3 Accelerated LC3- 50% PC | | |
|---|---|---|---|---|---|---|---|---|---|
| | Material | Binder | Mortar | Material | Binder | Mortar | Material | Binder | Mortar |
| PC | PCN | 100 | 450 | PCN | 52.2 | 234.7 | PCN | 52.2 | 234.7 |
| Calcined Clay | | | | CC1 | 24.8 | 111.4 | CC1 | 24.8 | 111.4 |
| Calcium Sulfates | | | | G | 2.3 | 10.5 | G | 2.3 | 10.5 |
| | | | | | | | ANH | 5 | 22.5 |
| CAC | | | | | | | ACAC1 | 5 | 22.5 |
| Limestone | | | | LS1 | 19.8 | 89.1 | LS1 | 9.8 | 44.1 |
| Admixture | | | | CA | 0.3 | 1.5 | CA | 0.3 | 1.5 |
| | | | | NC | 0.6 | 2.7 | NC | 0.6 | 2.7 |
| Sand | AF | | 1350 | AF | | 1350 | AF | | 1350 |
| Total dry | | 100 | 1800 | | 100 | 1800 | | 100 | 1800 |
| Water | | 40 | 225 | | 40 | 225 | | 40 | 225 |
| water/binder | | | 0.5 | | | 0.5 | | | 0.5 |
| 1 day strength (MPa) | | | 14 | | | 7.5 | | | 12.5 |
| 3 days strength (MPa) | | | 34 | | | 18 | | | 31 |
| 7 days strength (MPa) | | | 42 | | | 38 | | | 60 |
| 28 days strength (MPa) | | | 48 | | | 44.5 | | | 67 |
| 1 d strength/ PC reference | | | 100% | | | 54% | | | 89% |
| 28 d strength/ PC reference | | | 100% | | | 93% | | | 140% |
| 1 d strength/ LC3 reference | | | 187% | | | 100% | | | 167% |
| 28 d strength/ LC3 reference | | | 108% | | | 100% | | | 151% |
| CO2 footprint (kg CO2/ton) | | 800 | | | 477 | | | 542 | |
| CO2 footprint/ PC reference | | 100% | | | 60% | | | 68% | |
| CO2 footprint/ LC3 reference | | 168% | | | 100% | | | 114% | |
| 1 d Yield (MPa/ton CO2) | | 17.5 | | | 15.7 | | | 23.1 | |
| 28 d Yield (MPa/ton CO2) | | 60 | | | 93.3 | | | 123.6 | |
| 1 d Yield/ PC reference | | 100% | | | 90% | | | 132% | |
| 28 d Yield/ PC reference | | 100% | | | 156% | | | 206% | |
| 1 d Yield/ LC3 reference | | 111% | | | 100% | | | 147% | |
| 28 d Yield/ LC3 reference | | 64% | | | 100% | | | 132% | |

| | Composition 9 Accelerated LC3- 45% PC | | | Composition 10 Accelerated LC3- 40% PC | | |
|---|---|---|---|---|---|---|
| | Material | Binder | Mortar | Material | Binder | Mortar |
| PC | PCN | 45 | 202.5 | PCN | 40 | 180 |
| Calcined Clay | CC1 | 24.76 | 111.42 | CC1 | 24.76 | 111.42 |
| Calcium | G | 2.02 | 9.09 | G | 1.79 | 8.055 |
| Sulfates | ANH | 5 | 22.5 | ANH | 5 | 22.5 |
| CAC | ACAC1 | 5 | 22.5 | ACAC1 | 5 | 22.5 |
| Limestone | LS1 | 17.26 | 77.67 | LS1 | 22.49 | 101.205 |
| Admixture | CA | 0.33 | 1.485 | CA | 0.33 | 1.485 |
| | NC | 0.61 | 2.745 | NC | 0.61 | 2.745 |
| Sand | AF | | 1350 | AF | | 1350 |
| Total dry | | 100 | 1800 | | 100 | 1800 |
| Water | | 40 | 225 | | 40 | 225 |
| water/binder | | | 0.5 | | | 0.5 |
| 1 day strength (MPa) | | | 10 | | | 00 |
| 3 days strength (MPa) | | | 22 | | | 19.5 |
| 7 days strength (MPa) | | | 50 | | | |

TABLE 3-continued

| | | | | |
|---|---|---|---|---|
| 28 days strength (MPa) | | 62 | | 55 |
| 1 d strength/ PC reference | | 71% | | 57% |
| 28 d strength/ PC reference | | 129% | | 115% |
| 1 d strength/ LC3 reference | | 133% | | 107% |
| 28 d strength/ LC3 reference | | 139% | | 124% |
| CO2 footprint (kg CO2/ton) | 485 | | 445 | |
| CO2 footprint/ PC reference | 61% | | 56% | |
| CO2 footprint/ LC3 reference | 102% | | 93% | |
| 1 d Yield (MPa/ton CO2) | 20.6 | | 18 | |
| 28 d Yield (MPa/ton CO2) | 127.8 | | 123.6 | |
| 1 d Yield/ PC reference | 118% | | 103% | |
| 28 d Yield/ PC reference | 213% | | 206% | |
| 1 d Yield/ LC3 reference | 131% | | 114% | |
| 28 d Yield/ LC3 reference | 137% | | 132% | |

The compositions in this example shows the effect of decreasing amounts of PC in the composition of the binder. It compares the Composition 1 (100% PC), the composition 2 (LC3, containing 50% of PC) and the composition 3 (Accelerated LC3 also containing 50% PC) to the:

Composition 9=Accelerated LC3 containing 45% of CEM I. The lower PC amount is compensated by an increase of the limestone, keeping the total binder amount constant. The rest of the composition is identical to the composition 3.

Composition 10=Accelerated LC3 containing 40% of CEM I. The lower PC amount is compensated by an increase of the limestone, keeping the total binder amount constant. The rest of the composition is identical to the composition 3.

Figure 9:
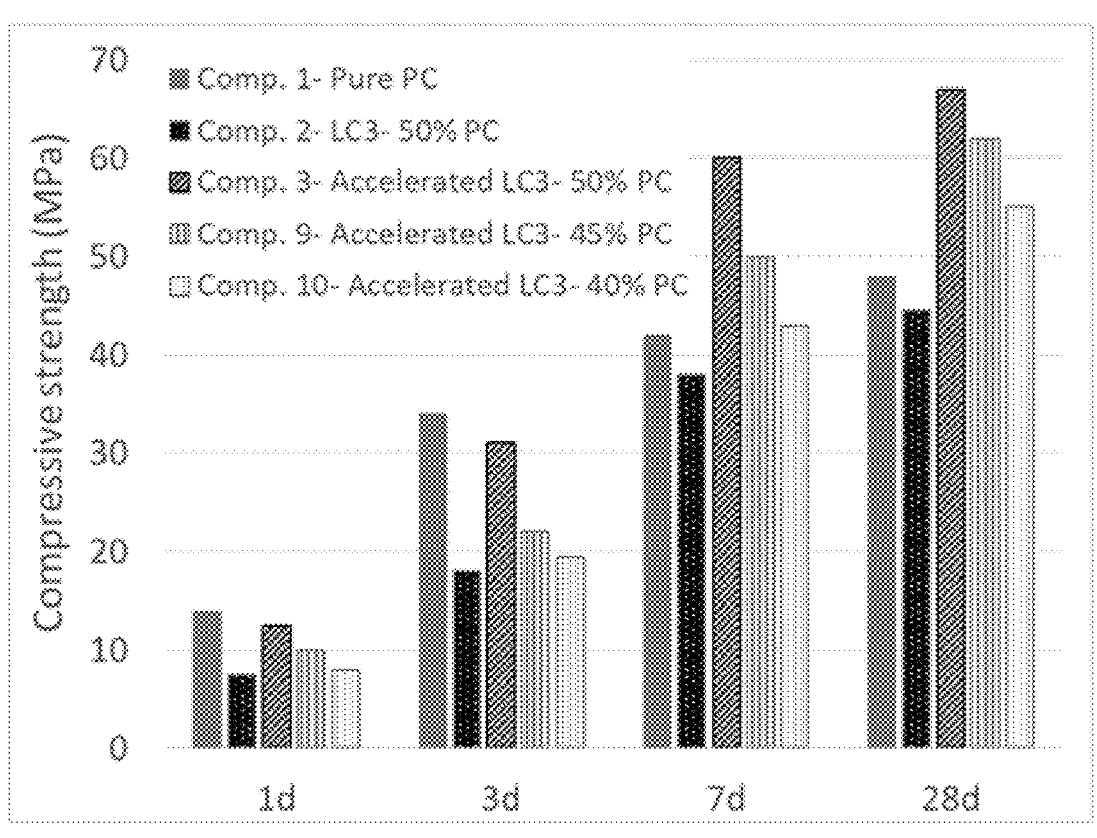

From FIG. 9, it can be observed that the reduction of PC in the accelerated LC3 binders leads to a gradual reduction of the early and later age strengths. At 1 day, the accelerated systems have strengths lower than that of the pure PC, but which remain superior to the LC3 system.

From 7 days on, the accelerated LC3 systems display higher strengths than the pure PC and the LC3, showing that the addition of the accelerating binder, according to this invention, can fully compensate for the reduction of the PC in the binder. The accelerated LC3 system with only 40% of PC in its composition exceeds by 15% the strength of the 100% PC system, and by 24% that of the LC3 containing 50% of PC.

Figure 10:
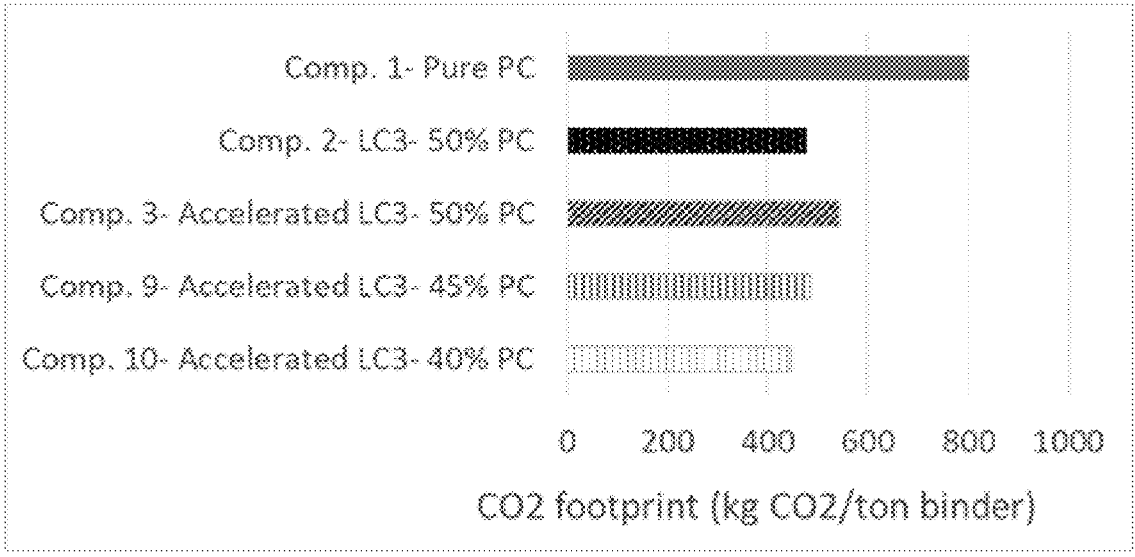

The reduction of the PC amount in the binder leads of course to a reduction of its $CO_2$ footprint, as seen in FIG. 10.

Figure 11:
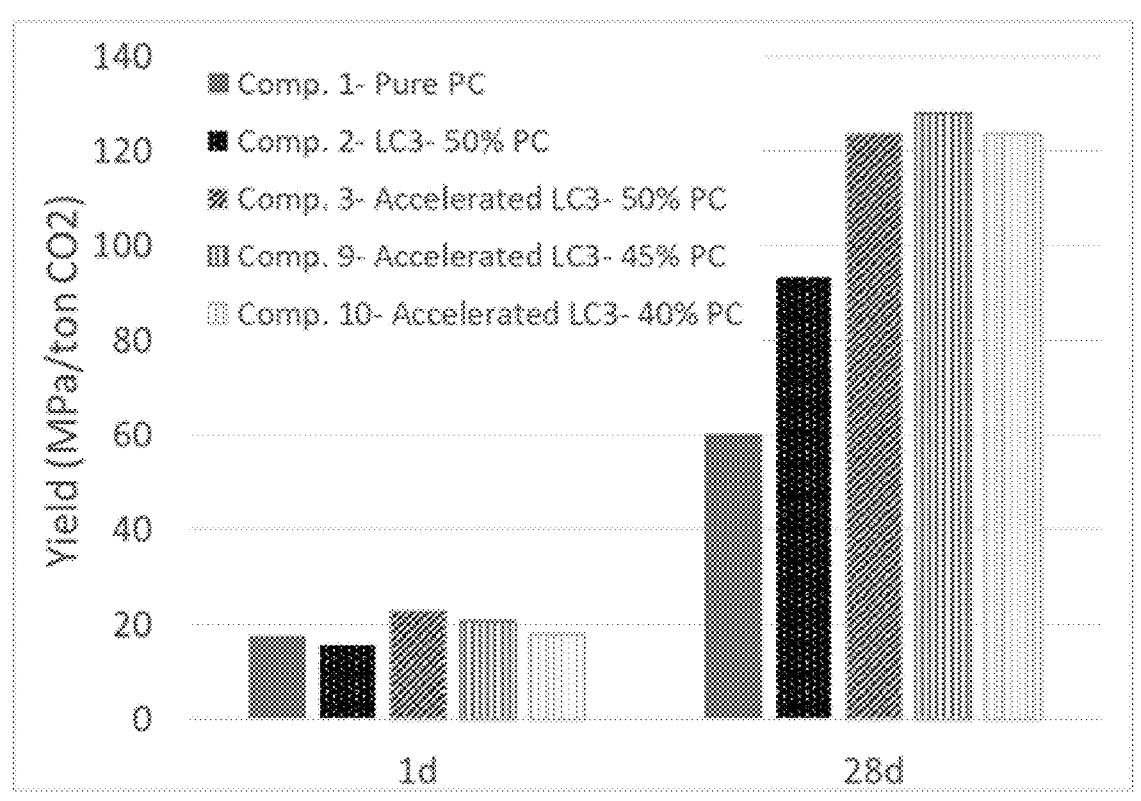

As the reduction of the PC content in the accelerated LC3 systems leads in on hand to the reduction of the strength, and in the other hand to the reduction of their $CO_2$ footprints, the resultant yield is very similar for the compositions 3, 9 and 10 (FIG. 11). They all remain higher than that of the LC3 system, up to 37% better, and of the pure PC, up to 113% better, meaning more than the double of MPa are obtained for each ton of CO2 emitted by the binder.

Example 4

Different natures of PC were tested to illustrate the possible variations of this invention.

The compositions 7-1, 7-2 and 7-3 were based on the CEM I 52.5N Jura cement, while the compositions 8-1, 8-2 and 8-3 were based on the CEM I 52.5E Milke Premium. They are analogous to the compositions 1 (pure PC), 2 (LC3-type binder) and 3 (accelerated LC3-type binder) based on CEM 142.5N Holcim Normo presented above, only the nature of the PC is different.

The comparison of the 3 types of systems for the 3 types of PC will allow to verify if the trends described in the Example 1 are valid for different kinds of PC.

TABLE 4

| | Composition 7-1 Pure PC J | | | Composition 7-2 LC3- PC J | | | Composition 7-3 Accelerated LC3- PC J | | |
|---|---|---|---|---|---|---|---|---|---|
| | Material | Binder | Mortar | Material | Binder | Mortar | Material | Binder | Mortar |
| PC | PCJ | 100 | 450 | PCJ | 52.6 | 236.7 | PCJ | 52.15 | 234.7 |
| Calcined Clay | | | | CC1 | 25 | 112.5 | CC1 | 24.76 | 111.4 |
| Calcium | | | | G | 2.37 | 10.7 | G | 2.34 | 10.5 |
| Sulfates | | | | | | | ANH | 5 | 22.5 |
| CAC | | | | | | | ACAC1 | 5 | 22.5 |

TABLE 4-continued

| | Composition 7-1 Pure PC J | | | Composition 7-2 LC3- PC J | | | Composition 7-3 Accelerated LC3- PC J | | |
|---|---|---|---|---|---|---|---|---|---|
| | Material | Binder | Mortar | Material | Binder | Mortar | Material | Binder | Mortar |
| Limestone | | | | LS1 | 20 | 90 | LS1 | 9.81 | 44.1 |
| Admixture | | | | | | | CA | 0.33 | 1.5 |
| | | | | | | | NC | 0.61 | 2.7 |
| Sand | AF | | 1350 | AF | | 1350 | AF | | 1350 |
| Total dry | | 100 | 1800 | | 100 | 1800 | | 100 | 1800 |
| Water | | 40 | 225 | | 40 | 225 | | 40 | 225 |
| water/binder | | 0.4 | 0.5 | | 0.4 | 0.5 | | 0.4 | 0.5 |
| 1 day strength (MPa) | | | 13 | | | 8.5 | | | 10 |
| 3 days strength (MPa) | | | 34 | | | 19 | | | 26 |
| 7 days strength (MPa) | | | 46 | | | 37 | | | 54 |
| 28 days strength (MPa) | | | 49 | | | 42 | | | 63 |
| 1 d strength/ PC reference | | | 100% | | | 65% | | | 77% |
| 28 d strength/ PC reference | | | 100% | | | 86% | | | 129% |
| 1 d strength/ LC3 reference | | | 153% | | | 100% | | | 118% |
| 28 d strength/ LC3 reference | | | 117% | | | 100% | | | 150% |
| CO2 footprint (kg CO2/ton) | | 800 | | | 481 | | | 542 | |
| CO2 footprint/ PC reference | | 100% | | | 60% | | | 68% | |
| CO2 footprint/ LC3 reference | | 166% | | | 100% | | | 113% | |
| 1 d Yield (MPa/ton CO2) | | 16.25 | | | 17.7 | | | 18.5 | |
| 28 d Yield (MPa/ton CO2) | | 61.3 | | | 87.3 | | | 116.2 | |
| 1 d Yield/ PC reference | | 100% | | | 109% | | | 114% | |
| 28 d Yield/ PC reference | | 100% | | | 143% | | | 190% | |
| 1 d Yield/ LC3 reference | | 92% | | | 100% | | | 104% | |
| 28 d Yield/ LC3 reference | | 70% | | | 100% | | | 133% | |

TABLE 5

| | Composition 8-1 Pure PC M | | | Composition 8-2 LC3- PC M | | | Composition 8-3 Accelerated LC3- PC M | | |
|---|---|---|---|---|---|---|---|---|---|
| | Material | Binder | Mortar | Material | Binder | Mortar | Material | Binder | Mortar |
| PC | PCM | 100 | 450 | PCM | 52.6 | 236.7 | PCM | 52.15 | 234.68 |
| Calcined Clay | | | | CC1 | 25 | 112.5 | CC1 | 24.76 | 111.42 |
| Calcium Sulfates | | | | G | 2.4 | 10.8 | G | 2.34 | 10.53 |
| | | | | | | | ANH | 5 | 22.5 |
| CAC | | | | | | | ACAC1 | 5 | 22.5 |
| Limestone | | | | LS1 | 20 | 90 | LS1 | 9.81 | 44.14 |
| Admixture | | | | | | | CA | 0.33 | 1.48 |
| | | | | | | | NC | 0.61 | 2.74 |
| Sand | AF | | 1350 | AF | | 1350 | AF | | 1350 |
| Total dry | | 100 | 1800 | | 100 | 1800 | | 100 | 1800 |
| Water | | 40 | 225 | | 40 | 225 | | 40 | 225 |
| water/binder | | 0.4 | 0.5 | | 0.4 | 0.5 | | 0.4 | 0.5 |
| 1 day strength (MPa) | | | 25.5 | | | 15 | | | 24 |
| 3 days strength (MPa) | | | 50.5 | | | 28 | | | 41.5 |
| 7 days strength (MPa) | | | 62 | | | 44 | | | 66 |
| 28 days strength (MPa) | | | 74 | | | 56 | | | 71.5 |

TABLE 5-continued

| | Composition 8-1 Pure PC M | | | Composition 8-2 LC3- PC M | | | Composition 8-3 Accelerated LC3- PC M | | |
|---|---|---|---|---|---|---|---|---|---|
| | Material | Binder | Mortar | Material | Binder | Mortar | Material | Binder | Mortar |
| 1 d strength/ PC reference | | | 100% | | | 59% | | | 94% |
| 28 d strength/ PC reference | | | 100% | | | 76% | | | 97% |
| 1 d strength/ LC3 reference | | | 170% | | | 100% | | | 160% |
| 28 d strength/ LC3 reference | | | 132% | | | 100% | | | 128% |
| CO2 footprint (kg CO2/ton) | | 800 | | | 481 | | | 542 | |
| CO2 footprint/ PC reference | | 100% | | | 60% | | | 68% | |
| CO2 footprint/ LC3 reference | | 166% | | | 100% | | | 113% | |
| 1 d Yield (MPa/ton CO2) | | 31.875 | | | 31.2 | | | 44.3 | |
| 28 d Yield (MPa/ton CO2) | | 92.5 | | | 116.4 | | | 131.9 | |
| 1 d Yield/ PC reference | | 100% | | | 98% | | | 139% | |
| 28 d Yield/ PC reference | | 100% | | | 126% | | | 143% | |
| 1 d Yield/ LC3 reference | | 102% | | | 100% | | | 142% | |
| 28 d Yield/ LC3 reference | | 79% | | | 100% | | | 113% | |

Figure 12:
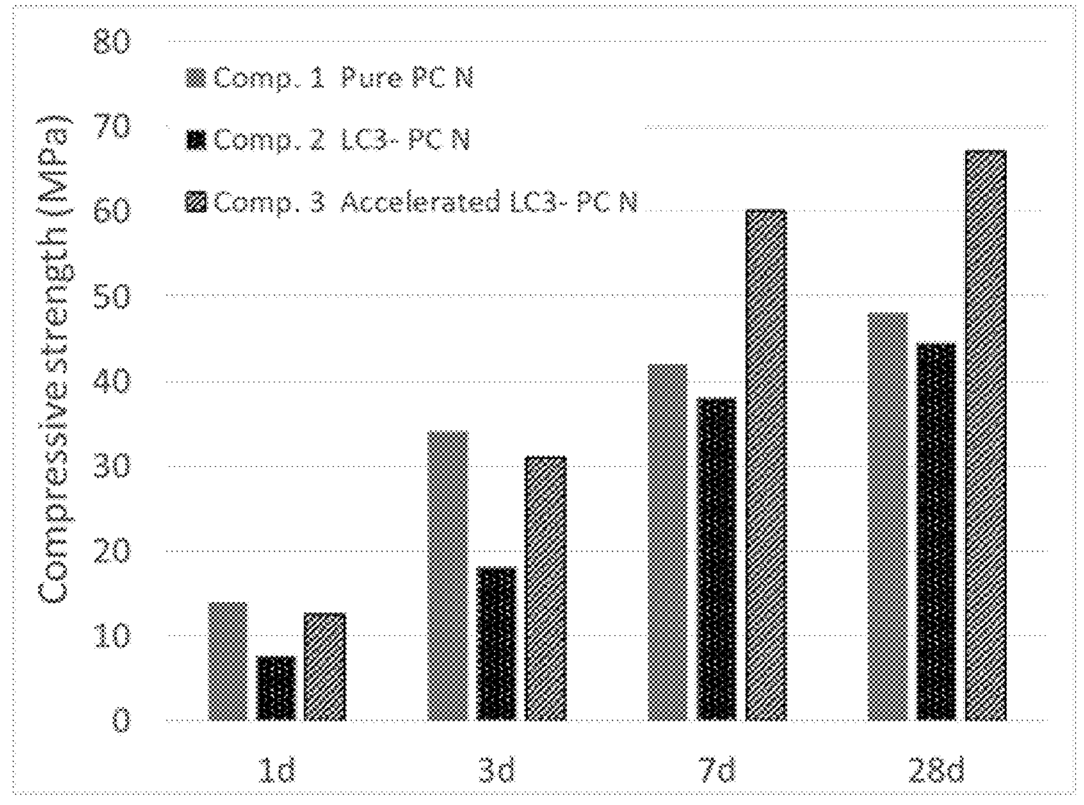
FIG. 12 illustrates the compressive strength between 1 and 28 days of compositions of pure PC, LC3-PC and accelerated LC3 PC with PC N.
Figure 13:
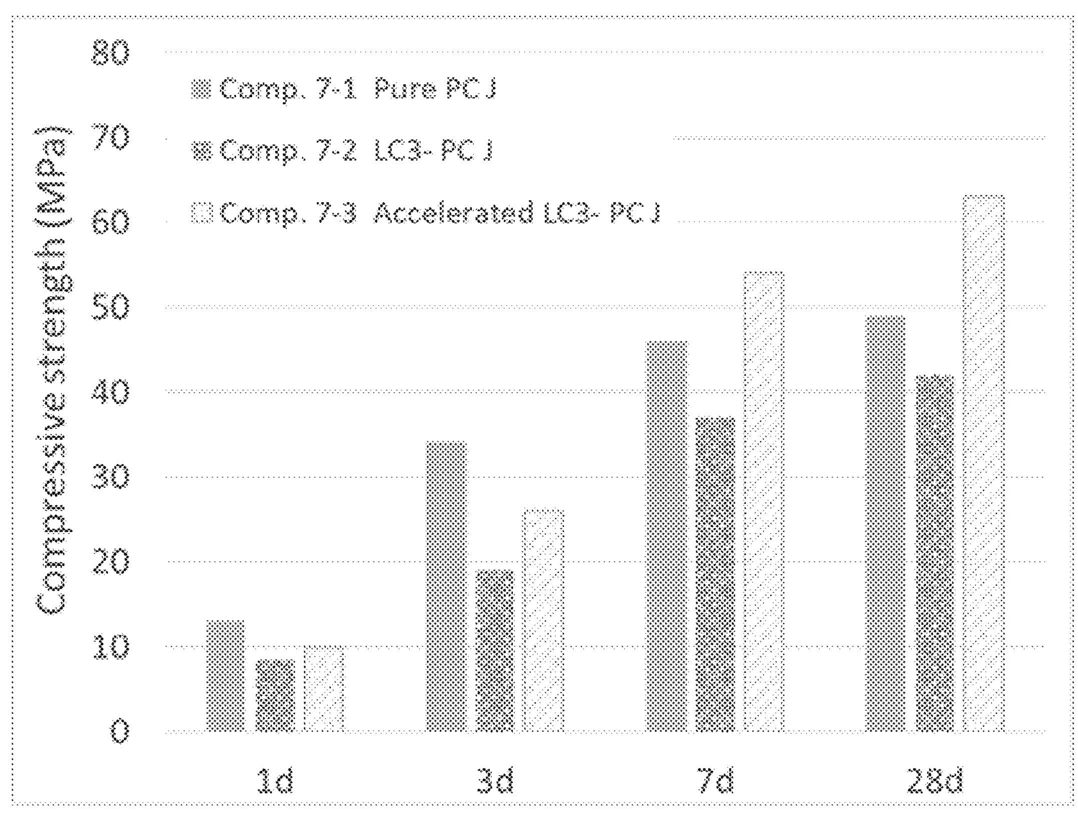
FIG. 13 illustrates the compressive strength between 1 and 28 days of compositions of pure PC, LC3-PC and accelerated LC3 PC with PC J.
Figure 14:
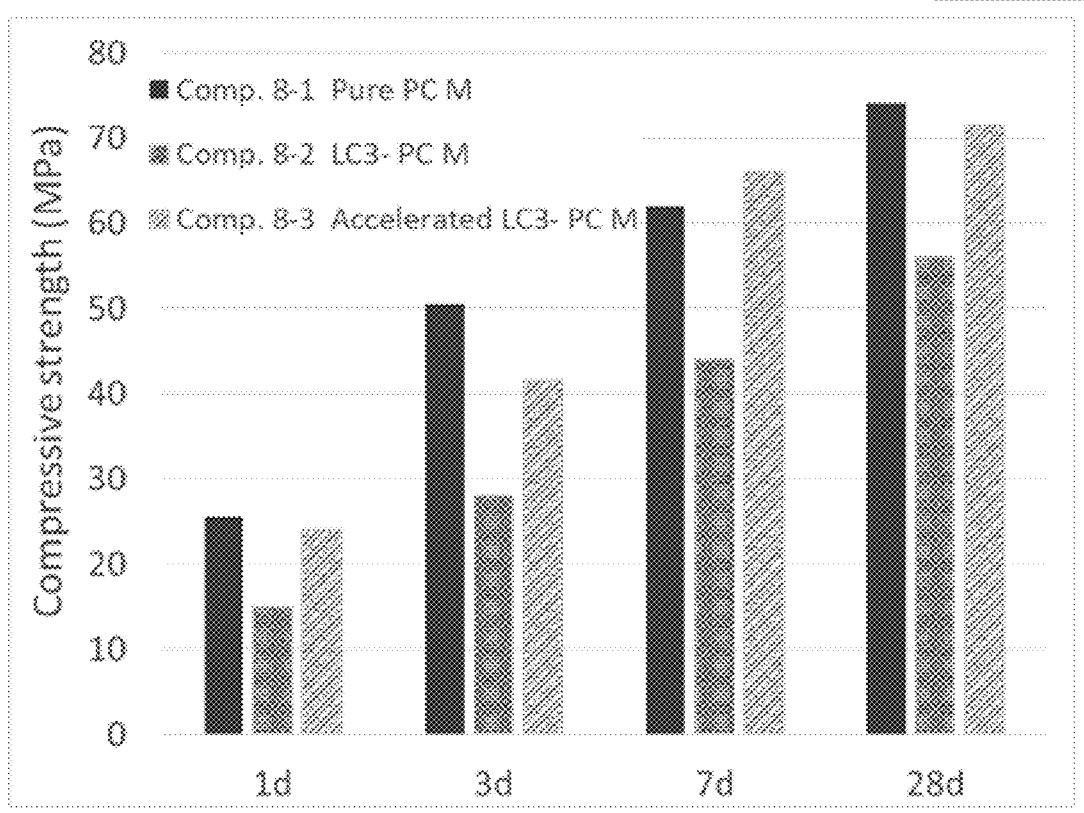
FIG. 14 illustrates the compressive strength between 1 and 28 days of compositions of pure PC, LC3-PC and accelerated LC3 PC with PC M.

The compressive strengths obtained with the Holcim Normo PC (PC N) are presented together to the ones obtained with Jura PC (PC J) and Milke Premium PC (PC M) (FIGS. 12-14).

The behavior of the compositions with PC J is very similar to that of the PC N. The accelerated LC3 system has better performance than the LC3 system at all ages: the compressive strengths are 18% higher at 1 day and 50% higher at 28 days. Its performance is also superior to that of pure PC from 7 days on, being 29% better at 28 days.

The trend is similar when using PC M. The accelerated LC3 has significantly higher strengths than the LC3 system at all ages (+60% at 1 day, +28% at 28 days). But, because of the very high performance of this cement at all ages, the accelerated LC3 system does not surpass it, except at 7 days. At 1 and 28 days, the accelerated LC3 has strengths respectively 6% and 3% lower than the pure PC.

If the yield of the compositions is taken into account, however, the difference between the accelerated LC3 and the PC becomes more significant, showing a clear advantage of using the accelerated LC3 as proposed in the invention.

In all cases, for all the tested PCs, the yield of the accelerated LC3 is better than that of the LC3 and the pure PC systems. At 1 day, the yield can be increased up to 39% compared to the corresponding PC, and up to 47% compared to the corresponding LC3.

Figure 15:
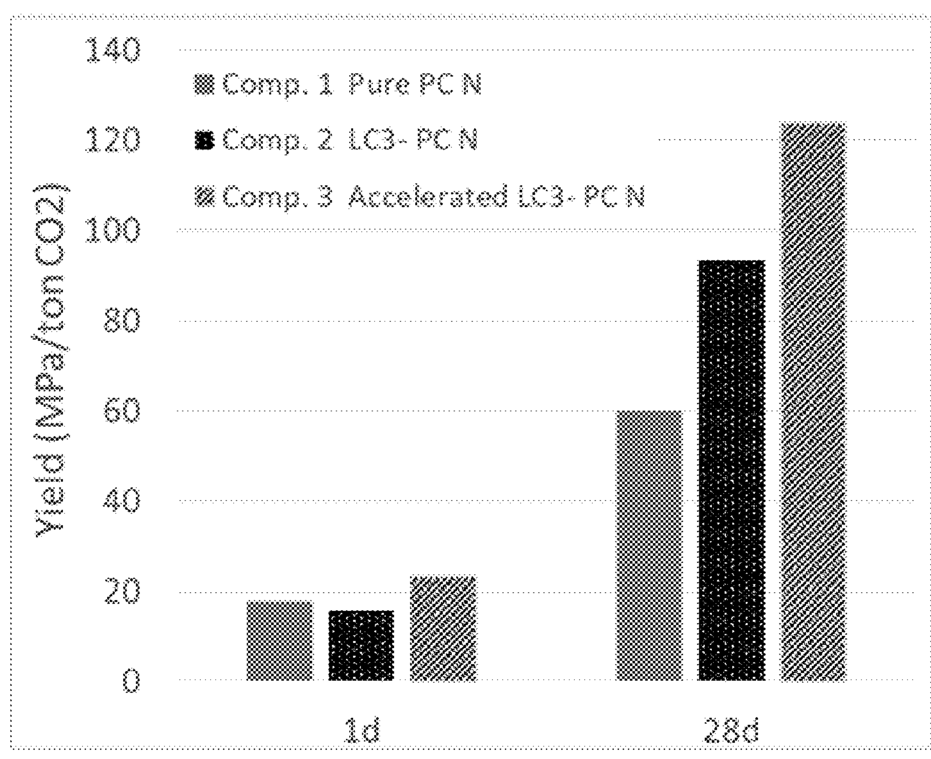
FIG. 15 illustrates the yield at days 1 and 28 of compositions of pure PC, LC3-PC and accelerated LC3 PC with PC N.
Figure 16:
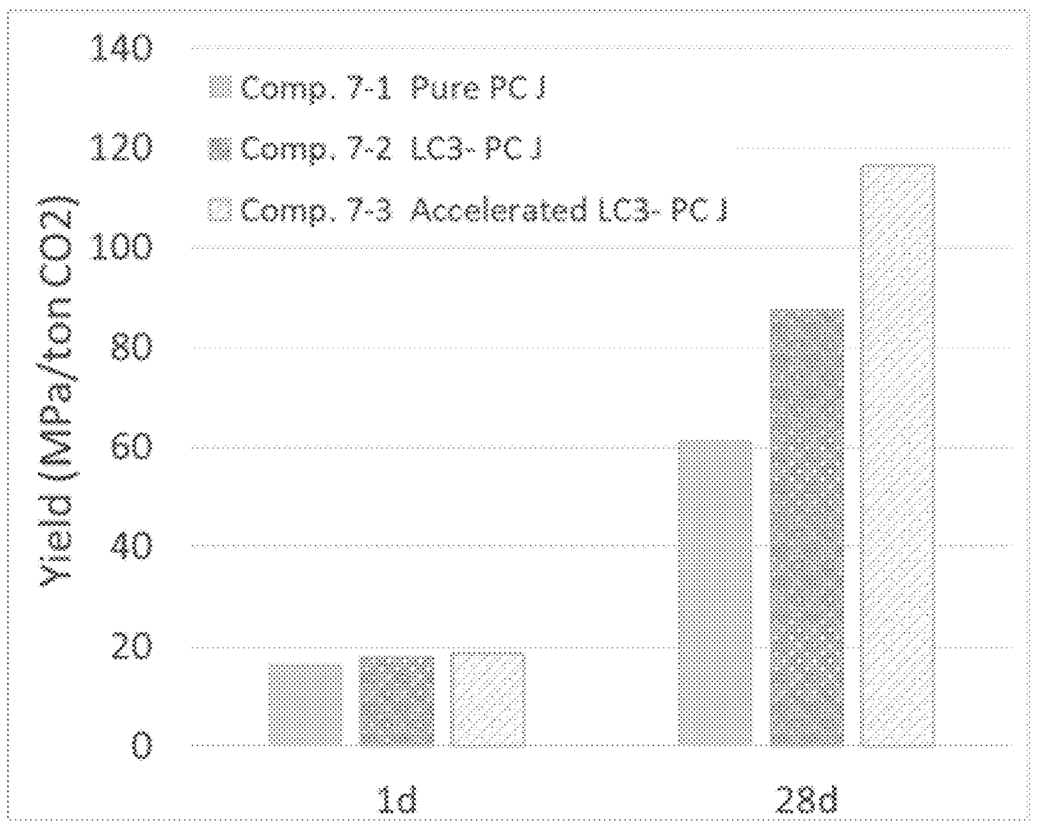
FIG. 16 illustrates the yield at days 1 and 28 f compositions of pure PC, LC3-PC and accelerated LC3 PC with PC J.
Figure 17:
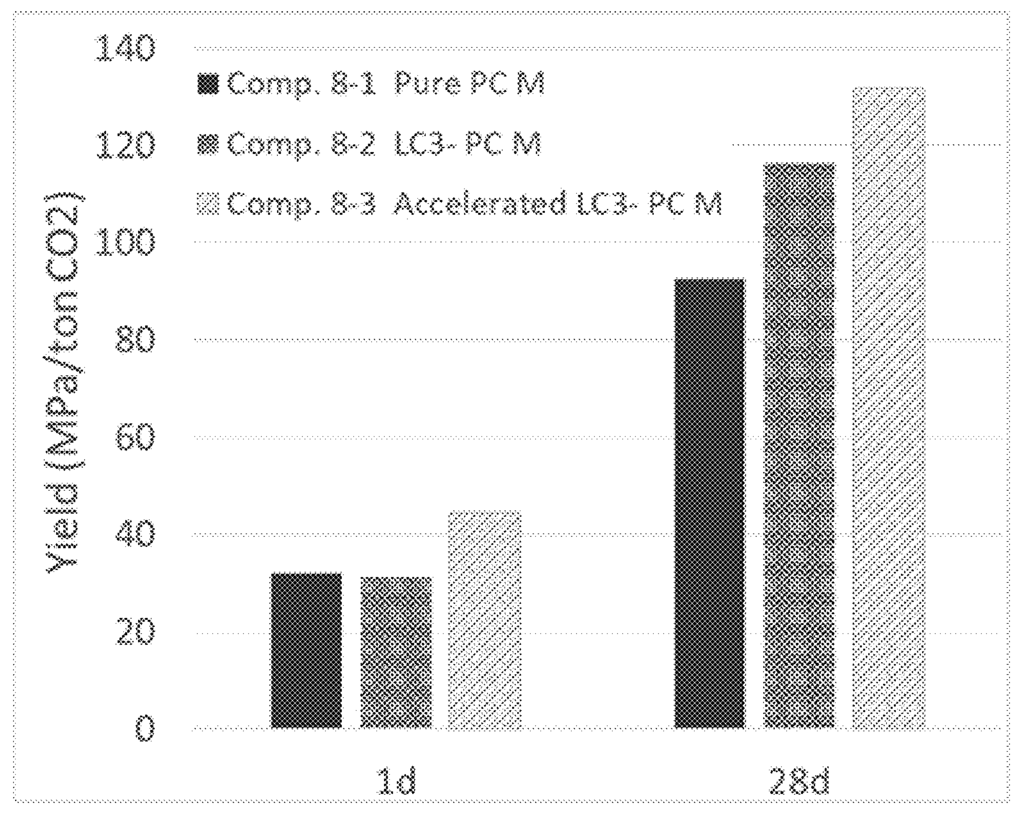
FIG. 17 illustrates the yield at days 1 and 28 of compositions of pure PC, LC3-PC and accelerated LC3 PC with PC M.

At 28 days, the yield of the accelerated LC3 is between 43% and 106% better than that of the corresponding PC, and between 13% and 33% better than the corresponding LC3 (FIGS. 15-17).

It confirms that the accelerated LC3 has a superior performance against the conventional LC3 even when using different types of PC, and that at both short and long terms.

The accelerated LC3 surpasses the strengths of pure PC systems, except those with very high strength, such as the Milke Premium, which has a 28 days strength of 74 MPa.

If the CO2 footprint is taken into account, then the accelerated LC3 largely outperforms the PCs, even the Milke Premium, reaching a much superior yield of strength per ton of $CO_2$ emission of the binder.

Example 5

In the tables 6 and 7 below are presented examples of binders composed of a mix of PC, calcined clay, limestone, calcium sulfate and calcium aluminate, where the nature of the calcium aluminate accelerator varies. In the composition 3 an amorphous CAC (ACAC) with a calcium to alumina (C/A) ratio of 1.7 and a fine granulometry (d50=5.7 μm) was used to accelerate the system. In the composition 11 an ACAC with a higher C/A was used, and, in the composition 12, a coarser ACAC (d50=12 μm) was used.

TABLE 6

| | Composition 1 Pure PC | | | Comp. 2- LC3 Composition 2 LC3 | | | Comp. 3- Accelerated LC3- ACAC 1 Composition 3 Accelerated LC3- 10% accelerator | | |
|---|---|---|---|---|---|---|---|---|---|
| | Material | Binder | Mortar | Material | Binder | Mortar | Material | Binder | Mortar |
| PC | PCN | 100 | 25 | PCN | 52.2 | 234.7 | PCN | 52.2 | 234.7 |
| Calcined Clays | | | | CC1 | 24.8 | 111.4 | CC1 | 24.8 | 111.4 |
| Calcium | | | | G | 2.3 | 10.5 | G | 2.3 | 10.5 |

TABLE 6-continued

| | Composition 1 Pure PC | | | Comp. 2- LC3 Composition 2 LC3 | | | Comp. 3- Accelerated LC3- ACAC 1 Composition 3 Accelerated LC3- 10% accelerator | | |
|---|---|---|---|---|---|---|---|---|---|
| | Material | Binder | Mortar | Material | Binder | Mortar | Material | Binder | Mortar |
| Sulfates | | | | | | | ANH | 5.0 | 22.5 |
| CAC | | | | | | | ACAC1 | 5.0 | 22.5 |
| Limestone | | | | LS1 | 19.8 | 89.1 | LS1 | 9.8 | 44.1 |
| Admixture | | | | CA | 0.3 | 1.5 | CA | 0.3 | 1.5 |
| | | | | NC | 0.6 | 2.7 | NC | 0.6 | 2.7 |
| Sand | AF | | 75 | AF | | 1350 | AF | | 1350 |
| Total dry | | 100 | 100 | | 100 | 1800 | | 100 | 1800 |
| Water | | 40 | 225 | | 40 | 225 | | 40 | 225 |
| water/binder | | | 9.00 | | | 0.50 | | | 0.50 |
| 1 day strength (MPa) | | | 14 | | | 7.5 | | | 12.5 |
| 28 days strength (MPa) | | | 48 | | | 44.5 | | | 67 |
| 1 d strength/ PC reference | | | 100% | | | 54% | | | 89% |
| 28 d strength/ PC reference | | | 100% | | | 93% | | | 140% |
| 1 d strength/ LC3 reference | | | 187% | | | 100% | | | 167% |
| 28 d strength/ LC3 reference | | | 108% | | | 100% | | | 151% |
| CO2 footprint (kg CO2/ton) | | 800 | | | 477 | | | 542 | |
| CO2 footprint/ PC reference | | 100% | | | 60% | | | 68% | |
| CO2 footprint/ LC3 reference | | 168% | | | 100% | | | 114% | |
| 1 d Yield (MPa/ton CO2) | | 17.5 | | | 15.7 | | | 23.1 | |
| 28 d Yield (MPa/ton CO2) | | 60.0 | | | 93.3 | | | 123.6 | |
| 1 d Yield/ PC reference | | 100% | | | 90% | | | 132% | |
| 28 d Yield/ PC reference | | 100% | | | 156% | | | 206% | |
| 1 d Yield/ LC3 reference | | 111% | | | 100% | | | 147% | |
| 28 d Yield/ LC3 reference | | 64% | | | 100% | | | 132% | |

TABLE 7

| | Comp. 11- Accelerated LC3- ACAC 2 (richer in Ca) Composition 11 Amorphous CAC with higher Calcium content | | | Comp. 12- Accelerated LC3- ACAC 3 (coarser) Composition 12 Amorphous CAC with coarser granulometry | | |
|---|---|---|---|---|---|---|
| | Material | Binder | Mortar | Material | Binder | Mortar |
| PC | PCN | 52.15 | 234.7 | PCN | 52.2 | 234.7 |
| Calcined Clays | CC1 | 24.76 | 111.4 | CC1 | 24.8 | 111.4 |
| Calcium | G | 2.34 | 10.5 | G | 2.3 | 10.5 |
| Sulfates | ANH | 5.0 | 22.5 | ANH | 5.0 | 22.5 |
| CAC | ACAC2 | 5.0 | 22.5 | ACAC3 | 5.0 | 22.5 |
| Limestone | LS1 | 9.81 | 44.1 | LS1 | 9.8 | 44.1 |
| Admixture | CA | 0.33 | 1.5 | CA | 0.3 | 1.5 |
| | NC | 0.61 | 2.7 | NC | 0.6 | 2.7 |
| Sand | AF | | 1350 | AF | | 1350 |
| Total dry | | 100 | 1800 | | 100 | 1800 |
| Water | | 40 | 225 | | 40 | 225 |
| water/binder | | | 0.50 | | | 0.50 |
| 1 day strength (MPa) | | | 17.1 | | | 12.9 |
| 28 days strength (MPa) | | | 59.9 | | | 65.8 |
| 1 d strength/ PC reference | | | 122% | | | 92% |

TABLE 7-continued

| | Comp. 11- Accelerated LC3- ACAC 2 (richer in Ca) Composition 11 Amorphous CAC with higher Calcium content | | | Comp. 12- Accelerated LC3- ACAC 3 (coarser) Composition 12 Amorphous CAC with coarser granulometry | | |
|---|---|---|---|---|---|---|
| | Material | Binder | Mortar | Material | Binder | Mortar |
| 28 d strength/ PC reference | | | 125% | | | 137% |
| 1 d strength/ LC3 reference | | | 228% | | | 172% |
| 28 d strength/ LC3 reference | | | 134% | | | 148% |
| CO2 footprint (kg CO2/ton) | | 542 | | | 542 | |
| CO2 footprint/ PC reference | | 1 | | | 1 | |
| CO2 footprint/ LC3 reference | | 1 | | | 1 | |
| 1 d Yield (MPa/ton CO2) | | 32 | | | 24 | |
| 28 d Yield (MPa/ton CO2) | | 111 | | | 121 | |
| 1 d Yield/ PC reference | | 2 | | | 1 | |
| 28 d Yield/ PC reference | | 2 | | | 2 | |
| 1 d Yield/ LC3 reference | | 2 | | | 2 | |
| 28 d Yield/ LC3 reference | | 1 | | | 1 | |

Figure 18:
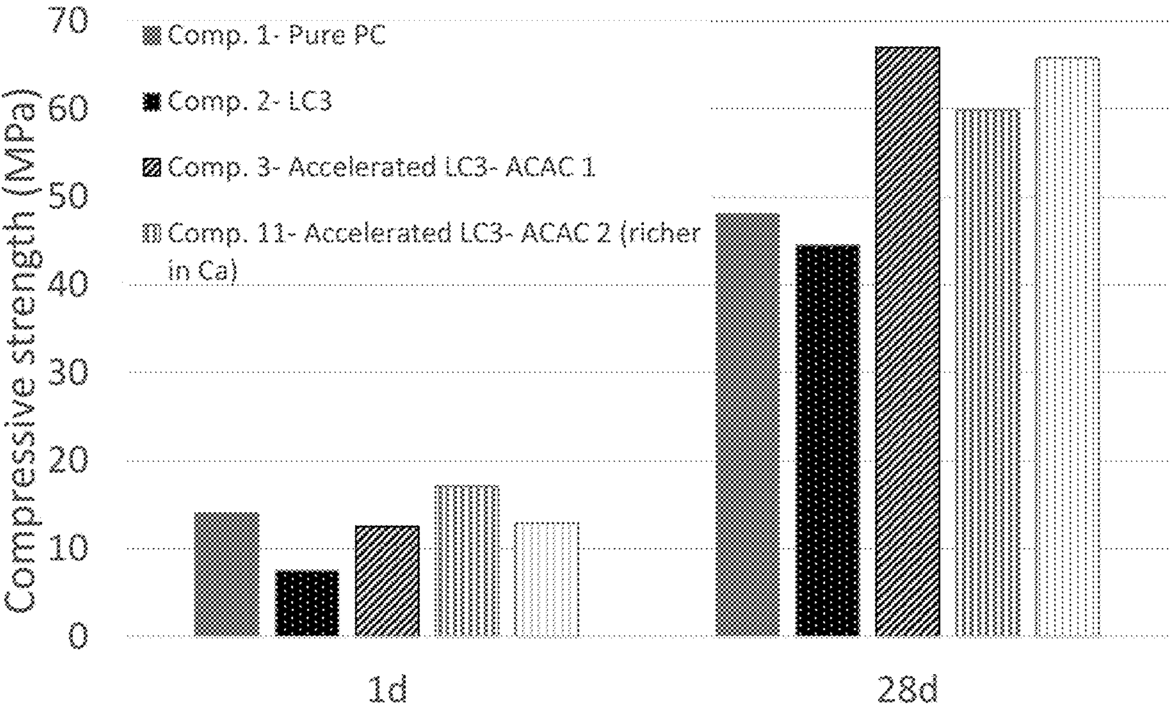
FIG. 18 illustrates the compressive strength of compositions of pure PC, LC3, accelerated LC3 and compositions of example 5.

The FIGS. 18-20 illustrate the effect of the nature of the ACAC and calcium sulfate in the binder. The accelerated LC3 containing the 3 different ACAC are compared among them, and to the references—Composition 1—Pure PC and Composition 2—LC3.

It was observed that all the three natures of ACAC were able to accelerate the system, increasing the 1 day strengths. The improvement ranges from 67% to 128%, compared to the non-accelerated LC3. The best performance at early age is obtained with the ACAC with higher C/A.

At later ages all the accelerated systems have higher strengths than the OPC and LC3 systems, the best performances being obtained with the ACAC with lower C/A. The ACA1 reaches a 28 days compressive strength 40% better than that of PC, and 51% better than that of LC3.

In this range of d50 fineness of the ACAC seems to have no impact on its performances. The CO2 footprints of the three ACAC are similar, thus their yield depends only of the strength. The ACAC 2 has the best yield at early ages, while the ACAC 1 has the best one at later ages.

Example 6

Acceleration of GOBS Based-Cements

Here is presented the acceleration of Ground Granulated Blast-furnace Slag (GGBS)-containing binders, compared to a CEM I (PC) reference. These binders were prepared by mixing CEM I and GOBS, with or without limestone. The exact compositions are given in the tables 8 and 9 below.

TABLE 8

| | Composition 13 Pure PC | | | Composition 14 PC + GGBS + Limestone | | | Composition 15 Accelerated PC + GGBS + Limestone | | |
|---|---|---|---|---|---|---|---|---|---|
| | Material | Binder | Mortar | Material | Binder | Mortar | Material | Binder | Mortar |
| PC | PC-A | 100 | 450 | PC-A | 35 | 157.5 | PC-A | 35 | 157.5 |
| GGBS | | | | GGBS | 45 | 202.5 | GGBS | 45 | 202.5 |
| Calcium Sulfate | | | | | | | ANH | 5 | 22.5 |
| CAC | | | | | | | ACAC1 | 5 | 22.5 |
| Limestone | | | | LS1 | 20 | 90 | LS1 | 9 | 41.0 |
| Admixture | | | | | | | TA | 0.2 | 0.9 |
| | | | | | | | NC | 0.72 | 3.2 |
| Sand | AF | | 1350 | AF | | 1350 | AF | | 1350 |
| Total dry | | 100 | 1800 | | 100 | 1800 | | 100 | 1800 |
| Water | | 40 | 225 | | 40 | 225 | | 40 | 225 |
| water/binder | | | 0.50 | | | 0.5 | | | 0.5 |
| 6 h strength (MPa) | | | 0 | | | 0 | | | 2.5 |
| 1 day strength (MPa) | | | 24.1 | | | 5.9 | | | 7.5 |
| 28 days strength (MPa) | | | 59.8 | | | 56.0 | | | 69.1 |
| 1 d strength/PC reference | | | 100% | | | 24% | | | 31% |
| 28 d strength/PC reference | | | 100% | | | 94% | | | 116% |
| 1 d strength/non accelerated reference | | | — | | | 100% | | | 127% |
| 28 d strength/non accelerated reference | | | — | | | 100% | | | 123% |

TABLE 8-continued

| | Composition 13 Pure PC | | | Composition 14 PC + GGBS + Limestone | | | Composition 15 Accelerated PC + GGBS + Limestone | | |
|---|---|---|---|---|---|---|---|---|---|
| | Material | Binder | Mortar | Material | Binder | Mortar | Material | Binder | Mortar |
| CO2 footprint (kg CO2/ton) | | 800 | | | 290 | | | 333 | |
| CO2 footprint/PC reference | | 100% | | | 36% | | | 42% | |
| CO2 footprint/non accelerated reference | | 415% | | | 100% | | | 115% | |
| 1 d Yield (MPa/ton CO2) | | 30.1 | | | 20.3 | | | 22.5 | |
| 28 d Yield (MPa/ton CO2) | | 74.8 | | | 193.0 | | | 207.7 | |
| 1 d Yield/PC reference | | 100% | | | 67% | | | 75% | |
| 28 d Yield/PC reference | | 100% | | | 258% | | | 278% | |
| 1 d Yield/non accelerated reference | | — | | | 100% | | | 111% | |
| 28 d Yield/non accelerated reference | | — | | | 100% | | | 108% | |

TABLE 9

| | Composition 16 PC + GGBS | | | Composition 17 Accelerated PC + GGBS | | |
|---|---|---|---|---|---|---|
| | Material | Binder | Mortar | Material | Binder | Mortar |
| PC | PC-A | 35 | 157.5 | PC-A | 31 | 139.5 |
| GGBS | GGBS | 65 | 292.5 | GGBS | 58 | 261.0 |
| Calcium Sulfate | | | | ANH | 5 | 22.5 |
| CAC | | | | ACAC1 | 5 | 22.5 |
| Limestone | | | | | | |
| Admixture | | | | TA | 0.1 | 0.5 |
| | | | | NC | 0.72 | 3.2 |
| Sand | AF | | 1350 | AF | | 1350 |
| Total dry | | 100 | 1800 | | 100 | 1800 |
| Water | | 40 | 225 | | 40 | 225 |
| water/binder | | | 0.5 | | | 0.5 |
| 6 h strength (MPa) | | | 0 | | | 5.1 |
| 1 day strength (MPa) | | | 6.5 | | | 8.7 |
| 28 days strength (MPa) | | | 59.6 | | | 85.3 |
| 1 d strength/PC reference | | | 27% | | | 36% |
| 28 d strength/PC reference | | | 100% | | | 143% |
| 1 d strength/non accelerated reference | | | 100% | | | 134% |
| 28 d strength/non accelerated reference | | | 100% | | | 143% |
| CO2 footprint (kg CO2/ton) | | 293 | | | 335 | |
| CO2 footprint/PC reference | | 37% | | | 42% | |
| CO2 footprint/non accelerated reference | | 100% | | | 114% | |
| 1 d Yield (MPa/ton CO2) | | 22.2 | | | 26.0 | |
| 28 d Yield (MPa/ton CO2) | | 203.2 | | | 254.5 | |
| 1 d Yield/PC reference | | 74% | | | 86% | |
| 28 d Yield/PC reference | | 272% | | | 340% | |
| 1 d Yield/non accelerated reference | | 100% | | | 117% | |
| 28 d Yield/non accelerated reference | | 100% | | | 125% | |

This example presents the acceleration of Ground Granulated Blast-furnace Slag (GGBS)-containing binders, compated to a CEM I (PC) reference. These binders were prepared by mixing CEM I and GOBS, with or without limestone. The exact compositions are given in the table below.

Composition 13: Pure CEM I (PC)

Composition 14: PC+ GGBS+ Limestone

Composition 15: Accelerated PC+ GGBS+ estone

Composition 16: PC+ GGBS

Composition 17: Accelerated PC+ GGBS

For the two GGBS-based binders tested, we observe a faster structuration when the accelerator is added, as shown by the ultrasound measurements displayed in the Figure X. This faster structuration translate in compressive strengths at 6 hours, which are not present for the non-accelerated systems, nor for the pure PC. The 24 h strengths are improved by the use of the accelerators, increasing by 27% for the PC+GGBS+ Limestone system, and by 34% for the PC+GGBS system.

The 28 days strengths are also significantly increased by the addition of the accelerator, leading to strengths better than even the pure PC. Despite the slight increase of the CO2 footprint of the binders due to the addition of the accelerators, the yield is improved. All GOBS based systems have yields much higher than that of pure PC, the accelerated systems presenting the highest ones. Indeed, the MPa/ton CO2 yield at 28 days of the accelerated PC+ GGBS+ Limestone system is 8% higher than that of the non-accelerated system, and 178% higher than that of the pure PC, while for the accelerated PC+GGBS the yield is 25% better than that of the non-accelerated system, and 240% better than the pure PC.

Example 7

Different Natures of Calcium Aluminate Cement

This example presents LC3 systems accelerated with two crystalline CAC, one composed mostly by CA (CAC 1) and another by C12A7 (CAC 2). These two accelerated systems are compared to the pure OPC, to the LC3 and to the accelerated LC3 using an amorphous CAC. Results are illustrated in FIGS. 26-28.

TABLE 10

| | Composition 13 Pure PC | | | Composition 18 LC3 | | | Composition 19 Accelerated LC3- ACAC 1 | | |
|---|---|---|---|---|---|---|---|---|---|
| | Material | Binder | Mortar | Material | Binder | Mortar | Material | Binder | Mortar |
| PC | PCA | 100 | 450 | PCA | 60.0 | 270.0 | PCA | 54.0 | 243.0 |
| Calcined Clays | | | | CC1 | 20.0 | 90.0 | CC1 | 18.0 | 81.0 |
| Calcium Sulfates | | | | | | | ANH | 7.5 | 33.8 |
| CAC or CSA | | | | | | | ACAC1 | 4.5 | 20.2 |
| Limestone | | | | LS1 | 20.0 | 90.0 | LS1 | 15.0 | 67.5 |
| Admixtures | | | | | | | TA | 0.36 | 1.6 |
| | | | | | | | NC | 0.65 | 2.9 |
| Sand | AF | | 1350 | AF | | 1350 | AF | | 1350 |
| Total dry | | 100 | 1800 | | 100 | 1800 | | 100 | 1800 |
| Water | | | 225 | | | 225 | | | 225 |
| water/binder | | | 0.50 | | | 0.50 | | | 0.50 |
| 6 hours strength (Mpa) | | | 0 | | | 0 | | | 8.1 |
| 1 day strength (MPa) | | | 24 | | | 11 | | | 22 |
| 28 days strength (MPa) | | | 60 | | | 56 | | | 79 |
| 1 d strength/ PC reference | | | 100% | | | 46% | | | 92% |
| 28 d strength/ PC reference | | | 100% | | | 93% | | | 132% |
| 1 d strength/ LC3 reference | | | 218% | | | 100% | | | 200% |
| 28 d strength/ LC3 reference | | | 107% | | | 100% | | | 141% |
| CO2 footprint (kg CO2/ton) | | 800 | | | 529 | | | 549 | |
| CO2 footprint/ PC reference | | 100% | | | 66% | | | 69% | |
| CO2 footprint/ LC3 reference | | 151% | | | 100% | | | 104% | |
| 1 d Yield (MPa/ton CO2) | | 30.0 | | | 20.8 | | | 40.1 | |
| 28 d Yield (MPa/ton CO2) | | 75.0 | | | 105.9 | | | 143.9 | |
| 1 d Yield/ PC reference | | 100% | | | 69% | | | 134% | |
| 28 d Yield/ PC reference | | 100% | | | 141% | | | 192% | |
| 1 d Yield/ LC3 reference | | 144% | | | 100% | | | 193% | |
| 28 d Yield/ LC3 reference | | 71% | | | 100% | | | 136% | |

TABLE 10

(end)

| | Composition 20 Accelerated LC3- CAC 1 | | | Composition 21 Accelerated LC3- CAC 2 | | |
|---|---|---|---|---|---|---|
| | Material | Binder | Mortar | Material | Binder | Mortar |
| PC | PCA | 54.0 | 243.0 | PCA | 54.0 | 243.0 |
| Calcined Clays | CC1 | 18.0 | 81.0 | CC1 | 18.0 | 81.0 |
| Calcium Sulfates | ANH | 7.5 | 33.8 | ANH | 7.5 | 33.8 |
| CAC or CSA | CAC 1 | 9.0 | 40.5 | CAC 2 | 6.8 | 30.6 |
| Limestone | LS1 | 10.6 | 47.7 | LS1 | 12.8 | 57.6 |
| Admixture | TA | 0.25 | 1.1 | TA | 0.25 | 1.1 |
| | NC | 0.65 | 2.9 | NC | 0.65 | 2.9 |
| Sand | AF | | 1350 | AF | | 1350 |
| Total dry | | 100 | 1800 | | 100 | 1800 |
| Water | | | 225 | | | 225 |
| water/binder | | | 0.50 | | | 0.50 |
| 6 hours strength (Mpa) | | | 1 | | | 0.6 |
| 1 day strength (MPa) | | | 17 | | | 12 |

TABLE 10-continued (end)

| | Composition 20 Accelerated LC3- CAC 1 | | | Composition 21 Accelerated LC3- CAC 2 | | |
|---|---|---|---|---|---|---|
| | Material | Binder | Mortar | Material | Binder | Mortar |
| 28 days strength (MPa) | | | 86 | | | 76 |
| 1 d strength/ PC reference | | | 71% | | | 50% |
| 28 d strength/ PC reference | | | 143% | | | 127% |
| 1 d strength/ LC3 reference | | | 155% | | | 109% |
| 28 d strength/ LC3 reference | | | 154% | | | 136% |
| CO2 footprint (kg CO2/ton) | | 554 | | | 539 | |
| CO2 footprint/ PC reference | | 69% | | | 67% | |
| CO2 footprint/ LC3 reference | | 105% | | | 102% | |

TABLE 10-continued

| (end) | | | | | | |
|---|---|---|---|---|---|---|
| | Composition 20 Accelerated LC3- CAC 1 | | | Composition 21 Accelerated LC3- CAC 2 | | |
| | Material | Binder | Mortar | Material | Binder | Mortar |
| 1 d Yield (MPa/ton CO2) | | 30.7 | | | 22.3 | |
| 28 d Yield (MPa/ton CO2) | | 155.2 | | | 141.0 | |
| 1 d Yield/ PC reference | | 102% | | | 74% | |
| 28 d Yield/ PC reference | | 207% | | | 188% | |
| 1 d Yield/ LC3 reference | | 148% | | | 107% | |
| 28 d Yield/ LC3 reference | | 147% | | | 133% | |

The two crystalline CAC are able to accelerate the strength development of the LC3 system, even if they are relatively less efficient than the amorphous CAC. The long term strengths are also improved by the use of the crystalline CAC, leading to an increase of the 28 days strengths between 36% and 54%, compared to the non-accelerated LC3.

The CO2 footprints of the crystalline CAC are lower than that of the amorphous CAC, but they are added in higher amounts, so the final footprint of the systems are very close.

Both crystalline and amorphous CAC lead to improved yields ate 24 h and at 28 days, compared to the non-accelerated LC3. With the ACAC, the 28 days yield is improved by 36%, with the CAC 1, by 47%, and with the CAC 2, by 33%.

Example 8

Different Natures of Calcined Clay

In this example were compared LC3 systems using two different clays, one containing a high amount of kaolinite (CC 1) and another with a lower amount (CC2). Both systems were also tested in the accelerated configuration, using an amorphous CAC. The system with pure PG is shown as a reference. Results are illustrated in FIGS. 29-31.

TABLE 11

| | Composition 22 Pure PC | | | Composition 23 LC3_CC 1 | | | Composition 24 Accelerated LC3- CC 1 | | |
|---|---|---|---|---|---|---|---|---|---|
| | Material | Binder | Mortar | Material | Binder | Mortar | Material | Binder | Mortar |
| PC | PCS | 100 | 450 | PCS | 60.0 | 270.0 | PCS | 54.0 | 243.0 |
| Calcined Clays | | | | CC1 | 20.0 | 90.0 | CC1 | 18.0 | 81.0 |
| Calcium Sulfate | | | | | | | ANH | 7.5 | 33.8 |
| CAC | | | | | | | ACAC1 | 4.5 | 20.2 |
| Limestone | | | | LS1 | 20.0 | 90.0 | LS1 | 15.0 | 67.5 |
| Admixtures | | | | | | | TA | 0.36 | 1.6 |
| | | | | | | | NC | 0.65 | 2.9 |
| Sand | AF | | 1350 | AF | | 1350 | AF | | 1350 |
| Total dry | | 100 | 1800 | | 100 | 1800 | | 100 | 1800 |
| Water | | 40 | 225 | | 40 | 225 | | 40 | 225 |
| water/binder | | | 0.50 | | | 0.50 | | | 0.50 |
| 6 hours strength (Mpa) | | | 0 | | | 0 | | | 11 |
| 1 day strength (MPa) | | | 25 | | | 11 | | | 34 |
| 28 days strength (MPa) | | | 50 | | | 55 | | | 73 |
| 1 d strength/ PC reference | | | 100% | | | 44% | | | 136% |
| 28 d strength/ PC reference | | | 100% | | | 110% | | | 146% |
| 1 d strength/ LC3 reference | | | 227% | | | 100% | | | 309% |
| 28 d strength/ LC3 reference | | | 91% | | | 100% | | | 133% |
| CO2 footprint (kg CO2/ton) | | 800 | | | 529 | | | 549 | |
| CO2 footprint/ PC reference | | 100% | | | 66% | | | 69% | |
| CO2 footprint/ LC3 reference | | 151% | | | 100% | | | 104% | |
| 1 d Yield (MPa/ton CO2) | | 31.25 | | | 20.8 | | | 61.9 | |
| 28 d Yield (MPa/ton CO2) | | 62.5 | | | 104.0 | | | 133.0 | |
| 1 d Yield/ PC reference | | 100% | | | 67% | | | 198% | |
| 28 d Yield/ PC reference | | 100% | | | 166% | | | 213% | |
| 1 d Yield/ LC3 reference | | 150% | | | 100% | | | 298% | |
| 28 d Yield/ LC3 reference | | 60% | | | 100% | | | 128% | |

We observe that, whatever the clay used, the LC3 systems (as well as the pure PC system) have no strength at 6 h. The accelerated systems, however, present compressive strengths close to 10 MPa. At 1 day the LC3 with both clays have a similar level of strength, 56% lower than that of the pure PC reference. The accelerated systems, on the other hand, have strengths 36% to 40% higher than that of PC.

At 28 days the LC3 with the high kaolinite clay has a compressive strength of 55 MPa, slightly higher than that of the pure PC (50 MPa), while the LC3 with the low kaolinite clay reaches only 44 MPa.

When adding the mineral accelerator to the LC3 systems, the final strengths are much improved. In the case of the CC1, the improvement compared to the non accelerated LC3 is of 33%, and in the case of the CC2, the improvement is of 59%. Both accelerated systems have strength much higher than that of PC, leading to an increase of the yield of 113%, for CC1, and of 108%, for CC2.

In conclusion, the addition of the mineral accelerator improves the performances at all ages of the LC3, whatever the clay. Moreover, it compensates the lower performances of LC3 containing low kaolinite clays, bringing it to levels similar to that obtained with high kaolinite clays.

Example 9

Different Setting Regulators

In this example different setting retarders were combined to the mineral accelerator in the composition of the accelerated LC3: tartaric acid at three different dosages, sodium gluconate and citric acid. The accelerated systems were compared to the pure PC and to the LC3 systems. Results are illustrated in FIGS. 32-35.

TABLE 12

| | Composition 13 Pure PC | | | Composition 18 LC3 | | | Composition 19 Accelerated LC3- 0.36% Tartaric acid | | | Composition 27 Accelerated LC3- 0.22% Tartaric acid | | |
|---|---|---|---|---|---|---|---|---|---|---|---|---|
| | Material | Binder | Mortar | Material | Binder | Mortar | Material | Binder | Mortar | Material | Binder | Mortar |
| PC | PCA | 100 | 450 | PCA | 60.0 | 270.0 | PCA | 54.0 | 243.0 | PCA | 54.0 | 243.0 |
| Calcined clay | | | | CC1 | 20.0 | 90.0 | CC1 | 18.0 | 81.0 | CC1 | 18.0 | 81.0 |
| Calcium Sulfate | | | | | | | ANH | 7.5 | 33.8 | ANH | 7.5 | 33.8 |
| CAC | | | | | | | ACAC1 | 4.5 | 20.2 | ACAC1 | 4.5 | 20.2 |
| Limestone | | | | LS1 | 20.0 | 90.0 | LS1 | 15.0 | 67.5 | LS1 | 15.1 | 68.1 |
| Admixtures | | | | | | | TA | 0.36 | 1.6 | TA | 0.22 | 1.0 |
| | | | | | | | NC | 0.65 | 2.9 | NC | 0.65 | 2.9 |
| Sand | AF | | 1350 | AF | | 1350 | AF | | 1350 | AF | | 1350 |
| Total dry | | 100 | 100 | | 100 | 1800 | | 100 | 1800 | | 100 | 1800 |
| Water | | | 225 | | | 225 | | | 225 | | | 225 |
| water/binder | | | 0.50 | | | 0.50 | | | 0.50 | | | 0.5 |
| 6 hours strength (Mpa) | | | 0 | | | 0 | | | 8.1 | | | 8.7 |
| 1 day strength (MPa) | | | 24 | | | 11 | | | 22 | | | 25 |
| 28 days strength (MPa) | | | 60 | | | 56 | | | 79 | | | 79 |
| 1 d strength/ PC reference | | | 100% | | | 46% | | | 92% | | | 104% |
| 28 d strength/ PC reference | | | 100% | | | 93% | | | 132% | | | 132% |
| 1 d strength/ LC3 reference | | | 218% | | | 100% | | | 200% | | | 227% |
| 28 d strength/ LC3 reference | | | 107% | | | 100% | | | 141% | | | 141% |
| CO2 footprint (kg CO2/ton) | | 800 | | | 529 | | | 549 | | | 547 | |
| CO2 footprint/ PC reference | | 100% | | | 66% | | | 69% | | | 68% | |
| CO2 footprint/ LC3 reference | | 151% | | | 100% | | | 104% | | | 103% | |
| 1 d Yield (MPa/ton CO2) | | 30.0 | | | 20.8 | | | 40.1 | | | 45.7 | |
| 28 d Yield (MPa/ton CO2) | | 75.0 | | | 105.9 | | | 143.9 | | | 144.4 | |
| 1 d Yield/ PC reference | | 100% | | | 69% | | | 134% | | | 152% | |
| 28 d Yield/ PC reference | | 100% | | | 141% | | | 192% | | | 193% | |
| 1 d Yield/ LC3 reference | | 144% | | | 100% | | | 193% | | | 220% | |
| 28 d Yield/ LC3 reference | | 71% | | | 100% | | | 136% | | | 136% | |

TABLE 12

(end)

| | Composition 28 Accelerated LC3- 0.43% Tartaric acid | | | Composition 29 Accelerated LC3- 0.18% Sodium gluconate | | | Composition 30 Accelerated LC3- 0.72% Citric acid | | |
|---|---|---|---|---|---|---|---|---|---|
| | Material | Binder | Mortar | Material | Binder | Mortar | Material | Binder | Mortar |
| PC | PCA | 54.0 | 243.0 | PCA | 54.0 | 243.0 | PCA | 54.0 | 243.0 |
| Calcined clay | CC1 | 18.0 | 81.0 | CC1 | 18.0 | 81.0 | CC1 | 18.0 | 81.0 |
| Calcium Sulfate | ANH | 7.5 | 33.8 | ANH | 7.5 | 33.8 | ANH | 7.5 | 33.8 |
| CAC | ACAC1 | 4.5 | 20.2 | ACAC1 | 4.5 | 20.2 | ACAC1 | 4.5 | 20.2 |
| Limestone | LS1 | 14.9 | 67.2 | LS1 | 15.2 | 68.3 | LS1 | 14.6 | 65.8 |
| Admixtures | TA | 0.43 | 1.9 | NC | 0.18 | 0.8 | CA | 0.72 | 3.3 |
| | NC | 0.65 | 2.9 | NC | 0.65 | 2.9 | NC | 0.65 | 2.9 |
| Sand | AF | | 1350 | AF | | 1350 | AF | | 1350 |
| Total dry | | 100 | 1800 | | 100 | 1800 | | 100 | 1800 |
| Water | | | 225 | | | 225 | | | 225 |
| water/binder | | | 0.5 | | | 0.5 | | | 0.5 |
| 6 hours strength (Mpa) | | | 1.4 | | | 6.7 | | | 12.5 |
| 1 day strength (MPa) | | | 19 | | | 24 | | | 25 |
| 28 days strength (MPa) | | | 77 | | | 86 | | | 90 |
| 1 d strength/ PC reference | | | 79% | | | 100% | | | 104% |
| 28 d strength/ PC reference | | | 128% | | | 143% | | | 150% |
| 1 d strength/ LC3 reference | | | 173% | | | 218% | | | 227% |
| 28 d strength/ LC3 reference | | | 138% | | | 154% | | | 161% |
| CO2 footprint (kg CO2/ton) | | 549 | | | 546 | | | 560 | |
| CO2 footprint/ PC reference | | 69% | | | 68% | | | 70% | |
| CO2 footprint/ LC3 reference | | 104% | | | 103% | | | 106% | |
| 1 d Yield (MPa/ton CO2) | | 34.6 | | | 44.0 | | | 44.6 | |
| 28 d Yield (MPa/ton CO2) | | 140.2 | | | 157.5 | | | 160.7 | |
| 1 d Yield/ PC reference | | 115% | | | 147% | | | 149% | |
| 28 d Yield/ PC reference | | 187% | | | 210% | | | 214% | |
| 1 d Yield/ LC3 reference | | 166% | | | 211% | | | 215% | |
| 28 d Yield/ LC3 reference | | 132% | | | 149% | | | 152% | |

The retarders will affect the setting time of the mortar, which can be associated with the onset of the ultrasound curves: the moment when the velocity of the ultrasound waves traveling through the mortar start to quickly increase. The onset of the accelerated LC3 containing of tartaric acid happens at 2.5 h; when the dosage is reduced to 0.22%, the onset happens at 0.8 h, and when it is increased to 0.43% the onset happens around 4 h. It is easy to regulate the onset (and thus the setting time) of the accelerated LC3 system by adjusting the amount of setting retarder admixture. The 6 h strengths are of course affected by the dosage of retarder, being reduced when the retarder amount is increased, but, from 24 h on, the strengths become quite independent of the dosage. At 28 days the strengths range from 77 MPa to 79 MPa for the accelerated systems containing different amounts of tartaric acid, compared to 56 MPa for the non-accelerated LC3 system.

Other natures of retarders can also be used in association with the mineral accelerator. In this example are presented a system with sodium gluconate, a strong retarder which is used to assure long setting times, and citric acid, a weak retarder used in systems where a shorter setting time is required.

With 0.18% of sodium gluconate, the accelerated LC3 has an onset around 4 h, comparable to that of the system with 0.43% of tartaric acid. The 6 h strengths are however slightly reduced, while at 24 h the compressive strengths reach the same levels with both retarders. At 28 days the strengths are even better than with the tartaric acid, reaching 86 MPa, an increase of 43% compared to the pure PC system and of 54% compared to the non-accelerated LC3.

With citric acid the performances are improved at all ages, compared to the pure PC, to the non-accelerated LC3 and to the accelerated LC3 containing tartaric acid. Indeed, in this very rapid system, the 6 h strengths are the highest, reaching 12.5 MPa, and the 28 days strength reaches 90 MPa, an improvement of 61% compared to the non-accelerated LC3.

The retarder nature have nearly no effect of the CO2 footprint of the binder, given their low dosages. Their choice should then be based only on the expected performances, particularly the desired setting time. Weaker retarders, as the citric acid, can be used in systems requiring short setting times, and they lead to high 6 h strengths. Stronger retarders, as sodium gluconate, allow obtaining setting times of a few hours, but the obtained 6 h strengths are a little lower. From 24 h on the strengths obtained with the different retarders are similar, as are their yields, which range from 32% to 52% higher than that of the LC3 system.

Example 10

Acceleration of Cement Containing Natural Pozzolan

In this example a blended cement was constituted by mixing 65% of CEM I and 35% of Micrasil (natural pozzolan). This blended cement was then accelerated using the mineral accelerator.

The 28 days results are not yet available, so the comparison between the accelerated and non accelerated systems are made based on the 1 and 7 days strengths, Results are illustrated in FIGS. 36-38.

TABLE 13

| | Composition 31 CEM I + Natural pozzolan | | | Composition 32 Accelerated CEM I + Natural pozzolan | | |
|---|---|---|---|---|---|---|
| | Material | Binder | Mortar | Material | Binder | Mortar |
| CEM I | PCA | 65 | 292.5 | PCA | 57.9 | 260.7 |
| Natural Pozzolan | Q | 35 | 157.5 | Q | 31.2 | 140.4 |
| Calcium Sulfate | | | | ANH | 6.2 | 28.0 |
| CAC | | | | ACAC1 | 3.8 | 17.1 |
| Admixtures | | | | TA | 0.20 | 0.9 |
| | | | | NC | 0.65 | 2.9 |
| Sand | AF | | 1350 | AF | | 1350 |
| Total dry | | 100 | 100 | | 100 | 1800 |
| Water | | | 225 | | | 225 |
| water/binder | | | 0.50 | | | 0.50 |
| 1 day strength (MPa) | | | 14.4 | | | 22.0 |
| 7 days strength (MPa) | | | 37 | | | 44 |
| 28 days strength (MPa) | | Not available yet | | | Not available yet | |
| 1 d strength/CEM I + Q reference | | | 100% | | | 153% |
| 7 d strength/CEM I + Q reference | | | 100% | | | 119% |
| CO2 footprint (kg CO2/ton) | | 412 | | | 429 | |
| CO2 footprint/CEM I + Q reference | | 100% | | | 104% | |
| 1 d Yield (MPa/ton CO2) | | 35.0 | | | 51.3 | |
| 7 d Yield (MPa/ton CO2) | | 89.8 | | | 102.6 | |
| 1 d Yield/CEM I + Q reference | | 100% | | | 147% | |
| 7 d Yield/CEM I + Q reference | | 100% | | | 114% | |

The addition of the accelerator increases the 1 day strengths by 53%, going from 14.4 MPa to 22.0 MPa, and the 7 days strengths are increased by 19%, showing that the mineral accelerator is also capable of improving the strength development of low CO2 cements containing natural pozzolans.

The addition of the mineral accelerator leads to only 4% of increase of the CO2 footprint of the binder, resulting in better yields at all ages. At 1 day, the yield of the accelerated system is 47% better than that of the non accelerated one, and at 7 days the improvement is of 14%.

Example 11

Acceleration of LC3 Based on CEM II 32.5N B/LL

In this example a CEM II 32.5N B/LL was combined to a calcined clay, in order to prepare a LC3-like system, but using only 2 components instead of 3. Indeed, as the CEM II B/LL already contains limestone, it requires only the addition of the clay, which may be convenient in a dry-mix plant when a limited number of silos is available, for example. Results are illustrated in FIGS. 39-41.

TABLE 14

| | Composition 33 Pure CEM II 32.5N | | | Composition 34 LC3-like (2 components) | | | Composition 35 Accelerated LC3-like | | |
|---|---|---|---|---|---|---|---|---|---|
| | Material | Binder | Mortar | Material | Binder | Mortar | Material | Binder | Mortar |
| CEM II 32.5N B/LL | PCO | 100 | 450 | PCO | 80 | 360 | PCO | 72.0 | 324.0 |
| Calcined Clay | | | | CC1 | 20 | 90 | CC1 | 18.0 | 81.0 |
| Calcium Sulfate | | | | | | | ANH | 5.6 | 25.1 |
| CAC | | | | | | | ACAC1 | 3.4 | 15.4 |
| Admixtures | | | | | | | TA | 0.35 | 1.6 |
| | | | | | | | NC | 0.64 | 2.9 |
| Sand | AF | | 1350 | AF | | 1350 | AF | | 1350 |
| Total dry | | 100 | 100 | | 100 | 100 | | 100 | 1800 |
| Water | | | 225 | | | 225 | | | 225 |
| water/binder | | | 0.50 | | | 0.50 | | | 0.50 |
| 1 day strength (MPa) | | | 12.6 | | | 10.3 | | | 25.9 |
| 28 days strength (MPa) | | | 31 | | | 40 | | | 61 |
| 1 d strength/PC reference | | | 100% | | | 82% | | | 206% |
| 28 d strength/PC reference | | | 100% | | | 129% | | | 197% |
| 1 d strength/LC3-like reference | | | 122% | | | 100% | | | 251% |
| 28 d strength/LC3-like reference | | | 78% | | | 100% | | | 153% |
| CO2 footprint (kg CO2/ton) | | 580 | | | 512 | | | 518 | |
| CO2 footprint/PC reference | | 100% | | | 88% | | | 89% | |
| CO2 footprint/LC3-like reference | | 113% | | | 100% | | | 101% | |
| 1 d Yield (MPa/ton CO2) | | 21.7 | | | 20.1 | | | 50.0 | |
| 28 d Yield (MPa/ton CO2) | | 53.4 | | | 78.1 | | | 117.7 | |
| 1 d Yield/PC reference | | 100% | | | 93% | | | 230% | |
| 28 d Yield/PC reference | | 100% | | | 146% | | | 220% | |
| 1 d Yield/LC3-like reference | | 108% | | | 100% | | | 248% | |
| 28 d Yield/LC3-like reference | | 68% | | | 100% | | | 151% | |

The replacement of 20% of the CEM II by the calcined clay allows obtaining a 2-components LC3, whose 24 h strengths are slightly lower than that of the pure CEM II, but which 28 days strengths are 29% higher.

When this LC3-like system is accelerated using the mineral accelerator, both the short and the long terms are much improved. At 1 day the strengths are increased by 106% compared to the CEM II, and by 151% compared to the LC3-like system. At 28 days the increase is of 97% compared to the OEM II and of 53% compared to the LC3-like system.

As the CO2 footprint of the accelerated system is very close to that of the LC3-like one, and lower than that of the OEM II, the significant increase in the strengths results in much higher yields at both 1 and 28 days.

Ultrasound measurements were performed as follow:

The structuration, or hardening, of the mortars was followed using an ultrasound device. The fresh mortar is placed in a silicone mold with cylindrical shape, with a circular base of 5 cm diameter, and 5 cm high. In an opening at one side of the mold, in direct contact with the mortar, is placed an ultrasound emitter; at the opposite side of the circular section, in another opening of the mold, an ultrasound sensor is pieced. The emitter and the sensor are separated by a layer of 3 cm of mortar, which get structured and harden over time. The speed of transmission of the ultrasound waves depends on the rigidity of the mortar, the harder it gets, the higher is the ultrasound velocity. The velocity of the ultrasound wave is recorded every second, during 24 hours allowing to a curve showing the evolution of the velocity over time, which can be directly correlated to the hardening of the mortar.

For the two GGBS-based binders tested, a faster structuration is observed when the accelerator is added, as shown by the ultrasound measurements displayed in the FIGS. 21-22.

This faster structuration translates in compressive strengths at 6 hours, which are present neither for the non-accelerated systems, nor for the pure PC. The 24 h strengths are improved by the use of the accelerators, increasing by 27% for the PC+GGBS+ Limestone system, and by 34% for the PC+GGBS system.

The 28 days strengths are also significantly increased by the addition of the accelerator, leading to strengths better than even the pure PC.

Despite the slight increase of the CO2 footprint of the GGBS containing binders due to the addition of the accelerators, the yield is improved. All GGBS based systems have yields much higher than that of pure PC, the accelerated systems presenting the highest ones. Indeed, the MPa/ton CO2 yield at 28 days of the accelerated PC+ GGBS+ Limestone system is 8% higher than that of the non-accelerated system, and 178% higher than that of the pure PC, while for the accelerated PC+GGBS the yield is 25% better than that of the non-accelerated system, and 240% better than the pure PC.

What is claimed is:

1. A binder composition comprising:

a Portland cement and/or a ground Portland cement clinker;

a calcium aluminate cement (CAC) or a mixture of the calcium aluminate cement (CAC) and a calcium sulfo aluminate cement (CSA);

and a pozzolanic and/or latent hydraulic material, wherein the binder composition comprises at least 1.5% of calcium sulfate to a total amount of the binder composition by weight, and wherein the calcium aluminate cement (CAC) comprises between 50% and 98% of an amorphous phase by weight.

2. The binder composition according to claim 1, further comprising a calcium sulfate source, wherein the binder composition comprises:

(a) 20% to 90% by weight of the Portland cement (PC) and/or the ground Portland cement clinker;

(b) 0.5% to 40% by weight of the calcium aluminate cement (CAC) or the mixture of the calcium aluminate cement (CAC) and the calcium sulfo aluminate cement (CSA);

(c) 1.5% to 44.5% by weight of the calcium sulfate source; and (d) 5 to 50% by weight of the pozzolanic material, such that a total amount of said (a), (b), (c), and (d) in the binder composition equals 100% relative to a total amount of the binder composition.

3. The binder composition according to claim 1, further comprising a calcium sulfate source, wherein the binder composition comprises:

(e) 20% to 70% by weight of the Portland cement (PC) and/or the ground Portland cement clinker;

(f) 2% to 20% by weight of the calcium aluminate cement (CAC) or the mixture of the calcium aluminate cement (CAC) and the calcium sulfo aluminate cement (CSA);

(g) 2% to 15% by weight of the calcium sulfate source; and (h) 10% to 70% by weight of the pozzolanic and/or latent hydraulic material, such that a total amount of said (e), (f), (g), and (h) in the binder composition equals 100% relative to a total amount of the binder composition.

4. The binder composition according to claim 1, wherein the pozzolanic material is a calcined clay.

5. The binder composition according to claim 1, further comprising a calcium sulfate source, wherein the binder composition comprises:

(i) 0.5% to 70% by weight of the Portland cement;

(j) 0.5% to 20% by weight of the calcium aluminate cement (CAC);

(k) 0.5% to 15% by weight of the calcium sulfate source; and (l) 20% to 95% by weight of the latent hydraulic material, such that a total amount of said (i), (j), (k), and (l) in the binder composition equals 100% relative to a total amount of the binder composition.

6. The binder composition according to claim 1, further comprising a calcium sulfate source, wherein the binder composition comprises:

(m) 0.5% to 50% by weight of the Portland cement;

(n) 0.5% to 20% by weight of the calcium aluminate cement (CAC);

(o) 0.5% to 15% by weight of the calcium sulfate source; and (p) 40% to 95% by weight of the latent hydraulic material, such that a total amount of said (m), (n), (o), and (p) in the binder composition equals 100% relative to a total amount of the binder composition.

7. The binder composition according to claim 1, wherein the latent hydraulic material is ground granulated blast-furnace slag.

8. The binder composition according to claim 1, further comprising 5% to 40% by weight of carbonaceous mineral.

9. The binder composition according to claim 1, further comprising one or more set modifiers.

10. The binder composition according to claim 9, wherein the modifier is selected from the group consisting of citric acid, tartaric acid, sodium gluconate, $Na_2CO_3$, and $K_2CO_3$.

11. The binder composition according to claim 1, wherein the calcium aluminate cement comprises from 30% to 75% of $Al_2O_3$ and from 0.1% to 18% of $Fe_2O_3$ by weight.

12. The binder composition according to claim 1, wherein the pozzolanic material comprises between 1% and 99% by weight of metakaolin (MK).

13. The binder composition according to claim 1 which additionally comprises an added calcium sulfate source.

14. The binder composition according to claim 13, wherein the added calcium source is gypsum, anhydrite, hemihydrate, or a mixture thereof.

15. The binder composition according to claim 1, further comprising a calcium sulfate source, wherein the binder composition comprises:

(q) 0.5% to 60% by weight of the Portland cement;

(r) 0.5% to 20% by weight of the calcium aluminate cement (CAC);

(s) 0.5% to 15% by weight of the calcium sulfate source; and (t) 20% to 95% by weight of the latent hydraulic material, such that a total amount of said (q), (r), (s), and (t) in the binder composition equals 100% relative to a total amount of the binder composition.

16. A process of preparation of a construction composition comprising mixing the binder composition according to claim 1 with water.

17. A construction composition obtained by the process according to claim 16.

18. The construction composition according to claim 17, wherein the construction composition is a mortar composition or a concrete composition.

19. A construction part comprising the construction composition of claim 17.

* * * * *